(12) United States Patent
Venkatakrishnan

(10) Patent No.: US 11,797,554 B2
(45) Date of Patent: Oct. 24, 2023

(54) PROVIDING RICH, QUALIFIED SEARCH RESULTS WITH MESSAGING BETWEEN BUYERS AND SELLERS

(71) Applicant: Yellcast, Inc., San Carlos, CA (US)

(72) Inventor: Ganesan Venkatakrishnan, Fremont, CA (US)

(73) Assignee: Yellcast, Inc., San Carlos, CA (US)

( * ) Notice: Subject to any disclaimer, the term of this patent is extended or adjusted under 35 U.S.C. 154(b) by 66 days.

(21) Appl. No.: 15/233,729

(22) Filed: Aug. 10, 2016

(65) Prior Publication Data

US 2017/0046406 A1 Feb. 16, 2017

Related U.S. Application Data

(60) Provisional application No. 62/203,246, filed on Aug. 10, 2015.

(51) Int. Cl.
*G06F 16/248* (2019.01)
*G06F 16/951* (2019.01)
*G06F 16/2457* (2019.01)
*G06Q 30/0601* (2023.01)
*G06Q 30/0273* (2023.01)

(52) U.S. Cl.
CPC ...... *G06F 16/248* (2019.01); *G06F 16/24575* (2019.01); *G06F 16/951* (2019.01); *G06Q 30/0275* (2013.01); *G06Q 30/0613* (2013.01); *G06Q 30/0623* (2013.01)

(58) Field of Classification Search
CPC ............. G06F 16/248; G06F 16/24575; G06F 16/951; G06Q 30/0275; G06Q 30/0613; G06Q 30/0623
See application file for complete search history.

(56) References Cited

U.S. PATENT DOCUMENTS

| | | | |
|---|---|---|---|
| 9,721,291 B1* | 8/2017 | Kennis | G06Q 30/0643 |
| 2002/0129011 A1* | 9/2002 | Julien | G06F 16/951 |
| 2005/0038688 A1* | 2/2005 | Collins | G06Q 40/04 |
| | | | 705/37 |
| 2007/0078758 A1* | 4/2007 | Susskind | G06Q 30/08 |
| | | | 705/38 |
| 2012/0059731 A1* | 3/2012 | Silver | G06Q 30/0605 |
| | | | 705/26.2 |
| 2014/0180863 A1* | 6/2014 | Ganesan | G06Q 30/06 |
| | | | 705/26.4 |
| 2016/0335694 A1* | 11/2016 | Catino | G06Q 30/0625 |

* cited by examiner

*Primary Examiner* — Ken Hoang
(74) *Attorney, Agent, or Firm* — Haynes and Boone, LLP

(57) ABSTRACT

The present disclosure provides for an on-line venue in which search results are displayed with rich media and qualified content and the ability to contact multiple of the sources anonymously or otherwise communicate what product or service they want to purchase by posting an interactive request that a number of sellers can then directly respond to. This enables a higher quality of web search results and for the buyer's to directly match their needs with qualified vendors. A buyer's request can be broadcast to relevant sellers or service providers that can be preselected by the buyer. Such embodiments may take the burden from a buyer in finding the right products and services by self-qualifying the request to proactive prospective sellers.

18 Claims, 14 Drawing Sheets

PROVIDING RICH, QUALIFIED SEARCH RESULTS WITH MESSAGING BETWEEN BUYERS AND SELLERS

CROSS-REFERENCE TO RELATED APPLICATIONS

This application claims the benefit of U.S. Provisional Patent Application No. 62/203,246, entitled, "PROVIDING RICH, QUALIFIED SEARCH RESULTS WITH MESSAGING BETWEEN BUYERS AND SELLERS," filed on Aug. 10, 2015, which is expressly incorporated by reference herein in its entirety.

BACKGROUND OF THE INVENTION

This disclosure generally relates to an advanced web search service that returns results that include rich media content. This content may be qualified by the source provider, such as the publisher of an internet site or another source provider, to accurately summarize their original web pages. These results are presented to the user in a clear, consistent, clutter-free, uniform, and concise manner.

The search results may include relevant summaries, text content, images, photos, videos, contact emails, phone numbers, chat links, address locations, map links, and any application specific information such as open hours, product pricing, and so on. The types of the results provided may depend, at least in part, on the type of results that are sought by a user or a query from the user.

The users may choose to selectively communicate with the result sources who may be content/service providers and sellers of products by means of a broadcast messaging system.

The ranking of the results are made based upon previous experiences obtained from users through reviews, ratings, and recommendation for them based on their experience.

With current internet technology, internet users trying to search for information, content, product or services, get volumes of results. These results are fetched by bots that visit and gather content from websites all over the internet. However, these results may often lack in accuracy and quality. Most search engines use the same methods and display results which were pre-fetched results by bots. For example, these results may have display data containing a summary of the website, the URL, and a title. In addition, most search engines can obtain image search results or video search results separately for any search term.

The results from other websites, when presented to users, are included with advertisements and paid sponsorship results. The paid advertisements and the organic search results obtained through bots are separate and displayed separately within the same search results page. The organic search results obtained by bots may not be adequate, accurate, and may not be qualified. The paid advertisements may not easily trusted by the users, and the summary descriptions in those advertisements may be overstated to get high click through rates.

In order to find the right results and further locate and contact the source of the content, users of such a website may have to click and visit the volume of links in the search result pages. They cannot trust the links with the summary information and title alone. In some cases, the ability to click to call with a computer or a call back to a voice phone is provided for paid search results. Interaction between the buyers and sellers is typically seller-centric with advertisements and big data analytics that track the buyer and invade their privacy while those buyers are searching for products and services. Often what is available is limited to just what is posted by sellers in advertisements and the robotic results fetched by the search bots. There is a significant gap in the ability for the users to get validated summary results when they search and attempt to communicate with the sources of content.

Users quickly click on the results without entirely reading the summary text given the volume of results. Moreover, users are unable to communicate easily with the content providers and convey their needs easily to the potential sellers or content/service providers. When buyers search online, hours can be spent filtering the search results, trying to find the trusted match and contacting different sellers, repeatedly explaining what they need or what they are looking for. Users click on the top few listings and view the full sites and then may send a contact message or use the displayed phone number to call the source. Buyers end up reaching out to one, maybe two sellers. It is unlikely they are getting the best price, much less the best match.

A large percentage of content/service providers or sellers are not very savvy with advertising online and remain technically challenged with setting up websites, identifying the best places to advertise and optimizing their ads and website click rate performance. They invest in search engine optimization (SEO) tactics to get their sites ranked to show up in the first few results. Alternately they may subscribe to paid results and still need to manage the ad campaigns through keyword management, click through rate improvement and constantly mange bidding to pay more over the others and stay on the top ranking results. Owners of website are not able or allowed to edit the search results obtained by bots and qualify the results before they are displayed.

Even the databases that basic business information do not include desired contact information such as email or text message mobile numbers voice phone numbers and address. When they display contact information such as email address on their websites, those emails are harvested by spammers and misused to the extent that website owners never ever really check those emails for the valid contacts made. In the cases where they create a contact form instead, buyers have to fill out the contact form for each seller separately in different websites without any consistency and they are frustrated after they reach out to may be one or two sellers. There is also an inconsistency in their website layout, contact form presentations that makes it hard for the users to navigate, locate, and contact the Sellers.

Sellers buy display advertisements or auctioned keywords and pay per click or by page views. Sellers hope that interested buyers will click on their links, visit their website, and then contact them directly with a request that generates new business. Sellers get clicks by mistake, clicks just for a quick review of the website. They get charged for every click on their ad links whether they get a request or not. When they do get a real request for services, they pay for all the clicks it took to get there. The vast majority of sellers listed get nothing, while the vast majority of buyers simply do not click on advertisements or paid links.

Current search income depends on an auction methodology that encourages sellers to overbid the others and pay more to get the clicks they don't really need. Meanwhile, buyers are bombarded with advertisements that they do not really want. Their searches, emails and other personal and private information are tracked, resold, and exploited to generate revenues. No revenue is directly generated from organic search results, which represent a majority of the online sellers or content/service providers and they are stifled from making any changes to their own descriptive summary content. This bot based search results with click based advertising revenue model has not changed much since its inception more than a decade ago.

BRIEF SUMMARY OF THE INVENTION

In one embodiment, the present disclosure provides for a search engine results page with rich content including images, photos, videos, contact information, and other information pertinent to the search, the search results being obtained from one or more electronic database. The rich content is presented concisely with photo(s) or a video in addition to the title, summary information about the website and a link to click on. The total number of results is limited to 50-100 with emphasis on quality, real user experiences, and clarity unlike present search engines, returning hundreds of thousands or millions of results.

From the search results page, users can anonymously communicate with the content providers or message precisely the product or service that they want to purchase by posting an interactive request with details, not limited to a text message, photos, videos, audio and files. Sellers or content/service providers (which may be referred to as "providers") can then directly respond to those requests and communicate with the buyer (who may be referred to generally as a "user"). This embodiment enables the buyers or users who are already using the web or mobile applications to now communicate their interests in directly matching their needs with qualified sellers or content/service providers.

Embodiments of the present disclosure allow the owners of websites to claim their search engine result summary space in the displayed results page and add/update their summary content at any time to reflect accurately their website or product/service/business information. Owners of websites or content/service providers or sellers can add photos, videos, contact information, or other relevant information.

In another embodiment, a web page interface or a mobile web application may be provided to the content/service providers or sellers to manually enter or automatically update any data through an API. Examples of such real-time data include geolocation data, special offers, appointment times, open-now status, product inventory, pricing etc.

In another embodiment, the rankings of the results will be based upon the quality of the previous user experience, from viewing the search summary, reviewing the site content after clicking on the search results, the response rate to a submitted request message and the overall satisfaction of their interaction and quality of the transaction that occurred. Only users who interact directly with sellers/service/content providers may participate in the ranking.

Embodiments of the present disclosure broadcast a buyer's needs to multiple relevant sellers/service/content providers from existing and new web based services and mobile applications. Such embodiments may take the burden from a user trying to contact a content provider or a buyer in finding the right products and services by self-qualifying the request to proactive prospective sellers through existing and new web based and mobile messaging systems.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In one aspect of the present disclosure, a method for providing search results to a user is disclosed. The method includes providing, by a computer system, a user interface configured to allow the user to transmit a query to the system. The method further includes receiving, at the computer system, the query from the user, the query including a search phrase and retrieving, at the computer system, a plurality of search results from a database, the search results retrieved based at least on the search phrase included in the query from the user, each search result of the plurality of search results associated with a provider of a plurality of providers. The method also includes providing, at the computer system, the plurality of search results to the user, the plurality of search results including a second user interface configured to allow the user to contact two or more providers of the plurality of providers simultaneously, where each provider of the plurality of providers is associated with a search result of the plurality of search results. The method further includes receiving, at the computer system, a selection of two or more providers of the plurality of providers and a query, the selection of two or more providers chosen by the user from the provided plurality of search results and transmitting, at the computer system, the query to the two or more providers.

In some aspects, the method may also include providing a third user interface to a provider, the third user interface configured to allow the provider to establish a new provider account and to allow the provider to modify a search result owned by the provider and storing modifications made by the provider via the third user interface. In some aspects, each of the plurality of search results may further include contact data, the contact data including at least one of an email address and a phone number for a provider associated with a search result of the plurality of search results. The method may also include selecting an image for at least one search result of the plurality of search results, the image selected based on at least one of an image resolution, image dimensions, and image colors, and wherein the media content includes the image. The method may also include, prior to providing the plurality of search results, sorting the plurality of search result into an order, the order based at least in part on previous user experiences with at least one search result of the plurality of search results. In some aspects, the query may be selected by the user based upon a selection in one or more drop-down boxes. One of the one or more drop-down boxes may include context-dependent options, the context-dependent options based at least in part on the search query.

BRIEF DESCRIPTION OF THE DRAWINGS

The various embodiments are illustrated by way of example, and not by way of limitation, in the figures of the accompanying drawings as follows.

FIG. 14 illustrates a form that may be used to validate a phone number according to some aspects of the present disclosure.

FIG. 15 illustrates a form that allows a provider to enter the received code in order to validate a phone number.

DETAILED DESCRIPTION OF THE INVENTION

Figure 1:
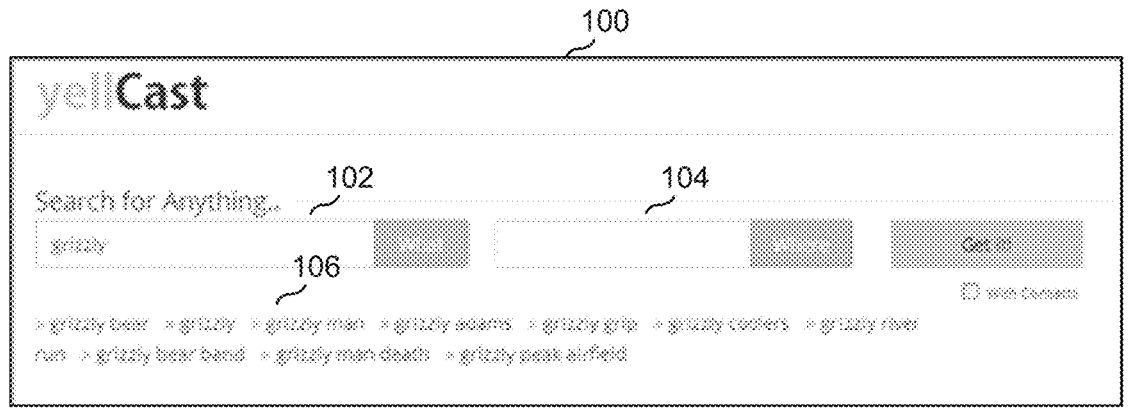
FIG. 1 illustrates a search box according to some aspects of the present disclosure.

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

In one embodiment, the present disclosure provides for a web search results page implemented by a web-based service. The web-based service might comprise computer systems, databases, and web server interfaces. These systems may include certain components illustrated in FIG. 12. For example, the system may include a central processing unit (CPU) 1230, RAM 1232, program storage 1234, a clock 1236, data storage 1238, a network driver 1260 operably connected to a network interface 1262, a central bus 1252, a keyboard driver 1240 operably connected to a keyboard 1216, a mouse drive 1242 operably connected to a mouse 1218, a display driver 1244 operably connected to a monitor 1220, a printer driver 1246 operably connected to a printer 1248, and graphics processor 1250. Each component may be included in a given system, or may be omitted. Certain components may also be combined. With such hardware, a provider of the service can accept requests from client systems to serve up web pages, obtain information from users of the service, and use the computer systems to generate responses. In this manner, users interacting with the web-based service would see and/or hear (via the buyer's client device, such as a computer with a browser, a smart phone, a smart watch, and/or a tablet computer that is connected to the Internet. According to one embodiment, a buyer may approach a website, for example using a browser, or access the web-based service using a downloaded mobile application on a user's smartphone, other mobile device, or a partnered website or mobile application. A "website" might refer to computer systems, databases, and web server interfaces that collectively provide and accept information for buyers and/or sellers.

The search results may include existing search results data obtained from search engines through their respective Application Program Interface (API) such as yelp.com, citygrid.com, yellowpages.com, google.com for local product sellers and service providers results and bing.com, yandex.com for general search results with or without a specific location. Images may be searched and obtained using bing.com or google.com image search or similar search engines through their API. New data may be obtained by fetching the content from those search result links and by parsing and extracting text, links to photos, images, and videos. The content fetching may be performed in real-time or offline by bots and saved to a database to be retrieved and presented when searched upon. The search engine APIs allow for search results to be fetched and get the title, URL, and summary description for each web link found.

Some embodiments of the present disclosure include searching for photo(s) for each of the search result by creating a search phrase with the user search phrase and the search result top level domain name. The images and videos thus obtained would be relevant to each search result and they are displayed alongside the summary description.

The images, photos, and videos may be fetched from each search result with the search phrase from image search engines through their API as well by searching for links referenced by <img src=" html parameters.

Figure 5:
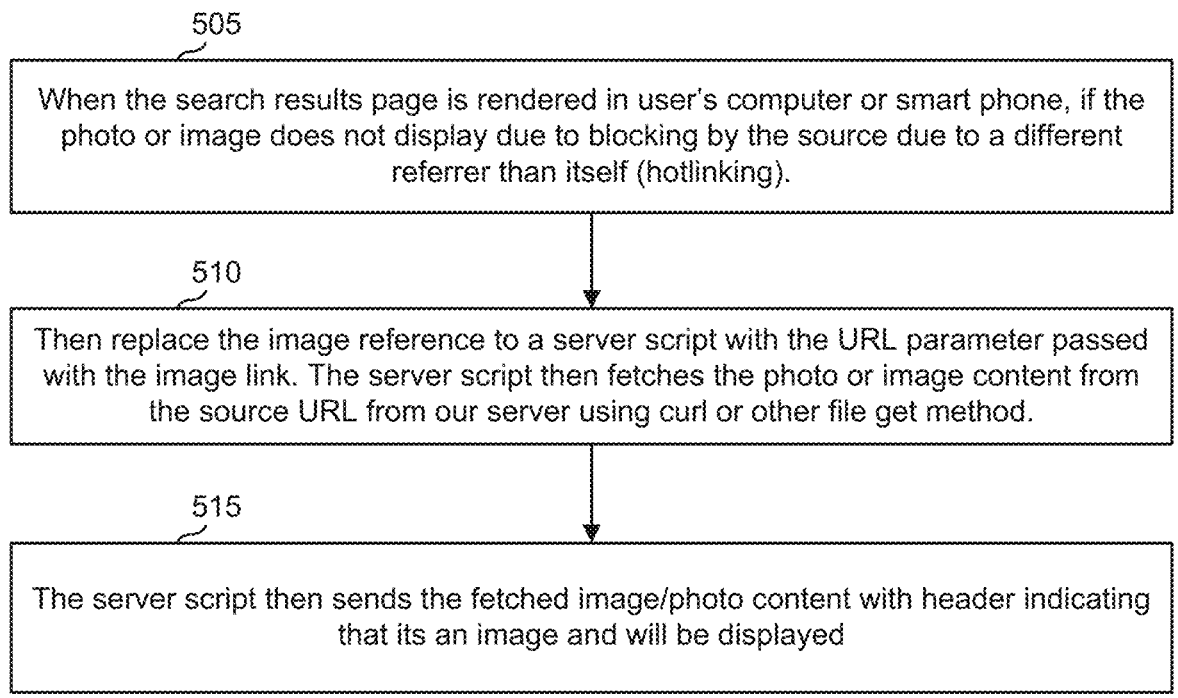
FIG. 5 illustrates a method for displaying images according to some aspects of the present disclosure.

The images and photos extracted from the websites and through image search engines can be selectively used based upon their dimensions, image resolution, image colors, and other factors. The extracted images do not have to be downloaded, and may be referenced by the extracted image link and used to display in the search results page. Examples of search results pages may be seen in FIGS. 2 and 3, for an exemplary search on grizzly bears. However, for images which are blocked by the source server due to "hotlink prevention" preventing clients with a referrer tag that's different from its own domain name, the server may fetch the actual image data and relay the content as an image data to the user. FIG. 5 provides more details on certain methods that may be used to allow hotlink-protected images to be rendered in the search results page. Other methods may also be possible as well.

Additional text description summary may be fetched from the content with the page of each search result. For example, this may be done using the HTML paragraph delimiters <p> or Meta tag description of the web page <meta name="description" content=".

The contact data including phone numbers and email addresses are extracted from the content obtained by fetching each search result page or the content from the contact page, mostly linked with the name containing "contact" in the URL. In addition, the extraction of emails is done within the html tags of mailto: Phone numbers are extracted with typical phone number patterns such as (510) 555-1212, 510.555.1212, and soon. Other techniques for extracting various data from a website may also be used, and these techniques are merely exemplary.

In some aspects, users may enter location into a user interface based upon the city and state or zip code or obtained automatically obtained through the browser or GPS in the mobile device or IP address of the user. When geolocation is present, the search results may be fetched from local type of data APIs, such as an API which may provide a user's location to the system. Alternately, general search engines may be used to fetch location-based results by, for example, concatenating the user search term with "in" the specific location entered. As illustrated in FIG. 1, a user may provide a location for a search as desired or other geolocation techniques may be used, such as GPS or locating an IP address. For example, the "where" field may be provided to a user to allow the user to fill out a location. If the user declines to fill out a particular location, the field may be populated based on GPS data or other location data automatically. In some aspects, the field may be populated based on the search query of a user. For example, if a user searches for "grizzly," the system may infer that the user is not concerned with a particular location, and may choose not to populate the where field with a location. However, if a user searches for "auto glass repair," the system may infer that a user is concerned with a particular location, and the system may automatically populate the where field, such as with a user's location based on data API, GPS, IP address, or other sources of location information.

As illustrated, the search may provide auto suggestion results for typed search phrases. For example, if a user types "grizzly," a number of different search terms may be suggested based on this partial search, such as "grizzly bear." A user may then choose from among the suggestions or may continue typing their query.

Figure 7:
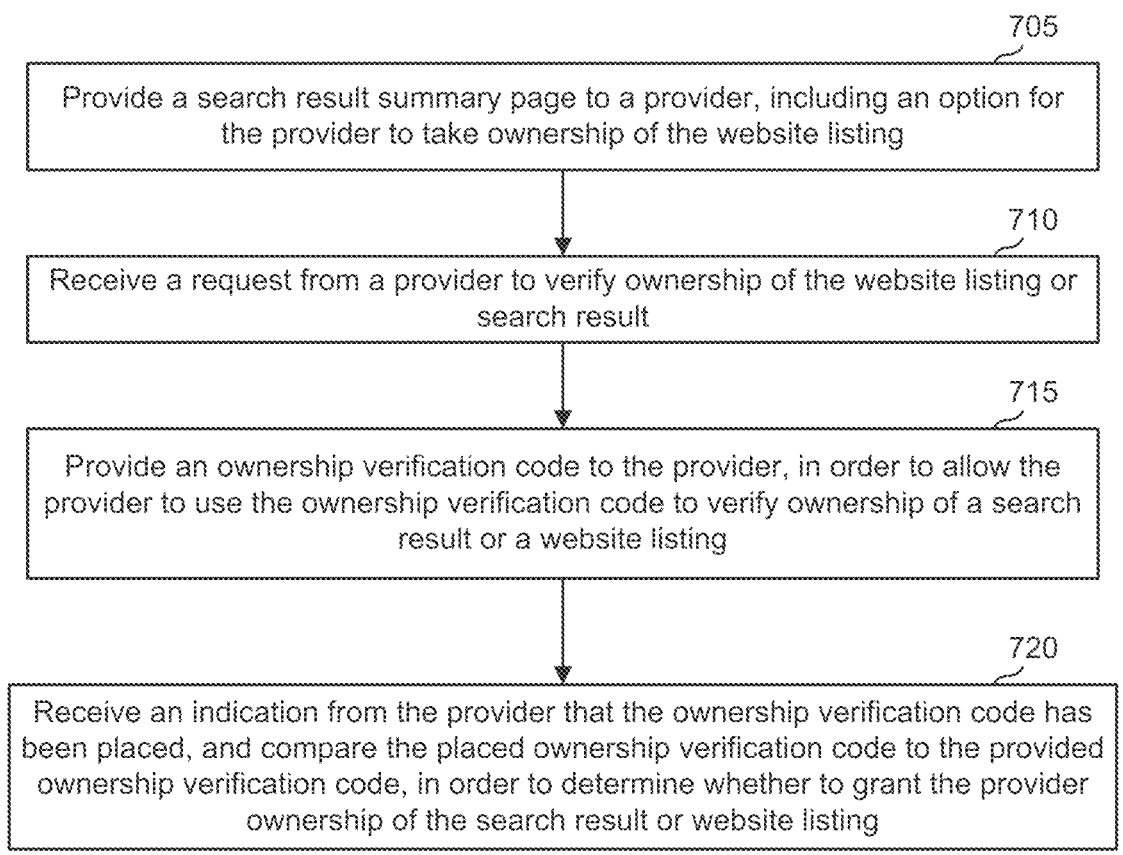
FIG. 7 illustrates a method for a content provider to be identified to enable the content provider to edit search result descriptions.

The search results may also include validated content by the web site owners once they sign up and update their summary content. To verify ownership of the seller/content/service provider who wants to make changes to their business information or search summary of their website, a random short code is generated and sent to their phone as a voice message or text message or a long code to be posted on their website. Once they enter the code sent to them that matches what's saved in the database or they have created the web page with the code provided, it is verified by fetching and matching that page from their domain with what was sent to them. FIG. 7 illustrates one possible method that may be used to allow a content provider to verify ownership of a particular business or web site, in order to allow that content provider to optimize the way their business and website appears on search results. This method may be done by a system, such as one or more computers, in order to offer the ability for content providers to verify ownership of a search result such as a website listing, in order to take ownership of that search result. In this method, at block 705, the system provides a search result summary page to a provider, with an option for the provider to take ownership of the website, or search result, listing. This may allow a content provider to view their search result summary and click to take ownership, after signing up. For example, the owner of a web page may view the summary of their page, and sign up to take ownership of that page.

At block 710, the system receives a request from a provider to verify ownership of the website listing or search result. For example, the content provider requests for an ownership verification code to be sent to them or displayed on the web page by clicking a menu option. For example, the code may be sent via phone, email, text, or another electronic method of communication.

At block 715, the system provides an ownership verification code to the provider, in order to allow the provider to use the ownership verification code to verify ownership of a search result or a website listing. For example, the content provider receives the ownership verification code, such as via email, text, phone, or on a web page, and enters the code or creates a web page containing the code sent to them and then requests verification. For example, the code may be placed on a page named verify.html or another name, on the relevant web site, in order to verify that the content provider is, indeed, the proprietor of that particular web site.

At block 720, the system receives an indication from the provider that the ownership verification code has been placed, and compare the placed ownership verification code to the provided ownership verification code, in order to determine whether to grant the provider ownership of the search result or website listing. For example, the code sent to the Seller/Content/Service provider is compared to the entered code. If the codes match, ownership is established, allowing the owners to add, edit, or modify their content (text summary, photos, videos, contact, hours of operation etc.). For example, an online dialog may be presented to content owners in order to allow them to configure their search results to best describe their web site and their business. For example, an owner may be able to configure the descriptions in order to give users the best possible picture of what is contained on a given site, to provide updated contact information such as phone numbers, to include updated business hours, and other options.

Figure 2:
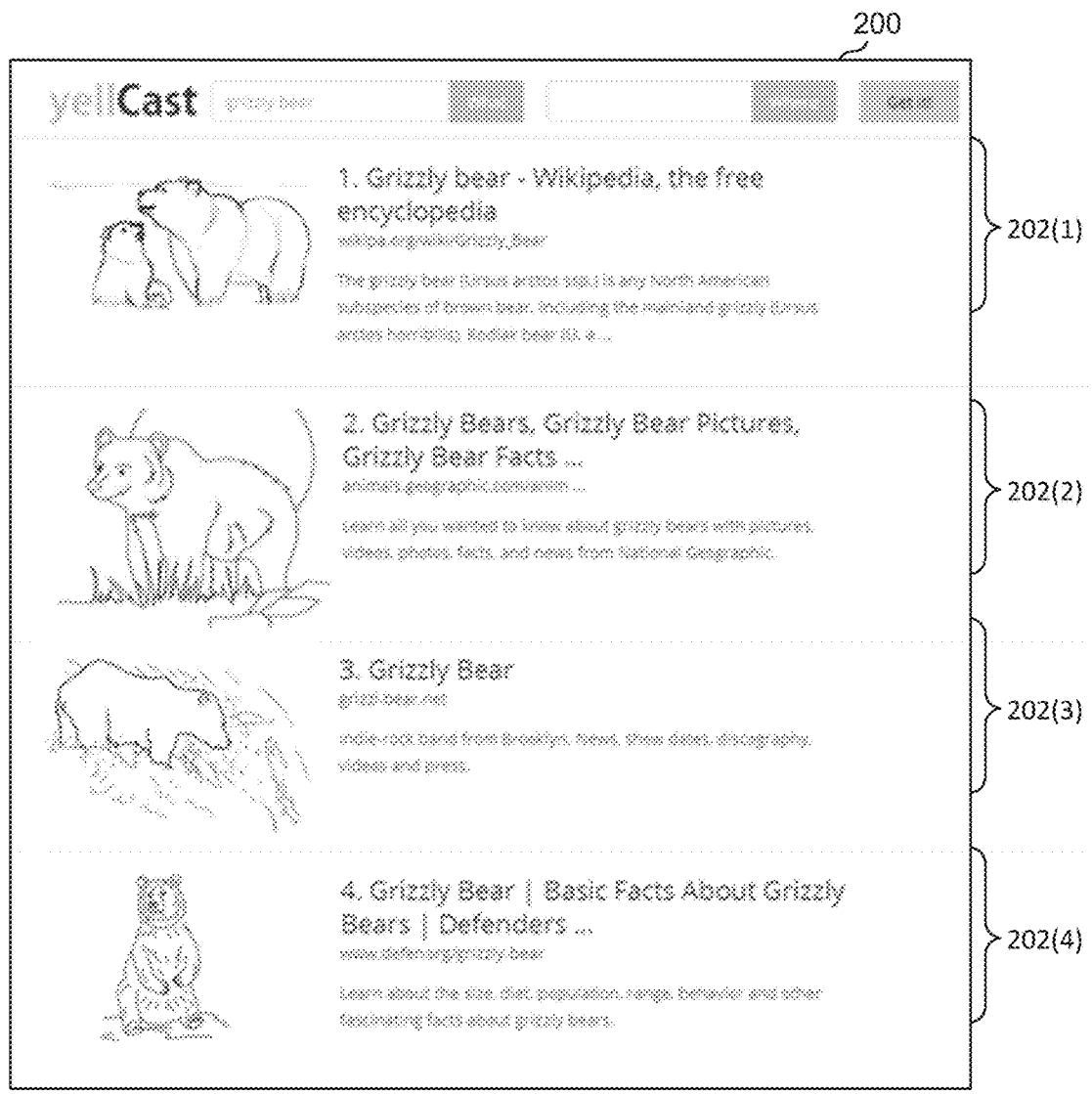
FIG. 2 illustrates search results which include rich media content such as images.

Users are presented with uncluttered, clear and concise results page for their searched phrase, as illustrated in FIG. 2. The results are aligned with a consistent look and feel to enable the users to quickly and visually compare the listed results. If there are multiple photos to display, an image display rotator with buttons to switch to the next photo in the same space is created. The photo(s) or video are displayed in line with the content summary. Some of the contact information such as their email or phone number may be masked or not displayed to prevent spammers from harvesting it for misuse. However, the system will automatically send the message when they use the select and send button to send the message through a contact form.

Figure 3:
FIG. 3 illustrates additional search results which include rich media content such as images and offer contact information.

Buyers using the search system described herein fast-track their search by choosing and reaching multiple sellers with the same request. They select the checkbox or button in front of each search result for each seller they decide to contact, as illustrated in FIG. 3. For example, buyers may select a subset of search results to contact, using checkboxes, or another means. For example, a buyer may select the first, third, fifth, and seventh result, as desired. A buyer, or user, may then be offered the option to contact each of those four results, or the owner of those results, and ask them all a question. For example, if the search is for auto glass repair, the buyer may ask each business about their hours, pricing, and whether a certain car's windshield is in stock. The buyer may personally choose which of the options to ask, and the interface for asking such questions may allow the buyer to ask the same, or substantially the same (e.g., changing the name of the business in each message) question of each result. Accordingly, a buyer may be able to contact a number of different sources simultaneously, while personally selecting which sources to contact, and controlling the message sent to each of those sources.

Figure 6:
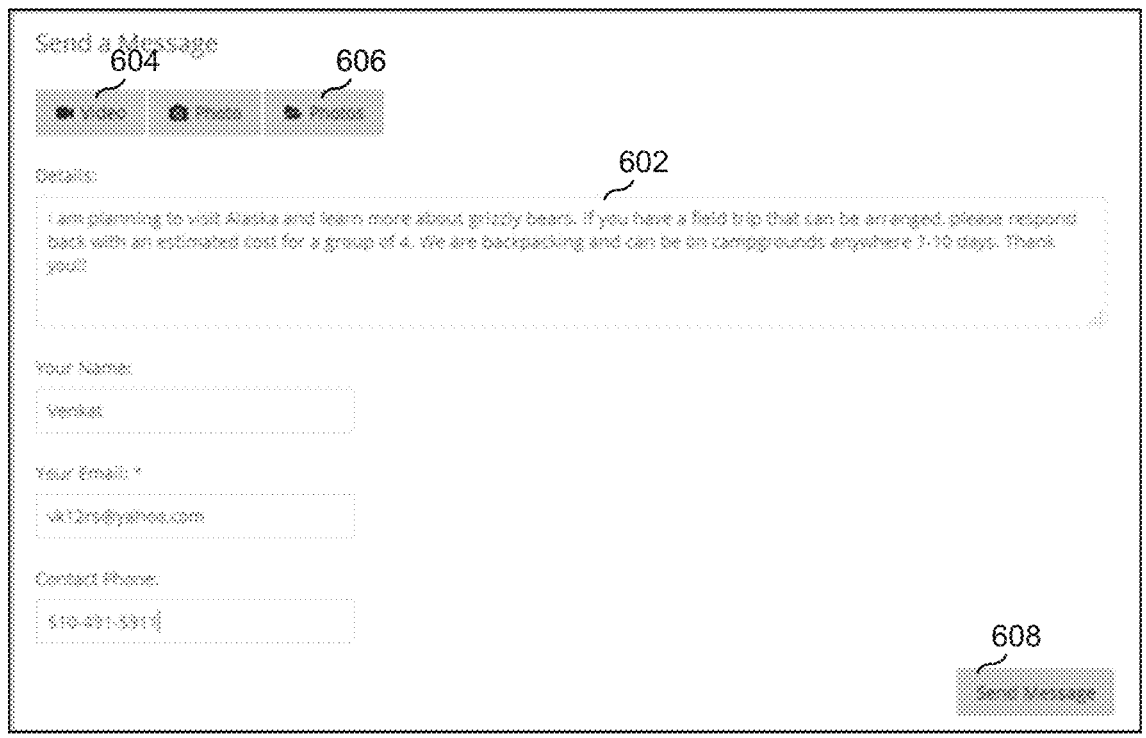
FIG. 6 illustrates a form that may be used to send messages to multiple contacts at once according to some aspects of the present disclosure.

Portions of a buyer interface are illustrated in FIG. 6. Buyers can type a text message request 602, record a video 604 or upload photos 606 and send it 608 to all selected sellers at once. They can specify price and outline any other requirements they may have. They can choose to remain anonymous. What personal data is saved is at the discretion and control of the buyer. There is no mobile application software download and install that is required. Buyers save time, get better pricing and get the best match online or on their mobile devices.

With every selected check box, sellers receive an actual request message via phone, text, or email from a motivated buyer. The way to reach the sellers by their voice phone enables the service to reach those sellers and service providers who were not reachable except through their voice phone when the buyer called them one by one. These sellers/content/service providers may not advertise on line and may or may not have a web presence, The system presented enables a highly scalable automated seller and service provider reach platform to connect them with motivated buyers in a more contextual and instant manner.

The sellers can review the requests and the ones that are not relevant can be ignored at no cost. Only when sellers accept and pay to respond to the request do they get to connect with the buyer. Sellers get more relevant requests at a fraction of the cost of their current online advertisement buy, which is beneficial for sellers. Since the buyer is choosing multiple sellers, the value of paying for the first advertisement position declines in proportion to the number of sellers chosen, allowing sellers to conserve advertising dollars compared to other approaches to web-based advertising.

Figure 9:
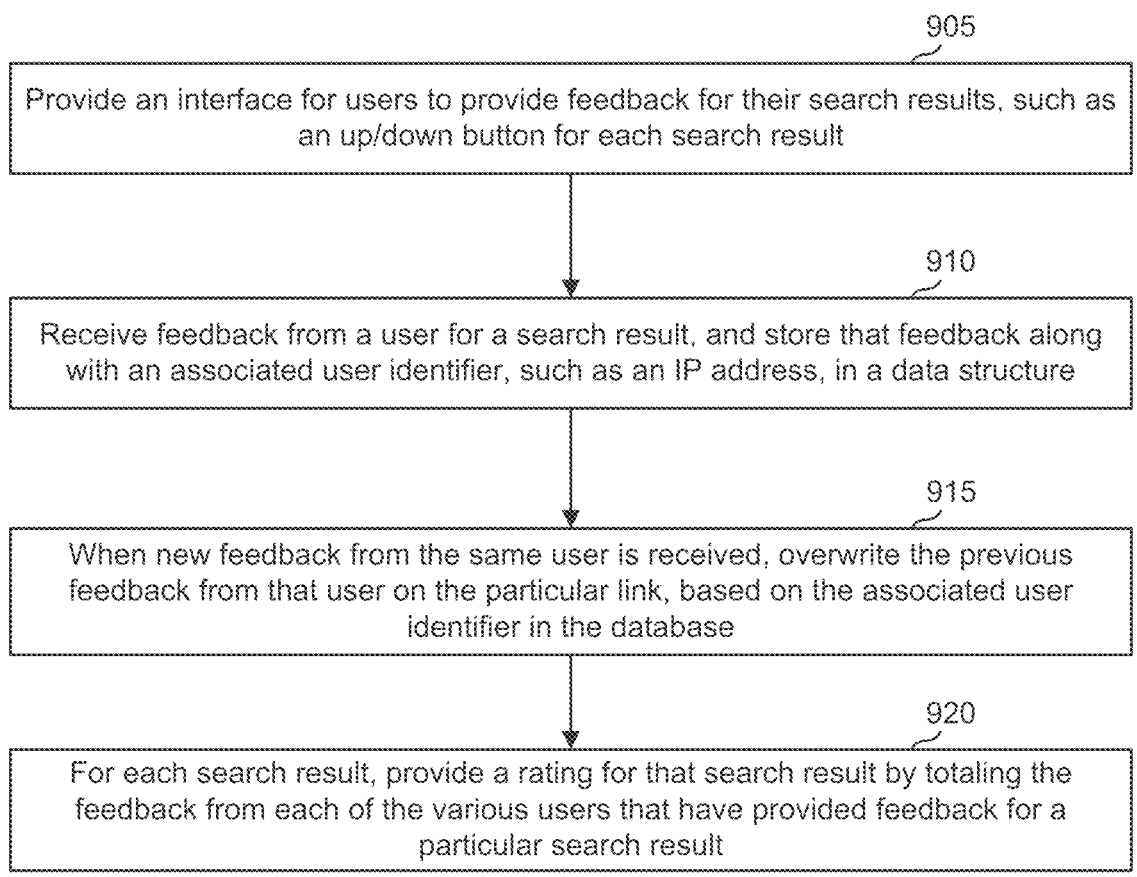
FIG. 9 illustrates a method of allowing users to rate search results and using those ratings for future searches.

The web-based service may include a built-in customer relationship management (CRM) and analytics engine to manage the requests and convert prospects to customers. The built-in CRM eliminates the need for data to be moved from one system to another: from the initial request obtained from web search requests to a contact management software and then re-entered or migrated to a service management software for quotations, service orders, invoicing and accounting software for payments and collections. The built-in CRM helps manage the entire customer acquisition, service delivery and revenue collections process without the need for the sellers to make manual data entry into multiple information systems or develop any APIs to transfer data between multiple information systems, Search results may be ranked by actual previous user experiences. In some aspects, the users may simply click on a button if they like the search results summary and the likes count are filtered with the user's IP addresses to prevent redundant likes from the same user. FIG. 9 illustrates one method than may be used to provide an exemplary interface, allowing for users to rate search results individually. These ratings may be used, at least in part, to sort search results to ensure that future searches return the most relevant possible results based on the available data. Both buyers and sellers may also be ranked by the number of actual requests received, seller responses made, and completed transactions, among other possible factors. Sellers may not be able to add fake reviews or recommendations, as only actual buyers and sellers who sent the request and received responses may provide a ranking or a "like." This information may be used to rate and rank both buyers and the sellers. Additional criterion may include the number of sellers who were sent the request and the number of responses that were received for the same request to validate that it was not a fake request/response generated by any one sellers just to improve their own rating and ranking. Other metrics may also be used to ensure that certain sellers do not "game" the system in order to artificially inflate their own ranking.

A search provider, such as one who operates the system described herein, and optionally its partners who provide content and drive traffic can receive shared revenue from four, five, or even more sellers for each unique buyer request. Each seller may pay in real time for an accepted request that they decide to respond to. With each checked organic search result, a search provider and its search partner can acquire a new customer who more than likely has not previously bought web advertisements. Accordingly, the system may be advantageous for both a search provider and for those who drive traffic to the search provider.

The request-based engine described herein brings sellers steps closer to motivated buyers and significantly reduces the cost of advertising inherent in a click-based model. Sellers save on their advertising costs, buyers save time, convey and get exactly what they want. Since the buyer is requesting exactly what they want, and where and when they want it, the value of tracking the buyer's personal data significantly diminishes. Search partners get a scalable new local and national revenue source and new customers without the added cost of a local sales team.

Embodiments described herein may include any of the following features. A request-based online marketplace matching of buyers and sellers or service providers based upon the requests made by the buyers. Buyers can remain anonymous until they decide to reveal their identity. Buyers may use an intermediary system to relay their requests to sellers anonymously, and further communications may be conducted through message notifications through mobile applications, emails, text messages, phone calls, or web pages. A request-based online marketplace may also provide search and matching algorithms that prequalifies a seller and service provider with reviews, ratings and other credible information including photos, videos, accreditations, certifications, and other credentials. A request-based online marketplace may source the matched sellers and service providers from other third party websites through APIs. The information sourced from those third party websites may include photos, videos, reviews, accreditations, certifications, open hours, location, distance, business history, and features of their product or services and business information. The search matching may also include other search engines. The search results data may be obtained by transmitting the search phrase and receiving the results through an API that typically include the title, a summary description of the web page and the URL address to the web page. For each search result, a similar query may be transmitted to request relevant images, photos, and videos. The search query may be composed of the user's search phrase and each of the search results URL domain name. Further, the photos, images, and videos may be obtained by fetching the content for each of the search result using the URL and parsing for photo links and video links within the content. The photo links and video files may then be presented for each search result along with the summary content to represent a clear and concise summary version of the actual web page when clicked upon. When the search results are obtained without any contact information, the system may include a parser that retrieves the web page data from the search results URL, searches within that text for a contact page URL, fetches the contact page URL and parses that contact page text and html code to get a contact email and phone number if available.

Since the system knows both the buyers who sent their request and the sellers or content/service providers who were contacted, enables to validate the matched buyers and sellers and ask them about their experience, including if they actually did the business transaction and if they had a positive experience and if they would recommend it to others.

The search without location information is referred to as General Search results and ones with the location are referred to as Location based Search results. The nature of the search may be with or without the location information. A search results page, for example, may search for the requested matching content web sites, product or service from multiple external sources such as listing services like Bing, Google, Yandex, for general search results and Yahoo, Yellowpages, Yelp, CityGrid, etc., or find matched sellers or service providers from databases such as Acxiom, Infogroup, Localize, and others for Location based Search results. The matched results may include reviews, ratings, distance from the buyer requested location, hours of operation, history of business, accreditations, certifications, photos, and videos. In addition, there may be discounted offerings for their product or service made available. The buyer is enabled to send their request to multiple of the sellers or service providers to get responses from anyone who can best service their request.

Other exemplary features of the request-based online marketplace may include the following: Providing the site free to buyers. Requiring sellers to pay a subscription to obtain information about a buyers request or respond to the requests that they are interested in. For example, requesting periodic subscriptions such as monthly or yearly subscriptions. The price for a subscription may vary based on location and category. Other subscriptions may require fees from the seller based on the number of transactions, the amount of a transaction, the number of notifications, or matches per cycle or a fee to respond to the request. The website may include content owners to take ownership of the business information or content to validate and update their summary content for a fee. A reward may be returned to the buyer, as a percentage of the transaction, based on which, the search provider may get a percentage of the transaction.

The selected sellers will initially receive notification of each request through an automated phone call/voice message that directs them to the search provider website or the co-branded site. Using their phone number, they can find their free requests, choose, and send messages directly to the buyer, and sign up to get future requests via text or email. The sellers once signed up can select their preferences to receive further requests via voice calls or text messages to their mobile phones or email. The seller might receive as an example, five free requests, after which if the seller would like to respond to the next buyer's request, will pay a small fee for every accepted request. Each buyer's request might generate fees. Alternately, the seller may agree to pay a percentage of the revenue earned through the request to the search provider. Alternately, the cost to respond to a request may be a dynamic variable that is dynamically calculated and presented to the seller, determined based upon their response time rate of responding to previous requests, their ratings as obtained from previous buyer experiences and the value of the connection for that specific search category or phrase. This integrates search and messaging into a performance based request/response-connection revenue stream.

While the principles of the disclosure have been described above in connection with specific apparatuses and methods, it is to be clearly understood that this description is made only by way of example and not as limitation on the scope of the disclosure.

Implementation in Program Code:

Various implementations of the present disclosure are found in Appendices A-G, below. This implementations show certain implementations of some aspects of the present disclosure.

FIG. 1 illustrates a user interface 100 that accepts searches according to some aspects of the present disclosure. For example, a search box 102 may be presented to a user, and the user may specify a search query in search box 102, and optionally a location in a location field 104. The user may also be offered an option to show results either with or without contact information. The user may be presented with auto-suggested search terms as well, in a suggestion area 106 of user interface 100, based upon a user's search terms as they are being entered and/or after they are entered. This user interface might be part of a larger user interface, such as a web browser interface presented to the user on the user's computing device and/or as a mobile app display on a mobile device such as a smartphone that includes software to execute and operate apps that the user might have downloaded or otherwise activated.

FIG. 2 illustrates a search results display 200 that includes rich media content, such as images. These search results may be presented as a rendered web page, such as a hypertext document downloaded or obtained from a search server remove from the device displaying search results display 200. As illustrated, each search result entry 202 (examples provided as 202(1) through 202(4)) may include multiple types of information, including an image, a title, a description, and a URL. Other information may also be included.

FIG. 3 illustrates additional search results 300 that include rich media content such as images and offer contact information. Here, contact options checkboxes 302(1)-302(4) are shown, which may allow a user to contact multiple content providers or sellers at once, in order to ask them questions or attempt to price out services. As illustrated, contact options checkboxes may be available for all of the results, or only for a subset of the results. For example, if the search results were for "plumber" instead of "grizzly bears" there might be more contact options checkboxes.

In some aspects, a provider may create a new provider account, which may enable that provider to modify the search results displayed for that provider's content. For example, the provider may be allowed to alter the title, summary, or image used for a particular search result, although the provider might not be allowed to unilaterally determine whether their search result entry appears for a given search.

Figure 4:
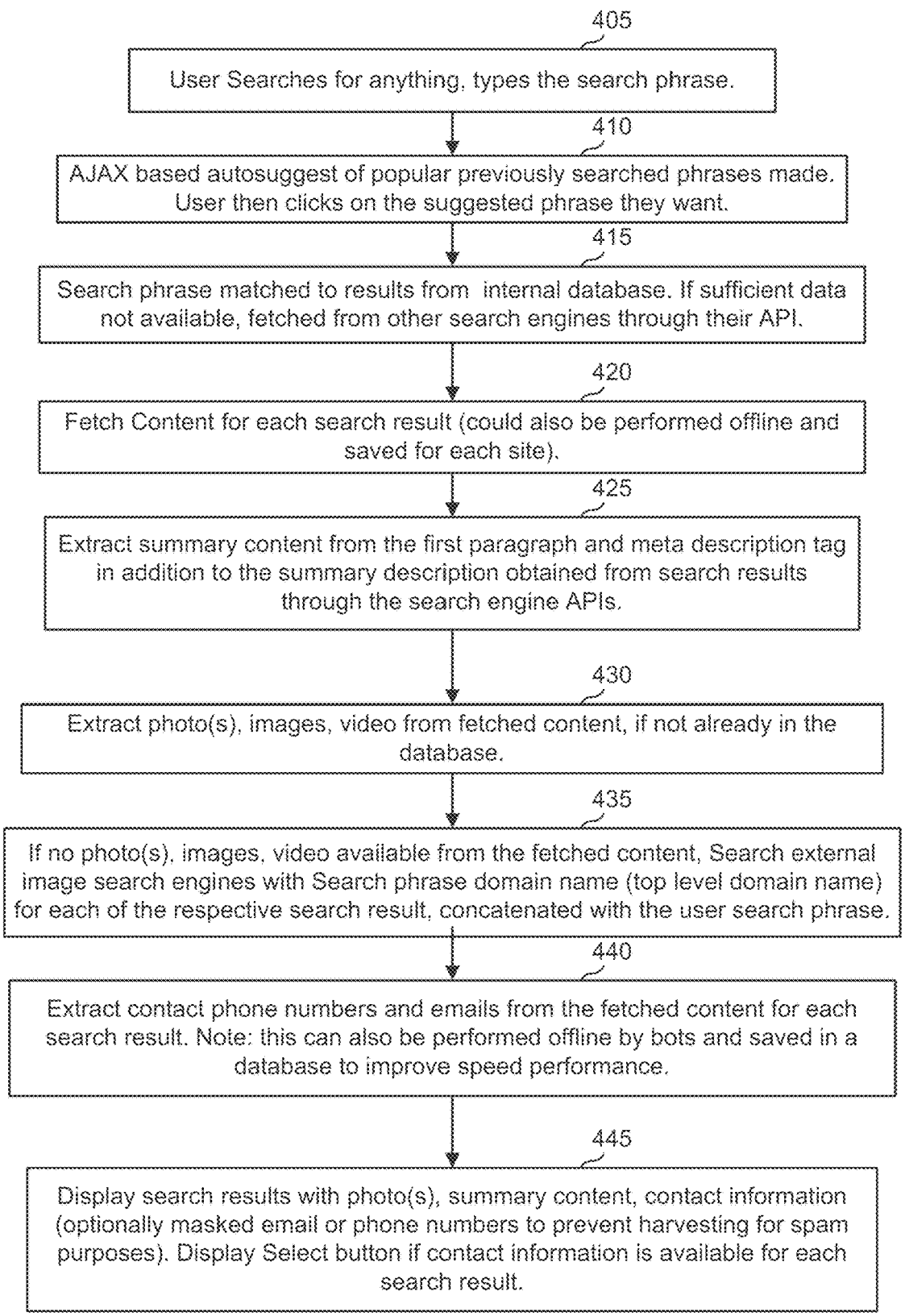
FIG. 4 illustrates a method for providing a user with rich media search results according to some aspects of the present disclosure.

FIG. 4 illustrates a method for providing a user with rich media search results according to some aspects of the present disclosure.

At block 405, the user searches for a particular phrase, such as by typing the phrase. A system may be configured to provide an interface to allow a user to search, and to receive such a search from a user. At block 410, an autosuggest feature, such as using AJAX or another implementation, may suggest popular search terms based on a partial search term. This may be based on previous searches, by a user or by other users. The use may click on a suggested term to complete the search phrase. A system may be configured to provide such a suggestion box, and to accept such a suggestion that has been selected by a user. At block 415, the search phrase is matched to results, such as from an internal database. Certain search phrase may also be matched to an external database, such as by using an API call to another search engine. For example, the system may be configured to receive a search and to search one or more databases based on the receive search. The system may further return results from such a search to a user.

At block 420, content is fetched for each search result. This may be done after a user searches, or may be done prior to receiving a search, such as doing this offline and caching the data. The system, for one or more results received from a database, may be configured to fetch content for that result. At block 425, the engine or system extracts summary content from various sources on a web page or other search result. For example, it may extra information from the first paragraph and meta description tags, in addition to the summary description obtained from search results through the search engine API. The summary content may include text content found on the webpage, in its title, in various meta tags related to the document, in documents describing or linking to the document, or from other sources. At block 430, the engine or system may extract rich content, such as photos, images, videos, and other content, from fetched content, if that rich content is not already in the database. At block 435, if no rich content is available from the fetched content, the system or engine may search external image search engines with a relevant query (such as the search phrase and a domain name) for each search result, in order to return images or other rich content related to a particular fetched result.

At block 440, contact phone numbers, emails, and other contact information may be extracted from the fetched content by the system. This may also be done offline by bots or other devices, and saved in associated with a particular search result. Saving this information offline may allow for results to be returned much more quickly. Other search results, such as rich content, may also be extracted offline, prior to a user entering a search. Such caching may be advantageous generally. At block 445, the engine or system displays search results, including the rich content and contact information (perhaps with masked information to prevent harvesting). A selection button is provided to users to select the search results that the user wishes to contact. Accordingly, the method of FIG. 4 may allow a system to return rich search results, allow a user to contact the owners of the search results, always be as up-to-date as possible, and generally provide a high-quality internet search experience for users, and a great opportunity for inexpensive and effective marketing for providers.

FIG. 5 illustrates a method for displaying images according to some aspects of the present disclosure. At block 505, when the search results page is rendered in a user's device, if the photo or image does not display due to blocking by the source due to a different referrer than itself (hot linking). This may be problematic. The system may detect that certain images may not render due to hotlink protection, such as by attempting to render the image itself, or using a VPN, spoofing a web address, or another connection that might be deemed hot linking. At block 510, the image reference may be replaced using a server script with the URL parameter passed with the image link. The server script fetches the image from the source URL using curl or another method. For example, a system may automatically detect images that have hotlink protection, and may fetch those images itself, and replace the image URL in a resulting webpage with a local address with the image may be stored, or use another method to transmit an image to a client. At block 515, the server script sends the fetched image with appropriate header information to a user for display. In this manner, an image with hotlink protection may instead be fetched by the server and returned to the user, in order to allow the user to view the image.

FIG. 6 illustrates a form that may be used to send messages to multiple contacts at once according to some aspects of the present disclosure.

FIG. 7 illustrates a method for a content provider to be identified to enable the content provider to edit search result descriptions.

Figure 8:
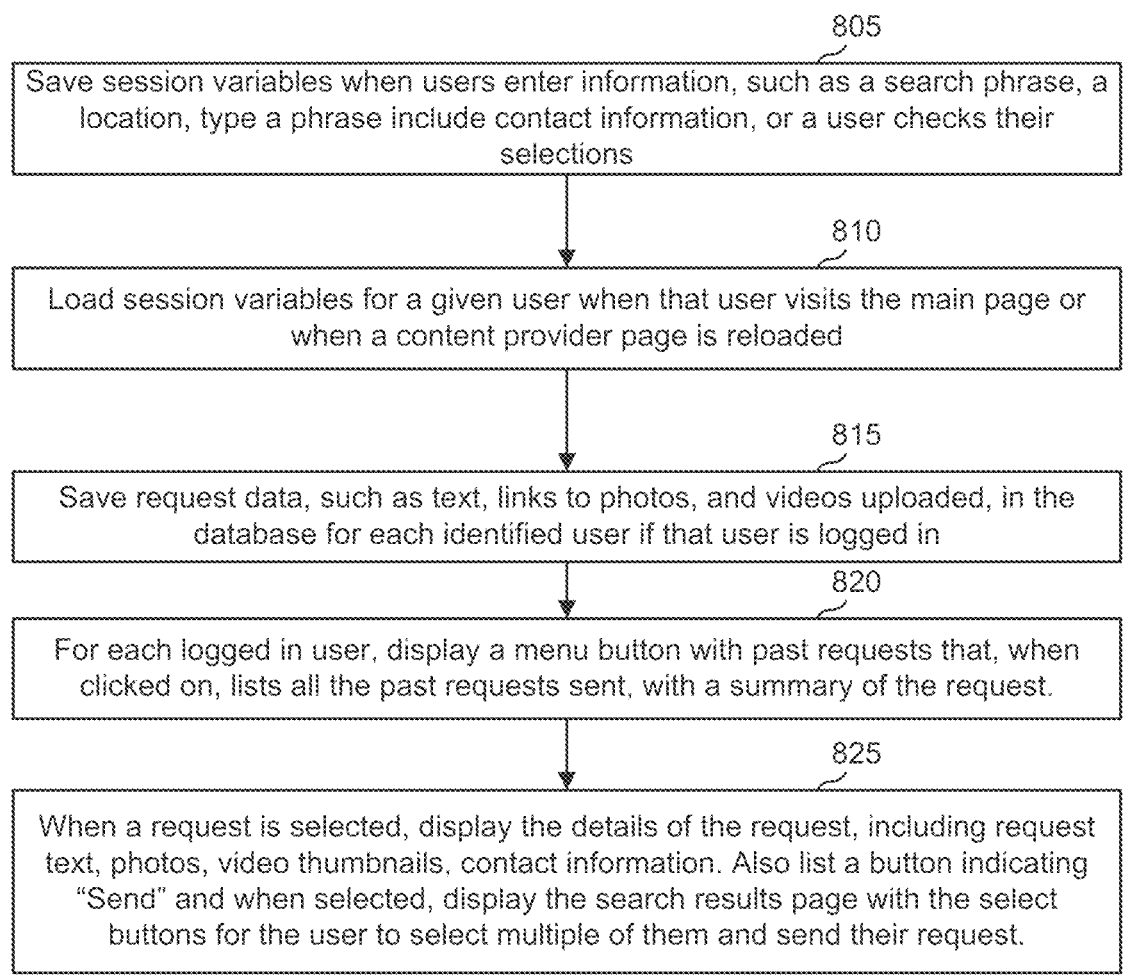
FIG. 8 illustrates a method of providing users with a listing of their past searches and requests to vendors.

FIG. 8 illustrates a method of providing users with a listing of their past searches and requests to vendors. At block 805, the method includes when users enter information, such as a search phrase, a location, type a phrase include contact information, or a user checks their selections, this will be saved in session variables. For example, a system may be configured to save session variables based on user input. At block 810, when the user visits the main page or when a content provider page is reloaded, the session variables, such as search phrases, locations, contact information, and selections, are loaded for that user. For example, the system may load session variables for a given user when that user visits the main page or when a content provider page is reloaded. At block 815, the system further saves request data, such as text, links to photos, and videos uploaded, in the database for each identified user if that user is logged in. At block 820, the system, for each logged in user, displays a menu button with past requests that, when clicked on, lists all the past requests sent, with a summary of the request. Other information about the requests, such as a date and time of each request, is also saved. At block 825, the system, when a request is selected, displays the details of the request, including request text, photos, video thumbnails, contact information. The system also lists a button indicating "Send" and when selected, displays the search results page with the select buttons for the user to select multiple of them and send their request.

FIG. 9 illustrates a method of allowing users to rate search results and using those ratings for future searches. At block 905, the system provides an interface for users to provide feedback for their search results, such as an up/down button for each search result. At block 910, the system receives feedback from a user for a search result, and stores that feedback along with an associated user identifier, such as an IP address, in a data structure. For example, the data structure may include a database. At block 915, the system, when receiving new feedback from the same user, overwrites the previous feedback from that user on the particular link, based on the associated user identifier in the database. At block 920, the system, for each search result, provides a rating for that search result by totaling the feedback from each of the various users that have provided feedback for a particular search result.

Figure 10:
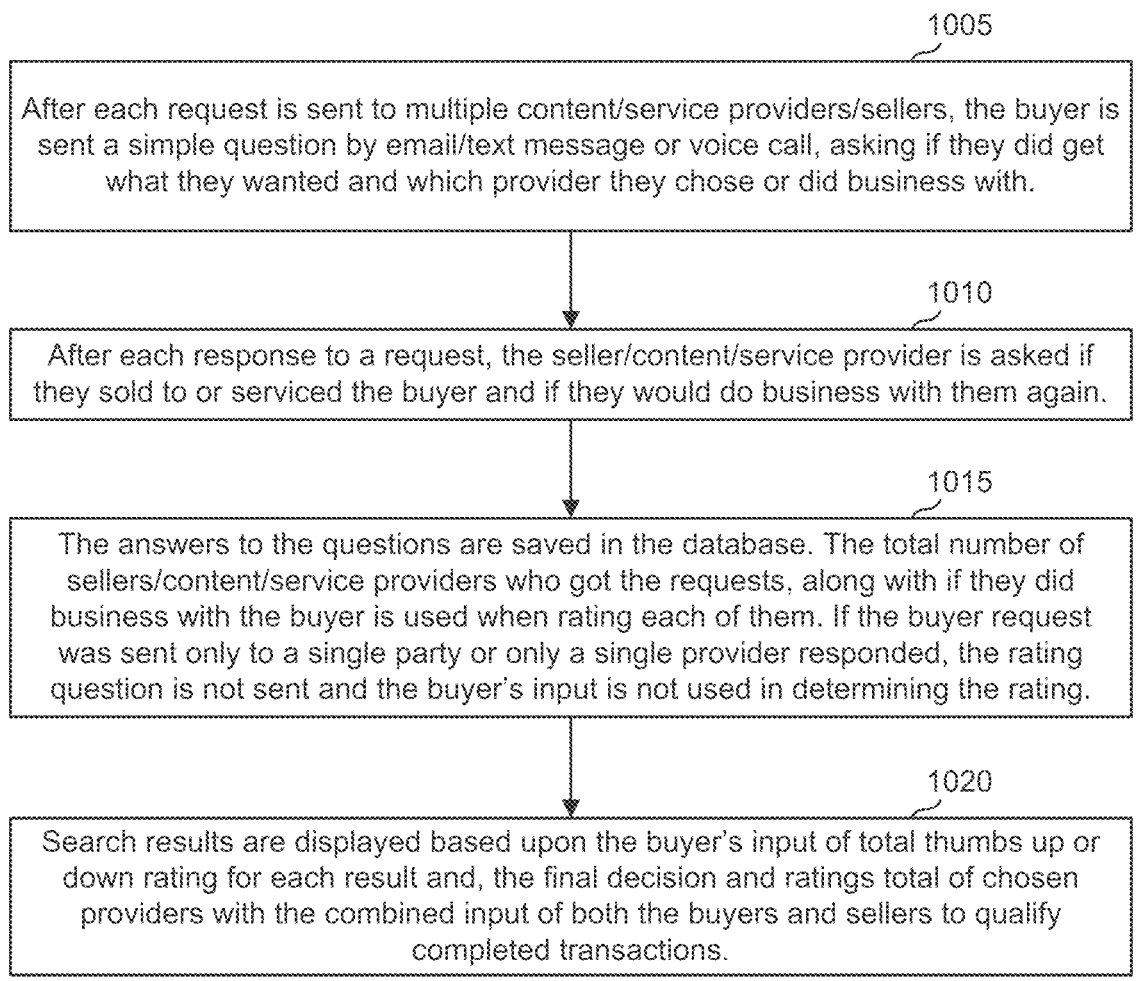
FIG. 10 illustrates a method of obtaining feedback from both buyers and sellers, and using that feedback to improve search results.

FIG. 10 illustrates a method of obtaining feedback from both buyers and sellers, and using that feedback to improve search results. At block 1005, after each request is sent to multiple content/service providers/sellers, the buyer is sent a simple question by email/text message or voice call, asking if they did get what they wanted and which provider they chose or did business with. In some aspects, the system transmits one or more questions to a buyer after a request is sent to one or more providers. The system may also be configured to receive a response to the question. At block 1010, after each response to a request, the seller/content/service provider is asked if they sold to or serviced the buyer and if they would do business with them again. For example, the system may be configured to transmit one or more questions to providers after a given provider is contacted with a buyer. At block 1015, the answers to the questions are saved in the database. The total number of sellers/content/service providers who got the requests, along with if they did business with the buyer is used when rating each of them. If the buyer request was sent only to a single party or only a single provider responded, the rating question is not sent and the buyer's input is not used in determining the rating. The system may be configured to receive the answers to the one or more questions, from both buyer/users and sellers/providers. The system may be configured to store those response in a database. At block 1020, search results are displayed based upon the buyer's input of total thumbs up or down rating for each result and, the final decision and ratings total of chosen providers with the combined input of both the buyers and sellers to qualify completed transactions. For example, the system may be configured to display a number of search results. The system may be configured to display the results based at least in part on feedback for the given results, which may be used by the system to affect the order of the results, and/or whether certain results appear at all.

Figure 11:
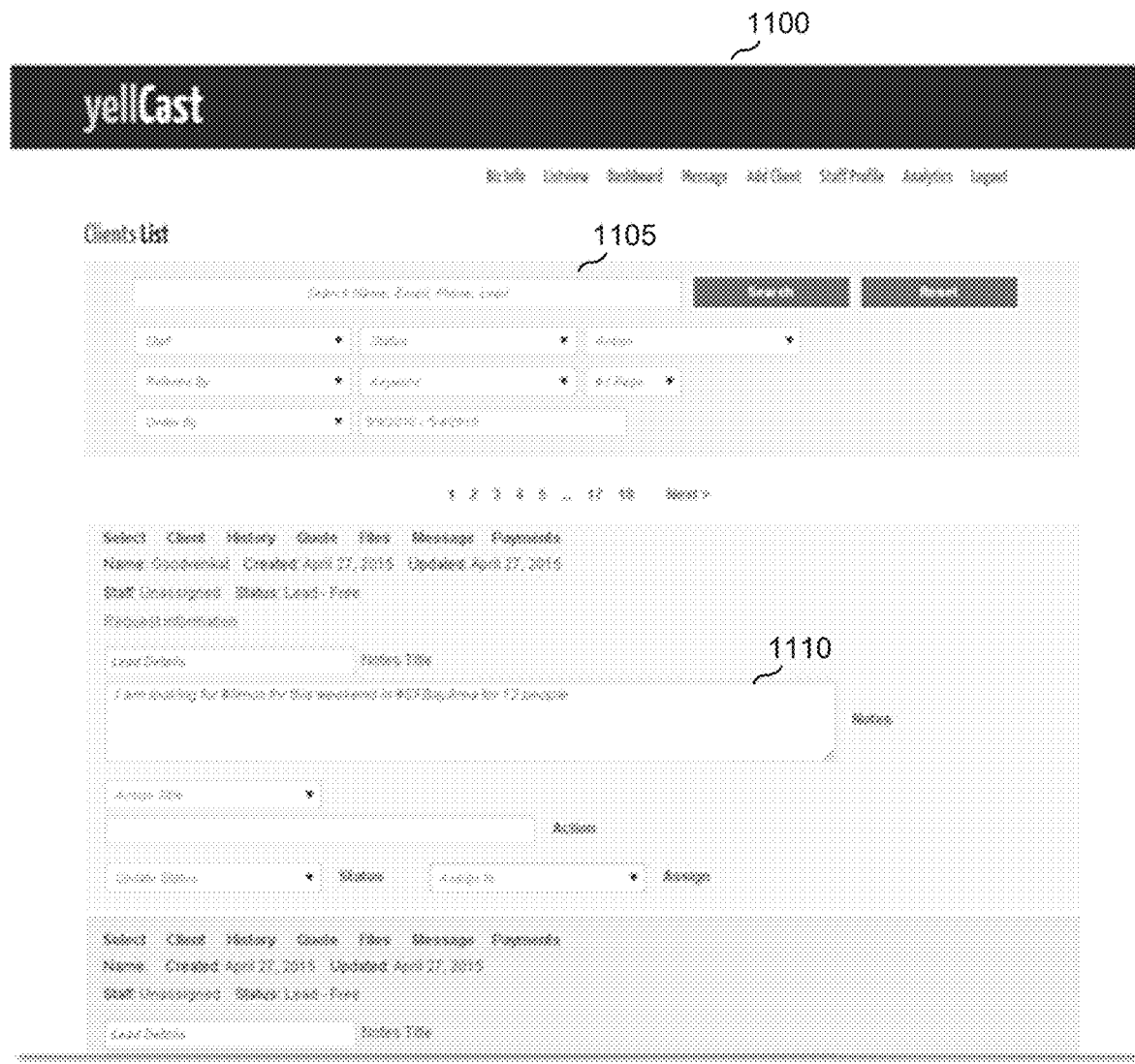
FIG. 11 illustrates a web page that may be used by a vendor according to some aspects of the present disclosure.

FIG. 11 illustrates a web page 1100 that may be used by a vendor according to some aspects of the present disclosure. The web page 1100 includes a search box 1105 to allow for searches of names, emails, phone numbers, or other contact information. The web page 1100 also includes a notes 1110 section, which enables a user to type in a request, such as a request for limos on a weekend day.

Figure 12:
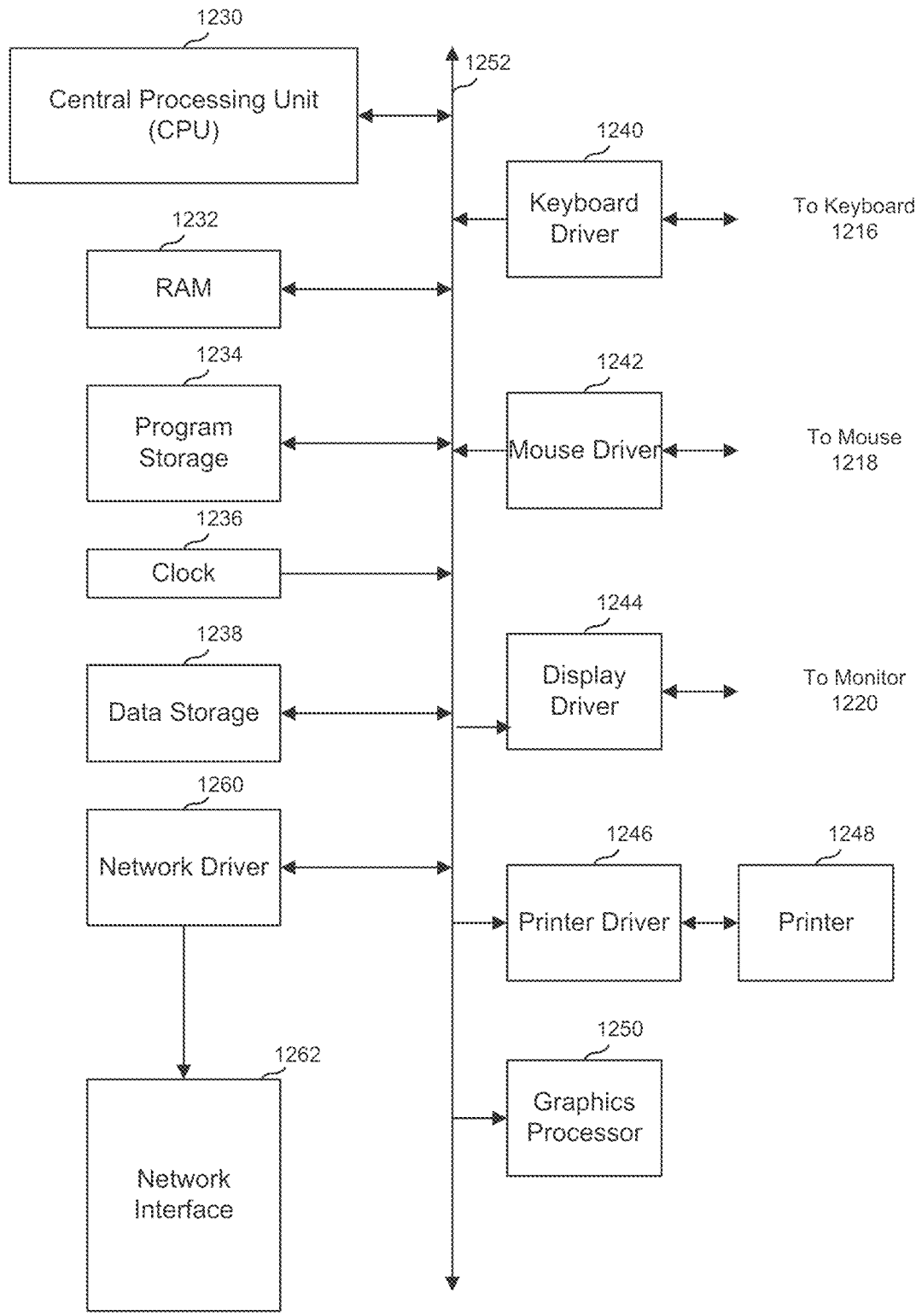
FIG. 12 illustrates hardware components that may be used to implement certain aspects of the present disclosure.

FIG. 12 illustrates hardware components that may be used to implement certain aspects of the present disclosure. This hardware is merely exemplary, and other hardware may also be used. Certain portions of this hardware are optional, and may be omitted as desired.

Figure 13:
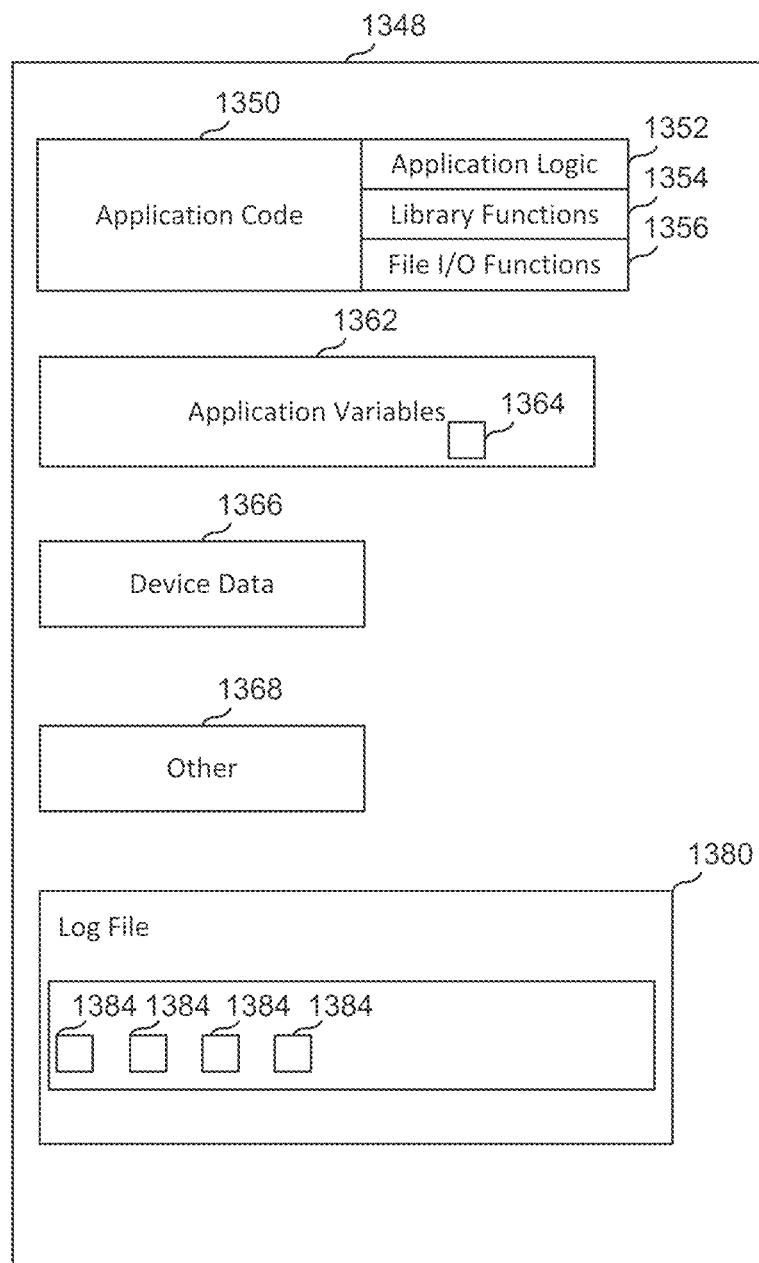
FIG. 13 illustrates certain logical aspects the may be used according to some aspects of the present disclosure.

FIG. 13 illustrates certain logical aspects the may be used according to some aspects of the present disclosure. For example, a device 1348 may contain application code 1350, application logic 1352, library functions 1354, file input/output (I/O) functions 1356. The device 1348 also includes device data 1366 and application variables 1362, such as application variable 1364. The device includes other 1368 components, and may store log files 1380, such as various individual log files 1384.

Figures 14, 15:
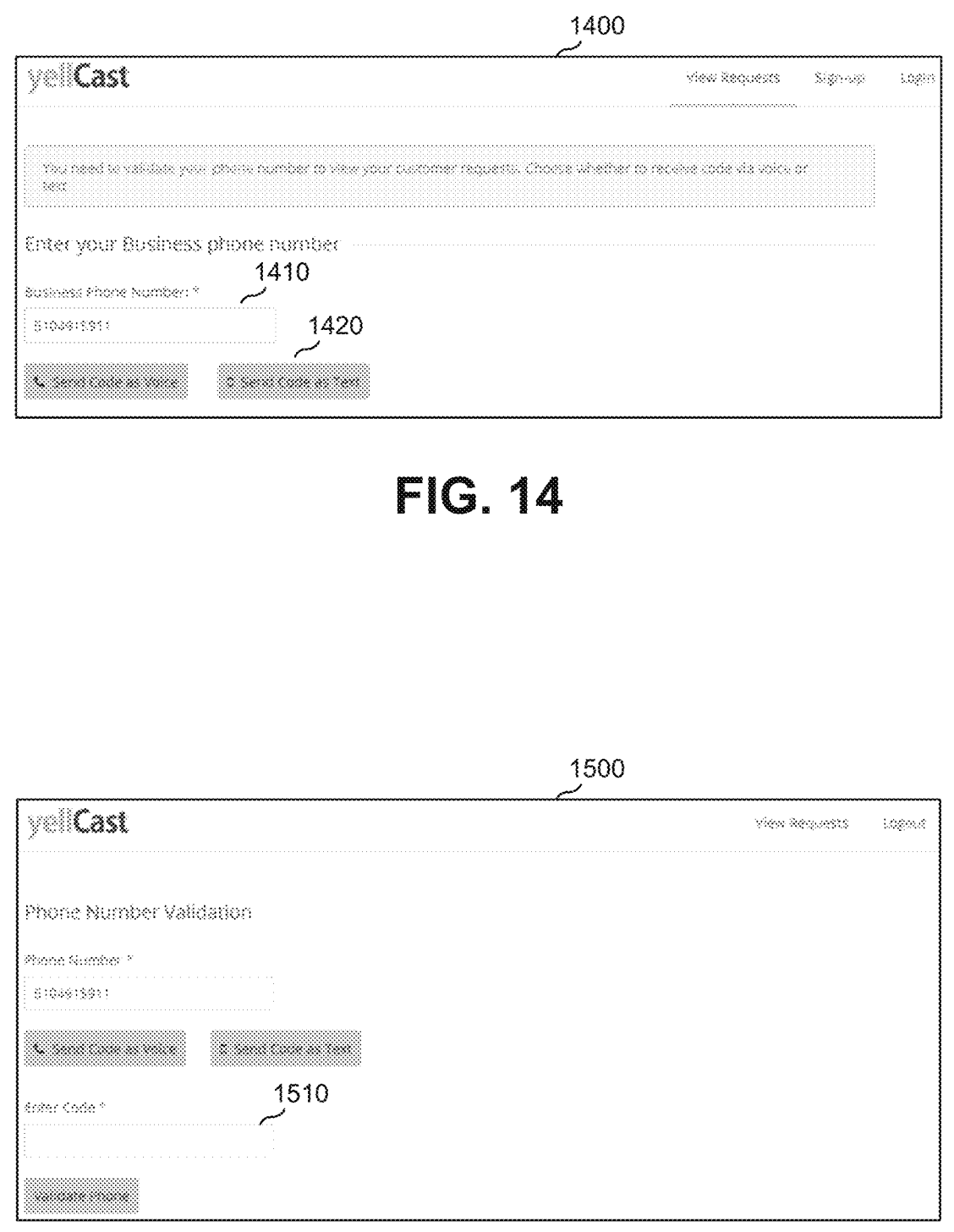

FIG. 14 illustrates a form 1400 that may be used to validate a phone number according to some aspects of the present disclosure. In this form, you may enter a business phone number 1410, and then use a button 1420 to send a validation code as either a text message or as a voice message. FIG. 15 illustrates a form 1500 that allows a provider to enter the received code 1510 in order to validate a phone number.

Figure 16:
FIG. 16 illustrates a form that may be used to allow providers to change information for a website or a search result.

FIG. 16 illustrates a form 1600 that may be used to allow providers to change information for a website or a search result. Using this form 1600, a provider may provide a description of their business 1610, keywords for their business 1620, a website URL 1630, a video link 1640, and a business address 1650.

Figure 17:
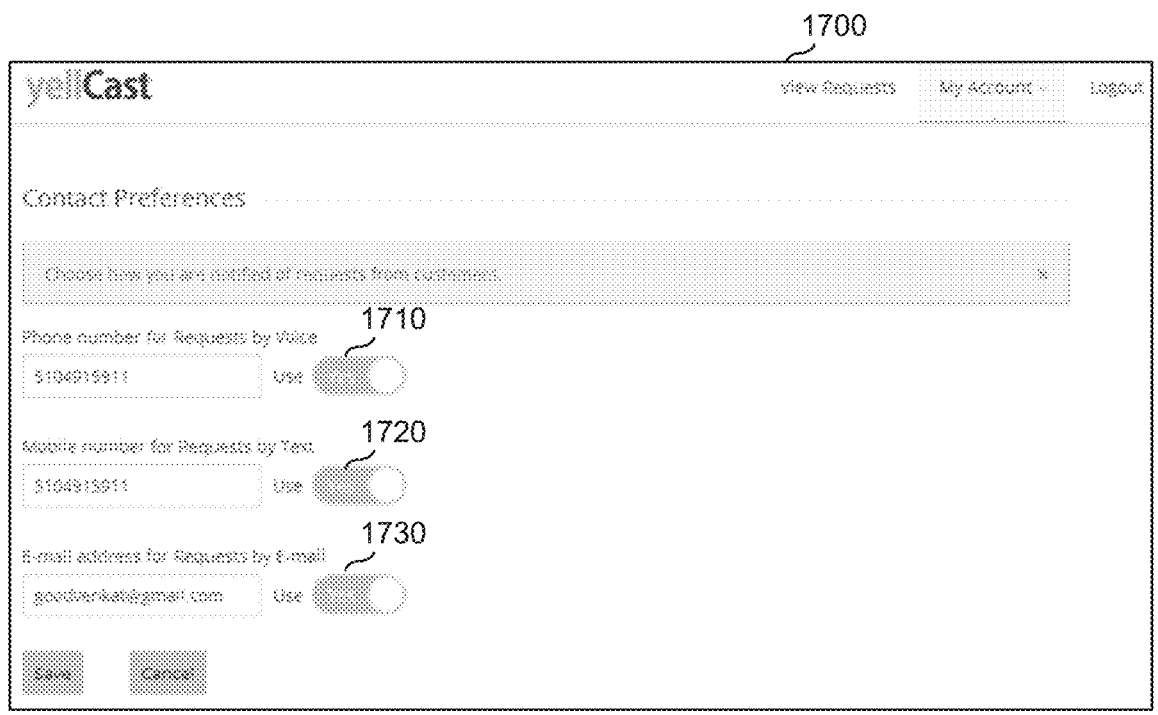
FIG. 17 illustrates a form that may be used to provide contact information to the system according to some aspects of the present disclosure.

FIG. 17 illustrates a form 1700 that may be used to provide contact information to the system according to some aspects of the present disclosure. Using this form 1700, a provider may indicate whether they would like to receive requests from users by voice 1710, and what phone number to use. Providers may indicate similarly for text 1720 and for email 1730 as well.

In some aspects, providers may be parties who provide content for the results provided by the system. For example, a provider may include a seller who offers a good or a product for sale. A provider may also include a content provider or a service provider, who offers content, such as content on a web page. A provider may also include other types of individuals or businesses. For example, a provider may include an individual who puts up a personal profile of themselves, such as on a dating site or a personal- or work-oriented site. A provider may thus include any type of individual or business that is responsible for a given search result, whether that search results reflects a personal or professional information page, a good or service for sale, a web site of any type.

Similarly, a user of the service may include a user who is looking for a variety of different types of information, goods, or services. In some aspects, a user may be a consumer who is considering purchasing a good or a service from a provider. A user may also be an individual who is looking to meet others, in a personal context or in a professional context, whether those others are new people or re-connecting with past friends or acquaintances. A user may also be an individual who is searching for information of any type. Accordingly, a user of the service described herein may include any of the buyers or other individuals described herein.

Additional Details and Variations

Providers do not need to be signed up with the web-based service or even be aware of the web-based service in order to have their information provided to consumers or other users. After a provider receives inquiries from users as a result of the web-based service, possibly including new business, that provider might be inclined to investigate the web-based service and set up a provider account with the web-based service. The provider might then be provided a provider user interface to allow the provider to add or modify information that the web-based service uses when generating search results for users, such as adding missing contact information, selecting a more appropriate image to represent provider, etc.

The operator of the web-based service might allocate the provider with a provider account at no cost or at some cost. The operator might allow for provider accounts at no cost and provide user queries initially at no cost, but then charge for user queries that are sent to the provider's computer. In some implementations, the provider computer has access to some user query information, but not enough user query information to allow the provider to entirely bypass interacting with the web-based service.

Where a user query indicates a selection of multiple providers, the web-based service might be configured to spread its forwarding of the user queries over time, perhaps sending them first to preferred provider computers, or spacing them out so that a user having made multiple queries of providers does not receive replies from all providers all at once. The order of sending user queries out to provider computers may be decided based upon which provider paid the most or which provider has the best reviews or ratings or, other sort methods such as distance, alphabetical order, relevance.

The user's user interface might also have a feature that allows the user to signal to the web-based service to stop future user query sending. This might be useful where a user makes a query, some providers respond such that the user no longer needs additional provider responses. Because the sending of user queries to provider computers was staggered, those later provider computers do not receive those user queries. This can benefit the users, who get fewer new calls after signaling that they do not want more calls, and providers who end up fielding fewer dead leads.

The web-based service, upon presenting a user with search results, can provide the user an option to select one or more of the search results, using click boxes or other user interface elements. The web-based service can facilitate the selection process by prepopulating click boxes by inferring possible user preferences. For example, the search results might show 20 search hits, but have preselected the click boxes for the four results that the web-based service determined related to providers with a geographic location closest to the user.

In a particular embodiment, a service provider loads a database of records from public data sources and/or proprietary data sources, wherein some of the records are vendor records. A vendor record contains information about a particular vendor of products and/or services. As the service of the service provider is used, the database might be updated and revised. Some of the records in the database might relate to non-vendor entries. For example, there might be a record for an ocean cruise line and a record for an article about ocean research not associated with any vendor.

A user, such as a searcher, potential customer, or the like, would query the search service, perhaps by using the user's computing device to connect to the search service, such as by HTTP messages as used for web interactions. The user might be presented with a web page along the lines of FIG. 1 and would type in details of a search. The user would then be presented with search results, such as by the search service computer returning HTML webpages appropriately arranged. Over time, the search service computers would update the database based on user searches, popularity, what the users do after receiving their search results, etc.

A search results page, comprising one or more search result entry corresponding to records in the database, is presented to the user and can include multiple selection user interface elements that the user can use to select among the search results. The user might then be presented with another interface, such as a web form, where the specific fields and selections on the form might vary from topic to topic, where the topic of interest to the user might be determined by the user explicitly selecting a topic or by the search service computer determining from user actions the topic. For example, the fields presented for the topics of "ocean cruises", "plumbers", "gardeners", "roofers", "birthday parties", "grizzly bears", "trivia", etc. might all be different.

Once the user enters the information on the web form and the user's computer provides that to the search service computer, the search service computer generates a message to send to the selected vendors, where applicable. This allows the user to perform a search for a particular product or service, and have a message sent to multiple vendors in one action.

The search results page, comprising the search results entries, is based on the database of records. Thus, for each search result entry, the search service computer might have an image, some text, one or more URLs or other reference details, an address, and a telephone number for each search result entry. An interested vendor might want to "claim" and particular search result entry and such interest might be recorded in the appropriate record corresponding to that search result entry. The interested vendor can then, through a vendor computer system, interact with the search service computer, to modify the details of that vendor's record, such as the image and text. That way, when future users are performing searches and that vendor's record is determined by the search service computer to be relevant enough to be in that user's search results, the search results web page generated would include the vendor-selected image and text. This has a benefit to the users, as they might be more likely to get better information when it is from the vendor rather than from generic spidering or other sources, and has a benefit to the vendors in presenting themselves in a preferred manner.

To avoid losing the benefits to the users, vendor actions would not cause wholesale modification of search results, such as where one vendor pays to always be first or second in the search results. However, the search service computer might, when determining an order of presentation of the search result entries and/or which ones are included, take into account vendor ratings made by prior users, how engaged the vendor is, how responsive the vendor is to prior messages from the search service computer. This provides somewhat of a hybrid search experience to users, wherein which search result entries are presented is determined by a search engine process and algorithm, but the contents of a given search result entry (or parts thereof) can be controlled and/or determined by a party who has "claimed" that search result entry.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention.

Thus, while the invention has been described with respect to exemplary embodiments, one skilled in the art will recognize that numerous modifications are possible. For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

```php
<?php
require_once '../includes/functions/mobile_detect.php';
$detect = new Mobile_Detect;
$deviceType = ($detect->isMobile() ? ($detect->isTablet() ? 'tablet' : 'phone') : 'computer');

include "constants.php";
include_once('../includes/functions/functions.php');
include_once('dbconn.php');

/************** Analytics parameters to save to database
*****************/
$entry="Home"; $trace=$entry;
include_once('analytics.php');
mysql_close($db);

include "header.php";

if($_GET['cat']!="") $SearchTerm=ucwords($_GET['cat']);
if($_GET['loc']!="")
$LocationTerm=ucwords(str_replace("+"," ",$_GET['loc']));
?>

<script>
// get default location from browser and display in location box
window.onload=getLocation;
var x=document.getElementById("location");
var defloc, defaultlocation, deflat, deflon;
function getLocation()
  {
  if (navigator.geolocation)
    {
    navigator.geolocation.getCurrentPosition(showPosition,showError);
    }
  }

// get lat long and city, state from google geo api
function showPosition(position)
  {
  var latlon=position.coords.latitude+","+position.coords.longitude;

var url='http://maps.googleapis.com/maps/api/geocode/json?latlng='+latlon+'&sensor=true';

deflat=position.coords.latitude;
  deflon=position.coords.longitude;

document.getElementById('lat').value = deflat;
  document.getElementById('lon').value = deflon;

objXmlHTTP.open("GET",url);
  objXmlHTTP.onreadystatechange = function alertuser() {
        if (objXmlHTTP.readyState == 4 && (objXmlHTTP.status==200 ||
window.location.href.indexOf("http")==-1)) {
          document.getElementById('loc').value =
getCityState(objXmlHTTP.responseText);
          defaultlocation=defloc;
```

```
          }
        }
    objXmlHTTP.send("");
  } function getCityState(results)
        {    var info=[];
     var data = JSON.parse(results);
        var address = data.results[0];

for(var i=0;i<data.results.length;++i)
          { if(data.results[i].address_components[0].types[0]=="administrative_area_lev
el_1"){info.push(data.results[i].address_components[0].short_name)} if(data.results[i].address_components[0].types[0]=="locality"){info.unshift
(data.results[i].address_components[0].long_name)}
          }
     defloc=info.join(', ');
<?php if($_GET['loc']!="") echo "defloc=".$LocationTerm.";";?>
        return(defloc);
        } function showError(error)
  {
  switch(error.code)
    {
    case error.PERMISSION_DENIED:
      x.innerHTML="User denied the request for Geolocation."
      break;
    case error.POSITION_UNAVAILABLE:
      x.innerHTML="Location information is unavailable."
      break;
    case error.TIMEOUT:
      x.innerHTML="The request to get user location timed out."
      break;
    case error.UNKNOWN_ERROR:
      x.innerHTML="An unknown error occurred."
      break;
    }
  } function checkenter(e) {
   var keynum;
   if(window.event)
   keynum = e.keyCode;
   else if(e.which)
   keynum = e.which;
   if(keynum=='13') dosubmit();
} function dosubmit() {
   document.search.submit();
}

//common ajax to get category suggestions and locations suggestions from
function ajaxget(str,phpfile,divid,p1){
   if(str.length>2){
   var url=
phpfile+'.php?str='+encodeURIComponent(str)+'&p1='+encodeURIComponent(p1);
```

```
    objXmlHTTP.open("GET",url);
    objXmlHTTP.onreadystatechange = function alertuser() {
                if (objXmlHTTP.readyState == 4 && (objXmlHTTP.status==200 ||
window.location.href.indexOf("http")==-1))
                        document.getElementById(divid).innerHTML =
objXmlHTTP.responseText;
                }
    objXmlHTTP.send("");
    }
}

//dynamic update of page with fetched ajax content
function fillinput(divid,string) {
    if(divid=='loc' && defaultlocation != string) {
        document.getElementById('lat').value = '';
        document.getElementById('lon').value = '';
        }
    if(divid=='loc' && defaultlocation == string) {
        document.getElementById('lat').value = deflat;
        document.getElementById('lon').value = deflon;
        } document.getElementById(divid).value = string;
    document.getElementById('catlocdiv').innerHTML ='';
    document.getElementById('typesel').style.display='inline';
    document.getElementById('locsel').style.display='inline';
    document.getElementById('searchbut').style.display='inline';
} function filldone() {
    document.getElementById('catlocdiv').innerHTML ='';
    document.getElementById('typesel').style.display='inline';
    document.getElementById('locsel').style.display='inline';
    document.getElementById('searchbut').style.display='inline';
}
</script>

// suggest for phone users to add bookmark to home screen
<script src="ath/script/addtohomescreen.js"></script>
<script>addToHomescreen();</script>

<!-- Content Wrapper / Start -->
<div id="content-wrapper">

<!-- Container -->
<div id="search" class="container">

<div class="sixteen columns" style="margin-top:<?php
if($deviceType=="phone") echo "20px"; else echo "30px";?>;">

<h4 class="headline">Search for Anything</h4>
      <span class="line" style="margin-bottom:10px;"></span>
   </div>
   <div class="clearfix"></div>

<form name="search" id="search" action="aresults.php" mode="get">
      <ul>
         <li>
            <div id="typesel" class="six columns" style="margin-
bottom:7px;">
```

```
                <button class="text-btn" style="width:75px;" type="text"
onclick="filldone();return false;"> What </button>
                <input id="type" name="type" class="search" type="text"
value="<?php echo $SearchTerm;?>" onkeypress="checkenter(event);"
onclick="if(this.value == '<?php echo $SearchTerm;?>') {this.value = '';}"
onblur="if (this.value == '') {this.value = '<?php echo $SearchTerm;?>';}"
onkeyup="return ajaxget(this.value,'getcat','catlocdiv','');" />
            </div>
        </li>
        <li>
            <div id="locsel" class="five columns" style="margin-
bottom:7px;">
                <button class="text-btn" style="width:80px;"
onclick="filldone();return false;"> Where </button>
                <input id="loc" name="loc" class="search" type="text"
value="<?php echo $LocationTerm;?>" onkeypress="checkenter(event);"
onclick="if(this.value != '') {defloc=this.value; this.value =
'';document.getElementById('lat').value =
'';document.getElementById('lon').value = '';}"
onblur="if(document.getElementById('loc').value.length<2)
document.getElementById('wcontact').style.display='inline';" onkeyup=
"if(document.getElementById('loc').value.length>=2)
document.getElementById('wcontact').style.display='none';return
ajaxget(this.value,'getloc','catlocdiv','');" />
            </div>
        </li>
        <li>
            <div id="searchbut" class="three columns" style="margin-
bottom:7px;">
                <button class="text-btn text-colorbtn text-btn-width"
type="submit">Get it!</button>
                <input id="lat" name="lat" type="hidden" />
                <input id="lon" name="lon" type="hidden" />
            </div>
        </li>
    </ul>
<!-- Provide the option to get contacts from search results -->
    <div id="wcontact" class="fourteen columns" style="display:none;text-
align:right;font-size:11px;"><input id="wcontact" name="wcontact"
type="checkbox" style="position:relative;vertical-
align:middle;bottom:2px;transform: scale(0.95);-webkit-transform:
scale(0.95);" /> With Contacts </div>
    </div>
 </form>

<!-- Container / End -->

<!-- Container -->
<div class="container" style="min-height:220px;">
    <div id="catlocdiv" style="color:#a7a7a7;" class="twelve columns"
> </div>
</div>

<!-- Content Wrapper / End -->

<!-- Businesses can enter their phone number to view the requests -->
<div class="container">
   <div class="eight columns" style="margin:10px 0;">
      <a class="text-btn text-colorbtn" href="view.php"><< Businesses, view
Requests here >></a>
```

```
    </div>
</div>

</div>
<?php include "footer.php"; ?>
```

Appendix B: aresults.php

```php
<?php
session_start();
error_reporting(E_ERROR);
ini_set('max_execution_time', 300);
ini_set('memory_limit','128M');

require_once '../includes/functions/mobile_detect.php';
$detect = new Mobile_Detect;
$deviceType = ($detect->isMobile() ? ($detect->isTablet() ? 'tablet' :
'phone') : 'computer');
$_SESSION['ckid']=uniqid();
$_SESSION['sid']="";
$_SESSION['rt']="t";

if($_GET['m']==1) $deviceType="phone";

include_once("constants.php");
require_once('../includes/functions/OAuth.php');
include_once("../includes/functions/functions.php");
include_once("../includes/functions/url_to_abs.php");
require_once("../includes/functions/simple_html_dom.php");
include_once("dbconn.php");

$results=array();

$cat=$_GET['type'];
    $lat=$_GET['lat'];
    $lon=$_GET['lon'];

$loc=str_replace(" ","+",str_replace(", ","+",$_GET['loc']));
    if($_GET['loc']==$LocationTerm || $_GET['loc']=="+" || $_GET['loc']=="")
{$_GET['loc']="";$loc="";$getcontact="";}
    else $getcontact=1;

$entry="Results";
$rt="t";
$trace=$entry;
include_once('analytics.php');
include "headersearch.php";
?>

<script>
var selectcnt=0;

function photosajax(divid,i,id,src){
    var url=
'getphotos.php?i='+encodeURIComponent(i)+'&id='+encodeURIComponent(id)+'&sr
c='+encodeURIComponent(src);

$.get(url,function(response){
    if(response!="") {
        $('#'+divid).html(response);
        $('#'+divid).find("script").each(function(){
           eval($(this).text());
           });
      }
   });
}
```

```
function reviewsajax(divid,i,id){
   var url=
'getreviews.php?i='+encodeURIComponent(i)+'&id='+encodeURIComponent(id);

$.get(url,function(response){
   if(response!="") {
        $('#'+divid).html(response);
        $('#'+divid).find("script").each(function(){
           eval($(this).text());
           });
     }
   });
} function selectthis(id) {
   if(selectcnt>0) {
      var element = document.getElementById('sendbuttondiv');
      element.parentNode.removeChild(element);
      }
   selectcnt+=1;
   document.getElementById('selectdiv'+id).innerHTML ='<div
id="sendbuttondiv"><button class="sub-btn submitallbtn" type="submit"><i
class="icon-bullhorn"></i> Contact the '+selectcnt+'
selected</button></div><button class="sub-btn unselectbtn"
onclick="unselectthis('+id+');return false;"><i class="icon-check-empty
white"></i> Clear</button>';
   document.getElementById('idx['+id+']').value = id;
} function unselectthis(id) {
   if(selectcnt>0) {
      var element = document.getElementById('sendbuttondiv');
      element.parentNode.removeChild(element);
      selectcnt-=1;
      if(selectcnt>0)
         document.getElementById('selectdiv'+id).innerHTML ='<div
id="sendbuttondiv"><button class=" sub-btn submitallbtn" ><i class="icon-
bullhorn"></i> Contact the '+selectcnt+'
selected</button></div><button class=" sub-btn"
onclick="selectthis('+id+');return false;"><i class="icon-check-sign
white"></i> Select</button>';
      else
         document.getElementById('selectdiv'+id).innerHTML ='<button
class=" sub-btn" onclick="selectthis('+id+');return false;"><i class="icon-
check-sign white"></i> Select</button>';
      }
   else
      document.getElementById('selectdiv'+id).innerHTML ='<button class="
sub-btn" onclick="selectthis('+id+');return false;"><i class="icon-check-
sign white"></i> Select</button>'
   document.getElementById('idx['+id+']').value = '';
} function toggleDiv(divId) {
       $("#"+divId).toggle();
}
</script>

<!-- Content Wrapper / Start -->
```

```
<div>

<!-- Content
==================================================== -->
<!-- Container -->
<div class="container">

<form name="request" id="request" method="POST" action="<?php
if($_GET['twid']!="") echo "twcast";else echo "mdata";?>.php">

<?php if($_GET['twid']!="") echo "<input type=\"hidden\" name=\"twid\"
id=\"twid\" value=\"".$_GET['twid']."\">";?>

<?php
// Check db to see if data already available for the search phrase and
location within the last 3 days
    $cattag=$cat."_".$_GET['wcontact'];
    $sql="SELECT count(*) FROM alldb WHERE cat LIKE '".$cattag."' AND loc
LIKE '".$loc."' AND DATE_SUB(CURDATE(),INTERVAL 3 DAY) < timestamp";
    $res = mysql_query($sql) or die(mysql_error());
    $rowscount = mysql_fetch_array($res);
    $dbcount=$rowscount[0];
if($_GET['dbg']==1) $dbcount=0;
?>
      <!-- Tabs -->
      <div class="widget">
         <div id="tabdiv" >
         <!-- Tabs Navigation -->
         <ul class="tabs-nav blog" >
            <?php
               // Sorting options presented to the users
               $sorturl="aresults.php?type=".$_GET['type'];
               if($_GET['loc']!="")
$sorturl.="&loc=".urlencode($_GET['loc']);
               if($_GET['lat']!="") $sorturl.="&lat=".$_GET['lat'];
               if($_GET['lon']!="") $sorturl.="&lon=".$_GET['lon'];
               if($_GET['wcontact']!="")
$sorturl.="&wcontact=".$_GET['wcontact'];

if($lat!="" || $lon!="" || $loc!="") {
                  echo '<div id="menuoptions" style="display:none">';
                  echo '<li '; if($_GET['sort']=="") echo 'class="active"';
echo '><a href="'; echo $sorturl; echo '" title="Sort by Source"><i
class="icon-reorder"><br />Source</i></a></li>';
                  echo '<li '; if($_GET['sort']=="alfa") echo
'class="active"'; echo '><a href="'; echo $sorturl."&sort=alfa"; echo '"
title="Sort Alphabetically"><i class="icon-sort-by-alphabet"><br />A ..
Z</i></a></li>';
                  echo '<li '; if($_GET['sort']=="rate") echo
'class="active"'; echo '><a href="'; echo $sorturl."&sort=rate"; echo '"
title="Sort by Rating"><i class="icon-comments-alt"><br
/>Ratings</i></a></li>';
                  echo '<li '; if($_GET['sort']=="dist") echo
'class="active"'; echo '><a href="'; echo $sorturl."&sort=dist"; echo '"
title="Sort by Distance"><i class="icon-road"><br />Distance</i></a></li>';
                  echo '</div>';
               }
            ?>
         </ul>
         </div>
      </div>
```

```php
     <div class="clearfix"></div>
<?php if($getcontact!="" && $deviceType=="computer" && $_GET['sort']=="") echo
'<div class="notification notice closeable"><p><span>Note!</span> Please
select the ones you\'d like to contact and click the Contact button.</p><a
class="close" href="#"></a></div>';

if($dbcount > 0) {
       $cattag=$cat."_".$_GET['wcontact'];
       $sql = "SELECT * FROM alldb WHERE cat LIKE '".$cattag."' AND loc LIKE
'".$loc."' AND DATE_SUB(CURDATE(),INTERVAL 3 DAY) < timestamp";
       $result = mysql_query($sql) or die("Q:".$sql."Fatal error:
".mysql_error());
       $alldata = mysql_fetch_array($result);
       $results=unserialize($alldata['results']);

if($_GET['sort']=="alfa") {
           $resultsalfa=fix_keys(array_sort($results,'businessName',
SORT_ASC, TXT));
           $results=$resultsalfa;
           } if($_GET['sort']=="rate") {
           $resultsrate=fix_keys(array_sort($results,'weightScoreFactor',
SORT_DESC, NUM));
           $results=$resultsrate;
           } if($_GET['sort']=="dist") {
           $resultsdist=fix_keys(array_sort($results,'distanceFactor',
SORT_ASC, NUM));
           $results=$resultsdist;
           }

$resultscount=count($results);
       if($resultscount>0) { for($i=0;$i<$resultscount;$i++) { if($results[$i]['source']=="yelp") {
             $sql="SELECT count(*) FROM allreviews WHERE id LIKE
'".$results[$j]['id']."' AND source LIKE 'yelp' AND
DATE_SUB(CURDATE(),INTERVAL 3 DAY) < timestamp";
             $res = mysql_query($sql) or die(mysql_error());
             $rowscount = mysql_fetch_array($res);
             $reviewscount=$rowscount[0];

if($reviewscount>0) {
                 $results[$j]['dbreviews']=1;
                 $sql = "SELECT * FROM allreviews WHERE id LIKE
'".$results[$i]['id']."' AND source LIKE 'yelp' AND
DATE_SUB(CURDATE(),INTERVAL 3 DAY) < timestamp";
                 $reviewresult = mysql_query($sql) or die("Q:".$sql."Fatal
error: ".mysql_error());
                 $reviewdata = mysql_fetch_array($reviewresult);

$reviewdataarr=unserialize(mysql_reverse_escape($reviewdata['results']))
;
                 if(is_array($reviewdataarr['reviews'])) {
```

```
                $r=0;
                foreach($reviewdataarr['reviews'] as $reviewele) {
                        $results[$i]['review'][$r]=$reviewele['review'];

$results[$i]['reviewer'][$r]=$reviewele['reviewer'];

$results[$i]['reviewerimg'][$r]=$reviewele['reviewerimg'];

$results[$i]['reviewDate'][$r]=$reviewele['reviewDate'];
                        $results[$i]['rating'][$r]=$reviewele['rating'];
                        $r++;
                        }
                    }

}

}
            if($results[$i]['source']=="yelp" ||
$results[$i]['source']=="yellow pages") {
                $sql="SELECT count(*) FROM allphotos WHERE id LIKE
'".$results[$i]['id']."' AND source LIKE '".$results[$i]['source']."' AND
DATE_SUB(CURDATE(),INTERVAL 3 DAY) < timestamp";
                $res = mysql_query($sql) or die(mysql_error());
                $rowscount = mysql_fetch_array($res);
                $photocount=$rowscount[0];

if($photocount>0) {
                    $results[$i]['photosrc']="db";
                    $sql = "SELECT * FROM allphotos WHERE id LIKE
'".$results[$i]['id']."' AND source LIKE '".$results[$i]['source']."' AND
DATE_SUB(CURDATE(),INTERVAL 3 DAY) < timestamp";
                    $photoresult = mysql_query($sql) or die("Q:".$sql."Fatal
error: ".mysql_error());
                    $photodata = mysql_fetch_array($photoresult);
                    $photodataarr =
unserialize(mysql_reverse_escape($photodata['results']));
                    if(is_array($photodataarr['gallery'])) {
                        $p=0;
                        foreach($photodataarr['gallery'] as $photourl) {
                                $results[$i]['gallery'][$p]=$photourl;
                                $p++;
                                }
                            }
                        }
                    }
                    display_results($i,$results[$i]);
                }
            }
        }
        else {
if($loc!="") {
/******************************* Yelp API ******************************/
    $prevresultscount=count($results);

$yelpresults = yelp_search($cat, $loc, $lat, $lon);
        $yelpresults = $yelpresults['businesses'];
    $yelpcount=count($yelpresults);

$j=$prevresultscount;
    for($i=0;$i<$yelpcount;$i++) {
```

```
        $results[$j]['source']="yelp";
        $results[$j]['id']=$yelpresults[$i]['id'];
        $results[$j]['businessName']=$yelpresults[$i]['name'];
        $results[$j]['phone']=formatPhone($yelpresults[$i]['phone']);
        $results[$j]['averageRating']=$yelpresults[$i]['rating'];
        $results[$j]['ratingCount']=$yelpresults[$i]['review_count'];
        if($yelpresults[$i]['location']['display_address'][0] !="" &&
$yelpresults[$i]['location']['display_address'][0] !=
$yelpresults[$i]['location']['city'].",
".$yelpresults[$i]['location']['state_code']."
".$yelpresults[$i]['location']['postal_code'])
$results[$j]['street']=$yelpresults[$i]['location']['display_address'][0];
        if($yelpresults[$i]['location']['display_address'][1] !="" &&
$yelpresults[$i]['location']['display_address'][1] !=
$yelpresults[$i]['location']['city'].",
".$yelpresults[$i]['location']['state_code']."
".$yelpresults[$i]['location']['postal_code'])
$results[$j]['street2']=$yelpresults[$i]['location']['display_address'][1];
        if($yelpresults[$i]['location']['display_address'][2] !="" &&
$yelpresults[$i]['location']['display_address'][2] !=
$yelpresults[$i]['location']['city'].",
".$yelpresults[$i]['location']['state_code']."
".$yelpresults[$i]['location']['postal_code'])
$results[$j]['street3']=$yelpresults[$i]['location']['display_address'][2];
        $results[$j]['city']=$yelpresults[$i]['location']['city'];
        $results[$j]['state']=$yelpresults[$i]['location']['state_code'];
        $results[$j]['zip']=$yelpresults[$i]['location']['postal_code'];
        $results[$j]['distance']=round($yelpresults[$i]['distance']*
0.00062137,2);
        if($yelpresults[$i]['distance']=="")
$results[$j]['distanceFactor']=9999999;
        else $results[$j]['distanceFactor']=$results[$j]['distance'];

$sql="SELECT count(*) FROM allreviews WHERE id LIKE
'".$results[$j]['id']."' AND source LIKE 'yelp' AND
DATE_SUB(CURDATE(),INTERVAL 3 DAY) < timestamp";
        $res = mysql_query($sql) or die(mysql_error());
        $rowscount = mysql_fetch_array($res);
        $reviewscount=$rowscount[0];

if($reviewscount>0) {
            $results[$j]['dbreviews']=1;
            $sql = "SELECT * FROM allreviews WHERE id LIKE
'".$results[$j]['id']."' AND source LIKE 'yelp' AND
DATE_SUB(CURDATE(),INTERVAL 3 DAY) < timestamp";
        $reviewresult = mysql_query($sql) or die("Q:".$sql."Fatal error:
".mysql_error());
        $reviewdata = mysql_fetch_array($reviewresult);

$reviewdataarr=unserialize(mysql_reverse_escape($reviewdata['results']))
;
            if(is_array($reviewdataarr['reviews'])) {
                $r=0;
                foreach($reviewdataarr['reviews'] as $reviewele) {
                    $results[$j]['review'][$r]=$reviewele['review'];
                    $results[$j]['reviewer'][$r]=$reviewele['reviewer'];
                    $results[$j]['reviewerimg'][$r]=$reviewele['reviewerimg'];
                    $results[$j]['reviewDate'][$r]=$reviewele['reviewDate'];
                    $results[$j]['rating'][$r]=$reviewele['rating'];
                    $r++;
                }
```

```php
            }
        }
        else {
            if($yelpresults[$i]['snippet_text']!="")
$results[$j]['review'][0]="\"".$yelpresults[$i]['snippet_text']."\"";
            if($yelpresults[$i]['snippet_image_url']!="")
$results[$j]['reviewerimg'][0]=$yelpresults[$i]['snippet_image_url'];
        }

$sql="SELECT count(*) FROM allphotos WHERE id LIKE
'".$results[$j]['id']."' AND source LIKE '".$results[$j]['source']."' AND
DATE_SUB(CURDATE(),INTERVAL 3 DAY) < timestamp";
        $res = mysql_query($sql) or die(mysql_error());
        $rowscount = mysql_fetch_array($res);
        $photocount=$rowscount[0];

if($photocount>0) {
            $results[$i]['photosrc']="db";
            $sql = "SELECT * FROM allphotos WHERE id LIKE
'".$results[$j]['id']."' AND source LIKE '".$results[$j]['source']."' AND
DATE_SUB(CURDATE(),INTERVAL 3 DAY) < timestamp";
            $photoresult = mysql_query($sql) or die("Q:".$sql."Fatal error:
".mysql_error());
            $photodata = mysql_fetch_array($photoresult);
            $photodataarr =
unserialize(mysql_reverse_escape($photodata['results']));
            if(is_array($photodataarr['gallery'])) {
                $p=0;
                foreach($photodataarr['gallery'] as $photourl) {
                    $results[$j]['gallery'][$p]=$photourl;
                    $p++;
                }
            }
        }
        else $results[$j]['gallery'][0]=str_replace("ms.jpg","258s.jpg",$yelpresults[
$i]['image_url']);

$ratingcnt=count($results[$j]['rating']);
        if(($results[$j]['averageRating']<=0 ||
$results[$j]['ratingCount']<=0) && $ratingcnt>0) {
            $ratingtotal=0;
            for($r=0;$r<$ratingcnt;$r++)
$ratingtotal+=$results[$j]['rating'][$r];
            $results[$j]['averageRating']=$ratingtotal/$ratingcnt;
            $results[$j]['ratingCount']=$ratingcnt;
        } display_results($j,$results[$j],0);
    $j++;
    }
/*******************************************************************/

/***************************** google API ****************************/

$prevresultscount=count($results);
```

```
for($k=1;$k<=$GoogleMaxPages;$k++) {
    if($lat=="" || $lon=="")

$url="https://maps.googleapis.com/maps/api/place/textsearch/json?key=".$GoogleApiKey."&query=".urlencode($cat." in ".$loc)."&radius=".$GoogleRadius;
    if($lat!="" && $lon!="")

$url="https://maps.googleapis.com/maps/api/place/textsearch/json?key=".$GoogleApiKey."&query=".urlencode($cat)."&radius=".$GoogleRadius."&location=".$lat.",".$lon;
    $resultsres = @file_get_contents_curl($url);
    $resultstemp=json_decode($resultsres, true);

if(is_array($resultstemp)) {
        $googleresults=$resultstemp['results'];
        $googlecount=count($googleresults);
    }
}

$j=$prevresultscount;
for($i=0;$i<$googlecount;$i++) {
    $results[$j]['source']="google";
    $results[$j]['businessName']=$googleresults[$i]['name'];
    $results[$j]['services']=sanitize($googleresults[$i]['services']);
    $results[$j]['distance']=-1;
    if($googleresults[$i]['distance']=="")
$results[$j]['distanceFactor']=9999999;
    else $results[$j]['distanceFactor']=$results[$j]['distance'];

$url="https://maps.googleapis.com/maps/api/place/details/json?key=".$GoogleApiKey."&placeid=".$googleresults[$i]['place_id'];
    $detailsres=@file_get_contents_curl($url);
    $detailstemp=json_decode($detailsres, true);

if(is_array($detailstemp['result'])) {
        $googledetails=$detailstemp['result'];
        $addr=explode(",",$googledetails['formatted_address']);
        $results[$j]['street']=$addr[0];
        $results[$j]['city']=$addr[1];
        $stzp=explode(" ",$addr[2]);
        $results[$j]['state']=$stzp[1];
        $results[$j]['zip']=$stzp[2];

$results[$j]['phone']=formatPhone($googledetails['formatted_phone_number']);
        $results[$j]['openHours']="";
        /*if(is_array($googledetails['opening_hours']['weekday_text'])) {
            foreach($googledetails['opening_hours']['weekday_text'] as $oh)
                $results[$j]['openHours'].=$oh."<br />     ";
            $results[$j]['openHours']=str_replace("<br />     @#$&^%","",$results[$j]['openHours']."@#$&^%");
        }*/ if(is_array($googledetails['opening_hours']['weekday_text'])) {
            foreach($googledetails['opening_hours']['weekday_text'] as $oh)
                $results[$j]['openHours'].=$oh.", ";
```

```php
        $results[$j]['openHours']=str_replace(",
@#$&^%","",$results[$j]['openHours']."@#$&^%");

$sday=array("Mon","Tue","Wed","Thu","Fri","Sat","Sun");

$fday=array("Monday","Tuesday","Wednesday","Thursday","Friday","Saturday
","Sunday");

$results[$j]['openHours']=str_replace($fday,$sday,$results[$j]['openHour
s']);
                }
        $results[$j]['ratingCount']=$googledetails['user_ratings_total'];
        $results[$j]['averageRating']=$googledetails['rating'];

$ratingcnt=count($googledetails['reviews']);
            if($results['averageRating']<=0 && $ratingcnt>0) {
                $ratingtotal=0;
                for($r=0;$r<$ratingcnt;$r++)
$ratingtotal+=$googledetails['reviews'][$r]['rating'];
                $results[$j]['averageRating']=$ratingtotal/$ratingcnt;
                $results[$j]['ratingCount']=$ratingcnt;
                } for($r=0;$r<count($googledetails['reviews']);$r++) {
            $results[$j]['reviewDate'][$r]=date("F j, Y",
$googledetails['reviews'][$r]['time']);

$results[$j]['review'][$r]=$googledetails['reviews'][$r]['text'];

$results[$j]['reviewer'][$r]=$googledetails['reviews'][$r]['author_name'
];

$results[$j]['rating'][$r]=$googledetails['reviews'][$r]['rating'];
                }

} for($p=0;$p<count($googledetails['photos']);$p++)

$results[$j]['gallery'][$p]="https://maps.googleapis.com/maps/api/place/
photo?key=".$GoogleApiKey."&maxheight=400&photoreference=".$googledetails['
photos'][$p]['photo_reference'];

$ratingcnt=count($results[$j]['rating']);
            if(($results[$j]['averageRating']<=0 ||
$results[$j]['ratingCount']<=0) && $ratingcnt>0) {
                $ratingtotal=0;
                for($r=0;$r<$ratingcnt;$r++)
$ratingtotal+=$results[$j]['rating'][$r];
                $results[$j]['averageRating']=$ratingtotal/$ratingcnt;
                $results[$j]['ratingCount']=$ratingcnt;
                } display_results($j,$results[$j],0);
        $j++;
        }
/*****************************************************************/

/******************************* CityGrid API
******************************/
```

```
    $prevresultscount=count($results);

for($k=1;$k<=$CityGridMaxPages;$k++) {
        if($lat=="" || $lon=="")

$url="https://api.citygridmedia.com/content/places/v2/search/where?what=
".urlencode($cat)."&where=".$loc."&publisher=".$CityGridKey."&format=json&s
ort=highestrated";
        if($lat!="" && $lon!="")

$url="https://api.citygridmedia.com/content/places/v2/search/where?what=
".urlencode($cat)."&where=".$loc."&publisher=".$CityGridKey."&format=json&s
ort=highestrated&lat=".$lat."%lon=".$lon."&radius=".$CityGridRadius;

$curl_handle = curl_init();
        curl_setopt($curl_handle, CURLOPT_SSLVERSION,3);
        curl_setopt($curl_handle, CURLOPT_URL, $url);
        curl_setopt($curl_handle, CURLOPT_RETURNTRANSFER, 1);
        $resultsres = curl_exec($curl_handle);
        curl_close($curl_handle);
        $resultstemp=json_decode($resultsres, true);

if(is_array($resultstemp)) {
            $citygridresults=$resultstemp['results']['locations'];
            $citygridcount=count($citygridresults);
        }
    }

$j=$prevresultscount;
    for($i=0;$i<$citygridcount;$i++) {
        $results[$j]['source']="citygrid";
        $results[$j]['businessName']=$citygridresults[$i]['name'];
        $results[$j]['id']=$citygridresults[$i]['id'];
        $results[$j]['services']=sanitize($citygridresults[$i]['tagline']);
        $results[$j]['street']=$citygridresults[$i]['address']['street'];
        $results[$j]['city']=$citygridresults[$i]['address']['city'];
        $results[$j]['state']=$citygridresults[$i]['address']['state'];
        $results[$j]['zip']=$citygridresults[$i]['address']['postal_code'];
        $results[$j]['distance']=$citygridresults[$i]['distance'];
        $results[$j]['distance']=-1;
        if($citygridresults[$i]['distance']=="")
$results[$j]['distanceFactor']=9999999;
        else $results[$j]['distanceFactor']=$results[$j]['distance'];
        $results[$j]['averageRating']=$citygridresults[$i]['rating']/2;

$results[$j]['ratingCount']=$citygridresults[$i]['user_review_count'];

$results[$j]['phone']=formatPhone($citygridresults[$i]['phone_number']);

$url="https://api.citygridmedia.com/content/places/v2/detail?id=".$resul
ts[$j]['id']."&id_type=cs&review_count=10&publisher=".$CityGridKey."&client
_ip=".$_SERVER['REMOTE_ADDR']."&format=json";
        $curl_handle = curl_init();
        curl_setopt($curl_handle, CURLOPT_SSLVERSION,3);
        curl_setopt($curl_handle, CURLOPT_URL, $url);
        curl_setopt($curl_handle, CURLOPT_RETURNTRANSFER, 1);
        $detailsres = curl_exec($curl_handle);
        curl_close($curl_handle);
        $detailstemp=json_decode($detailsres, true);
```

```
        if(is_array($detailstemp['locations'][0])) {
            $citygriddetails=$detailstemp['locations'][0];

$results[$j]['openHours']=$citygriddetails['business_hours'];

for($r=0;$r<count($citygriddetails['review_info']['reviews']);$r++) {

$dt=$citygriddetails['review_info']['reviews'][$r]['review_date'];
            $results[$j]['reviewDate'][$r]=userdate(substr($dt, 0,
strpos($dt,'T')));

$results[$j]['review'][$r]=$citygriddetails['review_info']['reviews'][$r
]['review_text'];

$results[$j]['reviewer'][$r]=$citygriddetails['review_info']['reviews'][
$r]['review_author'];

$results[$j]['rating'][$r]=$citygriddetails['review_info']['reviews'][$r
]['review_rating']/2;
            } for($p=0;$p<count($citygriddetails['images']);$p++)

$results[$j]['gallery'][$p]=$citygriddetails['images'][$p]['image_url'];
            }

$ratingcnt=count($results[$j]['rating']);
            if(($results[$j]['averageRating']<=0 ||
$results[$j]['ratingCount']<=0) && $ratingcnt>0) {
                $ratingtotal=0;
                for($r=0;$r<$ratingcnt;$r++)
$ratingtotal+=$results[$j]['rating'][$r];
                $results[$j]['averageRating']=$ratingtotal/$ratingcnt;
                $results[$j]['ratingCount']=$ratingcnt;
                } display_results($j,$results[$j],0);
        $j++;
        }

/**********************************************************************/

/****************************** Yellow Pages API
******************************/
    $prevresultscount=count($results);

for($k=1;$k<=$YPMaxPages;$k++) {
        if($lat=="" || $lon=="")

$url="http://api2.yp.com/listings/v1/search?key=".$YPKey."&listingcount=
".$YPMaxListings."&format=json"."&term=".urlencode($cat)."&searchloc=".$loc
."&pagenum=".$k;
        if($lat!="" && $lon!="")

$url="http://api2.yp.com/listings/v1/search?key=".$YPKey."&listingcount=
".$YPMaxListings."&format=json"."&term=".urlencode($cat)."&searchloc=".$lat
.":".$lon."&pagenum=".$k;
        $resultsres=@file_get_contents_curl_ua($url);
```

```php
        $resultstemp=json_decode($resultsres, true);

if(is_array($resultstemp['searchResult']['searchListings'])) {

$ypresults=$resultstemp['searchResult']['searchListings']['searchListing'];
        $ypcount=count($ypresults);
        }
    }

$j=$prevresultscount;
    for($i=0;$i<$ypcount;$i++) {
        $results[$j]['source']="yellow pages";
        $results[$j]['businessName']=$ypresults[$i]['businessName'];
        $results[$j]['id']=$ypresults[$i]['listingId'];

$results[$j]['services']=sanitize($ypresults[$i]['slogan'].$ypresults[$i]['description1'].$ypresults[$i]['description2'].$ypresults[$i]['services']);
        $results[$j]['averageRating']=$ypresults[$i]['averageRating'];
        $results[$j]['ratingCount']=$ypresults[$i]['ratingCount'];
        $results[$j]['street']=$ypresults[$i]['street'];
        $results[$j]['city']=sanitize($ypresults[$i]['city']);
        $results[$j]['state']=sanitize($ypresults[$i]['state']);
        $results[$j]['distance']=$ypresults[$i]['distance'];
        if($ypresults[$i]['distance']=="")
$results[$j]['distanceFactor']=9999999;
        else $results[$j]['distanceFactor']=$results[$j]['distance'];
        $results[$j]['openHours']=$ypresults[$i]['openHours'];

$results[$j]['paymentMethods']=sanitize($ypresults[$i]['paymentMethods']);
        $results[$j]['phone']=$ypresults[$i]['phone'];
        $results[$j]['email']=$ypresults[$i]['email'];

$url="http://api2.yp.com/listings/v1/reviews?key=".$YPKey."&listingid=".$ypresults[$i]['listingId']."&format=json";
        $reviewsres=@file_get_contents_curl_ua($url);
        $reviewstemp=json_decode($reviewsres, true);
        if(is_array($reviewstemp['ratingsAndReviewsResult']['reviews'])) { for($r=0;$r<count($reviewstemp['ratingsAndReviewsResult']['reviews']['review']);$r++) {

$results[$j]['reviewDate'][$r]=userdate($reviewstemp['ratingsAndReviewsResult']['reviews']['review'][$r]['reviewDate']);

$results[$j]['review'][$r]=sanitize($reviewstemp['ratingsAndReviewsResult']['reviews']['review'][$r]['reviewBody']);

$results[$j]['reviewer'][$r]=sanitize($reviewstemp['ratingsAndReviewsResult']['reviews']['review'][$r]['reviewer']);

$results[$j]['rating'][$r]=$reviewstemp['ratingsAndReviewsResult']['reviews']['review'][$r]['rating'];
        }
    }
```

```php
        $sql="SELECT count(*) FROM allphotos WHERE id LIKE
'".$results[$j]['id']."' AND source LIKE '".$results[$j]['source']."' AND
DATE_SUB(CURDATE(),INTERVAL 3 DAY) < timestamp";
        $res = mysql_query($sql) or die(mysql_error());
        $rowscount = mysql_fetch_array($res);
        $photocount=$rowscount[0];

if($photocount>0) {
        $results[$j]['photosrc']="db";
        $sql = "SELECT * FROM allphotos WHERE id LIKE
'".$results[$j]['id']."' AND source LIKE '".$results[$j]['source']."' AND
DATE_SUB(CURDATE(),INTERVAL 3 DAY) < timestamp";
        $photoresult = mysql_query($sql) or die("Q:".$sql."Fatal error:
".mysql_error());
        $photodata = mysql_fetch_array($photoresult);
        $photodataarr =
unserialize(mysql_reverse_escape($photodata['results']));
        if(is_array($photodataarr['gallery'])) {
            $p=0;
            foreach($photodataarr['gallery'] as $photourl) {
                $results[$j]['gallery'][$p]=$photourl;
                $p++;
            }
        }
    }
    else
        $results[$j]['gallery'][0]=$ypresults[$i]['adImage'];

$ratingcnt=count($results[$j]['rating']);
        if(($results[$j]['averageRating']<=0 ||
$results[$j]['ratingCount']<=0) && $ratingcnt>0) {
            $ratingtotal=0;
            for($r=0;$r<$ratingcnt;$r++)
$ratingtotal+=$results[$j]['rating'][$r];
            $results[$j]['averageRating']=$ratingtotal/$ratingcnt;
            $results[$j]['ratingCount']=$ratingcnt;
        } display_results($j,$results[$j],0);
    $j++;
    }

/********************************************************************/
}

/**************** if not local search, do general search
****************/ else {
/***************************** BING SEARCH API
****************************/
// get 30 results from Bing Search $prevresultscount=count($results);

$rootUri = 'https://api.datamarket.azure.com/Bing/Search';
        $query = $cat;$query = urlencode("'$query'");
        $serviceOp ='Web';
        $market ='en-us';$market = urlencode("'$market'");
        $requestUrl =
"$rootUri/$serviceOp?\$format=json&Query=$query&Market=$market&\$Top=30";
```

```
   if($lat!="" && $lon!="")
      $requestUrl.=("&Latitude=".$lat."&Longitude=".$lon);
         $auth = base64_encode("$acctKey:$BingAcctKey");
         $data = array(
             'http' => array(
                        'ignore_errors' => true,
                        'header' => "Authorization: Basic $auth"
                        ));
         $context = stream_context_create($data);
         $response = @file_get_contents($requestUrl, 0, $context);
         $resultstemp=json_decode($response,true);
         $bingresults=$resultstemp['d']['results'];

$bingcount=count($bingresults);

$j=$prevresultscount;
   for($i=0;$i<$bingcount;$i++) {
      $results[$j]['source']="bing";
      $results[$j]['businessName']=$bingresults[$i]['Title'];
      $results[$j]['services']=$bingresults[$i]['Description'];
      $results[$j]['url']=$bingresults[$i]['Url'];
      $results[$j]['id']=$bingresults[$i]['Url'];

$results[$j]['displayurl']=limitstringlen($bingresults[$i]['DisplayUrl']
,35);
      $results[$j]['distance']=-1;

// Check if photos are already in our database
         $sql="SELECT count(*) FROM allphotos WHERE id LIKE
'".mysql_escape($results[$j]['id'])."' AND source LIKE
'".$results[$j]['source']."' AND DATE_SUB(CURDATE(),INTERVAL 3 DAY) <
timestamp";
         $res = mysql_query($sql) or die(mysql_error());
         $rowscount = mysql_fetch_array($res);
         $photocount=$rowscount[0];

if($photocount>0) {
            $results[$j]['photosrc']="db";
            $sql = "SELECT * FROM allphotos WHERE id LIKE
'".mysql_escape($results[$j]['id'])."' AND source LIKE
'".$results[$j]['source']."' AND DATE_SUB(CURDATE(),INTERVAL 3 DAY) <
timestamp";
            $photoresult = mysql_query($sql) or die("Q:".$sql."Fatal error:
".mysql_error());
            $photodata = mysql_fetch_array($photoresult);
            $photodataarr =
unserialize(mysql_reverse_escape($photodata['results']));
            for($p=0;$p<$photocount;$p++)
               $results[$j]['gallery'][$p]=$photodataarr['gallery'][$p];
            if($_GET['wcontact']=="on") {
            // extract contacts only
                  $siteinfo=get_site_data($results[$j]['url'],1,0);
               $results[$j]['phone']=formatPhone($siteinfo['phone']);
               $results[$j]['email']=$siteinfo['email'];
               }
            }
         else {
            if($_GET['wcontact']=="on") {
               // extract photos and contacts
                  $siteinfo=get_site_data($results[$j]['url'],1,1);
               $results[$j]['phone']=formatPhone($siteinfo['phone']);
```

```
            $results[$j]['email']=$siteinfo['email'];
            }
        else
            // extract photos only
                $siteinfo=get_site_data($results[$j]['url'],0,1);

$cntphotos=count($siteinfo['images']);
            if($cntphotos>0 && $MaxPhotos>0) $cntphotos=$MaxPhotos;
            for($p=0;$p<$cntphotos;$p++)
                $results[$j]['gallery'][$p]=$siteinfo['images'][$p];
            $photocount=$p;
        }

// if no photos extracted from site, get from google image search
        if($photocount==0) {
            $urlarr=parse_url($results[$j]['url']);
            $imagequery=strbetween("!@#$%".tld($urlarr[host]),"!@#$%",".");
            $imagequery=urlencode($imagequery." ".$cat);

$Googimgurl =
"https://ajax.googleapis.com/ajax/services/search/images?v=1.0&imgsz=medium
&as_filetype=jpg&q=";
            $imgresponse = (array)
json_decode(file_get_contents_curl($Googimgurl.$imagequery),true);

$cntphotos=count($imgresponse['responseData']['results']);
            if($cntphotos>0 && $MaxPhotos>0) $cntphotos=$MaxPhotos;
            for($p=0;$p<$cntphotos;$p++)

$results[$j]['gallery'][$p]=urldecode($imgresponse['responseData']['resu
lts'][$p][url]);
            $photocount=$p;
            $results[$j]['photosrc']="Google";
            }

// if no photos extracted from site, or from google, get from bing
image search
        if($photocount==0) {
                $rootUri =
'https://api.datamarket.azure.com/Bing/Search';
            $query = "'$imagequery'";
            $serviceOp ='Image';
            $requestUrl =
"$rootUri/$serviceOp?\$format=json&Query=$query&\$Top=".$MaxPhotos;
            if($lat!="" && $lon!="")
            $requestUrl.=("&Latitude=".$lat."&Longitude=".$lon);
                $auth = base64_encode("$acctKey:$BingAcctKey");
            $data = array(  'http' => array(
                                        'ignore_errors' => true,
                                        'header' => "Authorization: Basic
$auth"
                                    ));
                $context = stream_context_create($data);
            $response = @file_get_contents($requestUrl, 0, $context);
            $resultstemp=json_decode($response,true);

$bingimgresults=$resultstemp['d']['results'];

$cntphotos=count($bingimgresults);
            if($cntphotos>0 && $MaxPhotos>0) $cntphotos=$MaxPhotos;
            for($p=0;$p<$cntphotos;$p++)
```

```php
    $results[$j]['gallery'][$p]=$bingimgresults[$p][Thumbnail]['MediaUrl'];
            $photocount=$p;
            $results[$j]['photosrc']="Bing";
            } if($photocount>0) {
        display_results($j,$results[$j],0);
        $j++;
        }
    }
/*********************************************************************/

/****************************** YANDEX SEARCH API
*****************************/
// get 20 results from Yandex Search
    $prevresultscount=count($results);

$requestUrl="http://xmlsearch.yandex.com/xmlsearch?user=goodvenkat&key=".$YandexKey."&l10n=en&sortby=rlv&filter=strict&query=".urlencode($cat);
    if($loc!="") $requestUrl.=(urlencode(" in ".$loc));
    $yandexresults=yandex_parse($requestUrl);
    $resultstemp=$yandexresults;

$requestUrl="http://xmlsearch.yandex.com/xmlsearch?user=goodvenkat&key=".$YandexKey."&l10n=en&sortby=rlv&filter=strict&query=".urlencode($cat)."&page=1";
    if($loc!="") $requestUrl.=(urlencode(" in ".$loc));
    $yandexresults=yandex_parse($requestUrl);
        if(is_array($resultstemp) && is_array($yandexresults))
$resultstemp=array_merge($resultstemp,$yandexresults);
    else $resultstemp=$yandexresults;

$yandexresults=$resultstemp;

$yandexcount=count($yandexresults);

$j=$prevresultscount;

for($i=0;$i<$yandexcount;$i++) {

$results[$j]['source']="yandex";
        $results[$j]['businessName']=$yandexresults[$i]['Title'];
        $results[$j]['services']=$yandexresults[$i]['Description'];
        $results[$j]['url']=$yandexresults[$i]['Url'];
        $results[$j]['id']=$yandexresults[$i]['Url'];

$results[$j]['displayurl']=limitstringlen($yandexresults[$i]['DisplayUrl'],35);
        $results[$j]['distance']=-1;

// Check if photos are already in our database
        $sql="SELECT count(*) FROM allphotos WHERE id LIKE '".mysql_escape($results[$j]['id'])."' AND source LIKE '".$results[$j]['source']."' AND DATE_SUB(CURDATE(),INTERVAL 3 DAY) < timestamp";
        $res = mysql_query($sql) or die(mysql_error());
        $rowscount = mysql_fetch_array($res);
        $photocount=$rowscount[0];
```

```
            if($photocount>0) {
                $results[$j]['photosrc']="db";
                $sql = "SELECT * FROM allphotos WHERE id LIKE
'".mysql_escape($results[$j]['id'])."' AND source LIKE
'".$results[$j]['source']."' AND DATE_SUB(CURDATE(),INTERVAL 3 DAY) <
timestamp";
                $photoresult = mysql_query($sql) or die("Q:".$sql."Fatal error:
".mysql_error());
                $photodata = mysql_fetch_array($photoresult);
                $photodataarr =
unserialize(mysql_reverse_escape($photodata['results']));
                for($p=0;$p<$photocount;$p++)
                    $results[$j]['gallery'][$p]=$photodataarr['gallery'][$p];
                if($_GET['wcontact']=="on") {
                    // extract contacts only
                        $siteinfo=get_site_data($results[$j]['url'],1,0);
                    $results[$j]['phone']=formatPhone($siteinfo['phone']);
                    $results[$j]['email']=$siteinfo['email'];
                }
            }
        else {
            if($_GET['wcontact']=="on") {
                // extract photos and contacts
                    $siteinfo=get_site_data($results[$j]['url'],1,1);
                $results[$j]['phone']=formatPhone($siteinfo['phone']);
                $results[$j]['email']=$siteinfo['email'];
                }
            else
                // extract photos only
                    $siteinfo=get_site_data($results[$j]['url'],0,1);

$cntphotos=count($siteinfo['images']);
            if($cntphotos>0 && $MaxPhotos>0) $cntphotos=$MaxPhotos;
            for($p=0;$p<$cntphotos;$p++)
                $results[$j]['gallery'][$p]=$siteinfo['images'][$p];
            $photocount=$p;
        }

// if no photos extracted from site, get from google image search
        if($photocount==0) {
            // extract top level domain name from the search result URL
            $urlarr=parse_url($results[$j]['url']);
            $imagequery=strbetween("!@#$%".tld($urlarr[host]),"!@#$%",".");
            // generate a string: top level domain name + what user
searched for. And use this to search for images from image search engines
            $imagequery=urlencode($imagequery." ".$cat);

$Googimgurl =
"https://ajax.googleapis.com/ajax/services/search/images?v=1.0&imgsz=medium
&as_filetype=jpg&q=";
                $imgresponse = (array)
json_decode(file_get_contents_curl($Googimgurl.$imagequery),true);

$cntphotos=count($imgresponse['responseData']['results']);
            if($cntphotos>0 && $MaxPhotos>0) $cntphotos=$MaxPhotos;
            for($p=0;$p<$cntphotos;$p++)

$results[$j]['gallery'][$p]=urldecode($imgresponse['responseData']['resu
lts'][$p][url]);
            $photocount=$p;
```

```php
                $results[$j]['photosrc']="Google";
                }

// if no photos extracted from site, or from google, get from bing image search
        if($photocount==0) {
                $rootUri = 'https://api.datamarket.azure.com/Bing/Search';
                $query = "'$imagequery'";
                $serviceOp ='Image';
                $requestUrl = "$rootUri/$serviceOp?\$format=json&Query=$query&\$Top=".$MaxPhotos;
            if($lat!="" && $lon!="")
                $requestUrl.=("&Latitude=".$lat."&Longitude=".$lon);
                $auth = base64_encode("$acctKey:$BingAcctKey");
                $data = array(  'http' => array(
                                        'ignore_errors' => true,
                                        'header' => "Authorization: Basic $auth"
                                        ));
                $context = stream_context_create($data);
                $response = @file_get_contents($requestUrl, 0, $context);
                $resultstemp=json_decode($response,true);

$bingimgresults=$resultstemp['d']['results'];

$cntphotos=count($bingimgresults);
            if($cntphotos>0 && $MaxPhotos>0) $cntphotos=$MaxPhotos;
            for($p=0;$p<$cntphotos;$p++)

$results[$j]['gallery'][$p]=$bingimgresults[$p][Thumbnail]['MediaUrl'];
            $photocount=$p;
            $results[$j]['photosrc']="Bing";
                } if($photocount>0) {
        display_results($j,$results[$j],0);
        $j++;
        }
    }
}
/*******************************************************************/
}
    $resultscount=count($results);

if($resultscount>0) {
       $totalscore=0.0;
       for($i=0;$i<$resultscount;$i++)
    $totalscore+=$results[$i]['averageRating'];
       $averagescore=$totalscore/$resultscount;
       }

// weighted score calculation
    for($i=0;$i<$resultscount;$i++) {

$results[$i]['weightScore']=($results[$i]['ratingCount']/($results[$i]['ratingCount']+$ReviewMinCount)) * $results[$i]['averageRating'] + ($ReviewMinCount / ($results[$i]['ratingCount']+$ReviewMinCount)) * $averagescore;
        if($results[$i]['weightScore']==0) $results[$i]['weightScoreFactor']=0.00001;
        else $results[$i]['weightScoreFactor']=$results[$i]['weightScore'];
```

```
      }

$serresults=mysql_escape(serialize($results));
   $cattag=$cat."_".$_GET['wcontact'];
   $sql = "REPLACE INTO alldb (cat, loc, results) VALUES ('$cattag',
'$loc', '$serresults')";
   $result = mysql_query($sql) or die("Q:".$sql."Fatal error:
".mysql_error());
   } mysql_close($db);
?>
   </div>

</form>

</div>
<!-- Container / End -->

</div>

<?php
function display_results($i,$results) {
global $deviceType;
$space="    ";

if($results['gallery'][0]!="") $imagedis=$results['gallery'][0];
   else if($deviceType!="phone" || $results['source']=="yelp" ||
$results['source']=="yellow pages") $imagedis="images/yellcastblog-
0".rand(1,5)."b.jpg";

echo '
   <article class="post medium">
      <div class="five alt columns alpha">
         <section class="flexslider post-img">
            <div style="position: relative; left: 0; top: 0;">
            <div id="photosdiv'.$i.'" class="media">
            <ul class="slides mediaholder">
               <li><img src="'.$imagedis.'"
onerror="this.src=\''.'img.php?i='.urlencode($imagedis).'\'";
style="position: relative; top: 0; left:
0;';if(stripos($imagedis,"yellcastblog-")!==false) echo 'opacity:.1;'; echo
'"/>';
               if(($results['source']=="yelp" ||
$results['source']=="yellow pages") && $results['photosrc']!="db")  {
                  echo '<a class="flex-next" href="#"
onclick="javascript:photosajax(\'photosdiv'.$i.'\',\''.$i.'\',\''.$results[
'id'].'\',\''.$results['source'].'\');return false;">
                  <img src="images/tabarr.png"
style="width:30px;height:50px;';if($results['source']=="yellow pages" &&
stripos($imagedis,"images/blog")===false) echo 'position: absolute; top:
8%; right: 0px;'; else echo 'margin-top:-24px; position: absolute; top:
50%; right: 0px;';if(stripos($imagedis,"images/blog")!==false) echo '
opacity:.45;'; echo '"/></a>';
                  echo '</li>
                  </ul>';
                  }
               else {for($p=1;$p<(count($results['gallery']));$p++)
                     if($results['gallery'][$p]!="") echo '<li><img
src="'.$results['gallery'][$p].'" alt=""/></li>';
                     echo "</ul>";
```

```
                }
            if($_GET['dbg']==1 && $results['photosrc']!="") echo '<span
style="font-size:9px;">Image Source: '.$results['photosrc'].'</span>';
            echo '
        </div>
        </div>
    </section>
</div>';

// display photo(s) inline with content summary description echo '
<div class="eight columns">
    <section class="post-content">

<header class="meta">';
            if($results['url']!="") {
                echo '<h2 style="word-wrap: break-word;" >'.($i+1).'. <a
target="_blank"
href="'.$results['url'].'">'.$results['businessName'].'</a></h2>';
                echo '<a target="_blank"
href="'.$results['url'].'">'.$results['displayurl'].'</a>';
            }
            else echo '<h2 style="word-wrap: break-word;" >'.($i+1).'.
'.$results['businessName'].'</h2>';
            echo '<ul>';
            echo '<li>';
            if($results['averageRating']>=0.01) echo
yelp_star_rate($results['averageRating'],"-very-large")."Average Rating:
".$results['averageRating'];
            if($results['ratingCount']!="") echo $space."# of
Ratings: ".$results['ratingCount'];
            if($_GET['sort']=="rate" && $results['weightScore']!="")
echo $space."Weighted Score: ".round($results['weightScore'],2);
            echo '</li>
            </ul>
        </header>

<p style="word-wrap: break-word;" >';
            if($results['services']!="") {
                echo limitstringlen($results['services'],500);
                echo "<br />";
            }
            if($results['street']!="" || $results['city']!="" ||
$results['state']!="" || $results['zip']!="") {
                echo "<i class=\"icon-map-marker\" style=\"margin-
right:3px;\"></i>  ";if($results['street']!="")   echo
$results['street'];if($results['street2']!="") echo "
".$results['street2'];if($results['street3']!="") echo "
".$results['street3'];if($results['street']!="" && $results['city']!="")
echo ", ";if($results['city']!="") echo
$results['city'];if($results['city']!="" && $results['state']!="") echo ",
"; if($results['state']!="") echo $results['state'];if($results['zip']!="")
echo " ".$results['zip'];
                if($results['street']!="" && $results['city']!="" &&
$results['state']!="" && stripos($results['street'],"PO Box")===false) {
$maplink="https://maps.google.com/?daddr=".str_replace("
","+",$results['street'].", ".$results['city'].", ".$results['state']);
if($lat!="" && $lon!="") $maplink.="&saddr=".$lat.",".$lon; echo "<a
target=\"_blank\" href=\"".$maplink."\"> <span>[Map]</span></a><br
/>";} else echo "<br />";
```

```
            }
            if($results['distance']!="-1") echo "<i class=\"icon-
road\"></i>  ".$results['distance']." miles<br />";
            $ohlen=strlen($results['openHours']);
            if($ohlen>1 && $ohlen<=70) {
                echo "<i class=\"icon-time\"></i>
 ".$results['openHours']."<br />";
            }
            if($ohlen>70) {
                echo "<i class=\"icon-time\"></i>  <a
href=\"javascript:toggleDiv('openhours".$i."');\">Open Hours</a>
                <div style=\"display:none;padding:0px;width:90%;\"
id=\"openhours".$i."\">".$results['openHours']."</div>";
            }
            if($results['paymentMethods']!="") echo "<i class=\"icon-
credit-card\"></i>  ".$results['paymentMethods']."<br />";
            if($results['phone']!="") echo "<i class=\"icon-phone\"></i>
 ".$results['phone']."<br />";
            if($results['mobilePhone']!="") echo "<i class=\"icon-mobile-
phone\" style=\"margin-right:5px;\"></i>
 ".$results['mobilePhone']."<br />";
            if($results['email']!="") echo "<i class=\"icon-envelope\"
style=\"margin-right:2px;\"></i> ".$results['email']."<br />";
            if($results['source']!="") echo '<div style="margin:12px 0 10px
0;opacity:0.5;"><img src="images/'.str_replace("
","_",$results['source']).'.png" /></div>';
            echo '</p>
        </section>
     </div>

<input type="hidden" name="idx[]" id="idx['.$i.']" value="" />';
     echo '<input type="hidden" name="sname[]" id="sname['.$i.']"
value="';if($results['businessName']!="")   echo $results['businessName'];
echo '"/>';
     echo '<input type="hidden" name="sellerid[]" id="sellerid['.$i.']"
value="';if($results['sellerID']!="")   echo $results['sellerID']; echo
'"/>';
     echo '<input type="hidden" name="phone[]" id="phone['.$i.']"
value="';if($results['phone']!="")   echo $results['phone']; echo '"/>';
     echo '<input type="hidden" name="cell[]" id="cell['.$i.']"
value="';if($results['mobilePhone']!="")   echo $results['mobilePhone'];
echo '"/>';
     echo '<input type="hidden" name="email[]" id="email['.$i.']"
value="';if($results['email']!="")   echo $results['email']; echo '"/>';

// if there is a contact email or phone number that was extracted,
display the Select button to contact them
     if($results['email']!="" || $results['phone']!="") echo '<div
id="selectdiv'.$i.'" class="two columns"><button class=" sub-btn"
onclick="selectthis('.$i.');return false;"><i class="icon-check-sign
white"></i> Select </button></div>';

if(count($results['review'])==1 && $results['review'][0]!="") {
        echo '<div class="fourteen columns">
            <div id="testimonials'.$i.'" class="showbiz-container">
            <div id="reviewsdiv'.$i.'">

<h3 class="headline">Reviews</h3><div class="clearfix"></div>

<span class="line" style="margin-bottom:0;"></span>';
            if($results['source']=="yelp" && $results['dbreviews']!=1)
```

```
                echo '<div class="showbiz-navigation">
                    <a href="#"
onclick="javascript:reviewsajax(\'reviewsdiv'.$i.'\',\''.$i.'\',\''.$result
s['id'].'\');return false;">
                    <div id="showbiz_right_1'.$i.'" class="sb-navigation-
right"><i class="icon-angle-right" style="margin-
right=10px;"></i></div></a>
                </div>';

echo '<div class="showbiz">
                        <ul>
                    <li class="testimonial">
                        <div class="testimonials">';
                            if($results['rating'][0]!="") echo
yelp_star_rate($results['rating'][0],"");
                            if($results['review'][0]!="") echo
$results['review'][0];
                        echo '</div>';

echo '<div class="testimonials-bg"></div>
                            <div class="testimonials-author">';
                            if($results['rating'][0]!="") echo
"<span>Rating: ".$results['rating'][0]."</span><br />";
                            if($results['reviewDate'][0]!="") echo
"<span>".$results['reviewDate'][0]."</span><br />";
                            if($results['reviewerimg'][0]!="") echo '<img
src="'.$results['reviewerimg'][0].'"/>';
                                        //else   echo "<img
src=\"images/dum.png\"/><br />";
                            if($results['reviewer'][0]!="") echo
"<span>".$results['reviewer'][0]."</span>";
                        echo '</div>';
                    echo ' </li>
                        </ul>
                    </div>
                </div>
            </div>';
        } if(count($results['review'])>1) {
        echo '<div class="fourteen columns">
            <div id="testimonials'.$i.'" class="showbiz-container">

<h3 class="headline">Reviews</h3><div class="clearfix"></div>

<span class="line" style="margin-bottom:0;"></span>
            <div class="showbiz-navigation">
            <div id="showbiz_left_1'.$i.'" class="sb-navigation-left"><i
class="icon-angle-left"></i></div>
            <div id="showbiz_right_1'.$i.'" class="sb-navigation-right"><i
class="icon-angle-right"></i></div>
            </div>

<div class="showbiz" data-left="#showbiz_left_1'.$i.'" data-
right="#showbiz_right_1'.$i.'">
                <div class="overflowholder">
                    <ul>';
                    for($r=0;$r<count($results['review']);$r++) {
                        echo '<li class="testimonial">
                            <div class="testimonials">';
```

```
                                    if($results['rating'][$r]!="")
                                        echo
yelp_star_rate($results['rating'][$r],"");
                                    echo $results['review'][$r].'
                                </div>
                                <div class="testimonials-bg"></div>
                                <div class="testimonials-author">';
                                    if($results['rating'][$r]!="") echo
"<span>Rating: ".$results['rating'][$r]."</span><br />";
                                    if($results['reviewDate'][$r]!="") echo
"<span>".str_replace("Updated
review","",$results['reviewDate'][$r])."</span><br />";
                                    if($results['reviewerimg'][$r]!="")
echo "<img src=\"".$results['reviewerimg'][$r]."\"/><br />";
                                    //else  echo "<img
src=\"images/dum.png\"/><br />";
                                    if($results['reviewer'][$r]!="") echo
"<span>".ucwords($results['reviewer'][$r])."</span>";
                                    echo '   </div>
                                </li>';
                            }
                            echo '</ul>
                            </div>
                        </div>
                    </div>
                </div>
                <script>
                    jQuery(\'#testimonials'.$i.'\').showbizpro({
                        dragAndScroll:"off",
                        visibleElementsArray:[1,1,1,1],
                        carousel:"off",
                        entrySizeOffset:0,
                        allEntryAtOnce:"off"
                        });
                </script>';

} echo '<div class="clearfix"></div>
    </article>';
} function dispinfo($info,$nkey,$labels,$label,$len) {
    $content="";
    if(is_array($info)) {
      for($j=0;$j<count($info[$nkey]);$j++) {
        if($labels!="" && $j==0) $content.=$labels.": ";
        $content.=$info[$nkey][$j];
        if($j!=(count($info[$nkey])-1)) $content.=", ";
      }
      echo "<br />";
      echo limitstringlen($content,$len);
    }
    if(!is_array($info) && $info!="") {
        if($label!="") echo $label.": ";
        echo "<br />";
        echo limitstringlen($info[$nkey][$j],$len);
    }
} function yelp_search($term, $location, $lat, $lon) {
```

```
    $url_params = array();

if(str_word_count($term)>1) $url_params['term'] = '"'.$term.'"';
    else $url_params['term'] = $term;

if($lat=="" || $lon =="") $url_params['location'] = $location;
    if($lat!="" && $lon !="") $url_params['ll'] = $lat.",".$lon;
    $url_params['limit'] = $GLOBALS['YelpMaxResults'];
    $url_params['sort'] = 2;
    $search_path = $GLOBALS['SEARCH_PATH'] . "?" .
http_build_query($url_params);
    return json_decode(yelp_request($GLOBALS['API_HOST'], $search_path),
true);
} function yelp_get_business($business_id) {
    $business_path = $GLOBALS['BUSINESS_PATH'] . $business_id;
    return json_decode(yelp_request($GLOBALS['API_HOST'], $business_path),
true);
} function yelp_request($host, $path) {
    $unsigned_url = "http://" . $host . $path;
    $token = new OAuthToken($GLOBALS['TOKEN'], $GLOBALS['TOKEN_SECRET']);
    $consumer = new OAuthConsumer($GLOBALS['CONSUMER_KEY'],
$GLOBALS['CONSUMER_SECRET']);
    $signature_method = new OAuthSignatureMethod_HMAC_SHA1();

$oauthrequest = OAuthRequest::from_consumer_and_token(
        $consumer,
        $token,
        'GET',
        $unsigned_url
    );

$oauthrequest->sign_request($signature_method, $consumer, $token);
    $signed_url = $oauthrequest->to_url();

$ch = curl_init($signed_url);
    curl_setopt($ch, CURLOPT_RETURNTRANSFER, true);
    curl_setopt($ch, CURLOPT_HEADER, 0);
    $data = curl_exec($ch);
    curl_close($ch);
    return $data;
} function yelp_star_rate($score,$size) {
    $wholescore=floor($score);
    if(($score-$wholescore)>=0.5) $wholescore.="_half";

return '<div class="rating'.$size.'">
    <i class="star-img stars_'.$wholescore.$fractstr.'" title="'.$score.'
star rating">
    <img alt="'.$score.' star rating" class="offscreen" height="303"
src="images/stars_map.png" width="84">
    </i></div>';
} function yandex_parse($requestUrl) {
        $i=0;
        $resultsarr=array();
```

```php
        $response = @file_get_contents_curl($requestUrl);
        $response=str_replace("<hlword>","",$response);
        $response=str_replace("</hlword>","",$response);
        $resultsxmlarr=xml2array($response,1,"attribute");

foreach($resultsxmlarr['yandexsearch']['response']['results']['grouping']['group'] as $resultsdoc) {

$resultsarr[$i]['Title']=$resultsdoc['doc']['title']['value'];
      if($resultsdoc['doc']['headline']['value']!="")
$resultsarr[$i]['Description']=$resultsdoc['doc']['headline']['value']." ";
      if($resultsdoc['doc']['passages']['passage']['value']=="" &&
is_array($resultsdoc['doc']['passages']['passage']))
         foreach($resultsdoc['doc']['passages']['passage'] as $passage)
            $resultsarr[$i]['Description'].=$passage['value']." ";
      else
$resultsarr[$i]['Description'].=$resultsdoc['doc']['passages']['passage']['value'];
               $resultsarr[$i]['Url']=$resultsdoc['doc']['url']['value'];

$resultsarr[$i]['DisplayUrl']=$resultsdoc['doc']['domain']['value'];
               $resultsarr[$i]['source']="yandex";
               $i++;
               }
        return $resultsarr;
} function get_site_data($siteurl,$wcontact,$wphotos) { global $MaxPhotos;

$contenthtml = file_get_html($siteurl);

if($contenthtml!="") {
      if($wphotos==1) {
      $i=0;
      // use all the img tags to find the photos (links) with .jpg or .jpeg extensions
      foreach($contenthtml->find('img') as $img) {
         if(stripos(strtolower($img->src),".jpg")!==false ||
stripos(strtolower($img->src),".jpeg")!==false) {
            $imgbaseurl=url_to_abs($siteurl,$img->src);
            $imgsize=getimagesize($imgbaseurl);
            // check for image dimensions to be minimum 200x100 or 100x200 pixels
            if(($imgsize[0]>200 && $imgsize[1]>100) || ($imgsize[0]>100 && $imgsize[1]>200)) {
               $siteinfo['images'][$i]=$imgbaseurl;
               $i++;
               if($i==$MaxPhotos) break;
               }
            }
         }
      } if($wcontact==1) {
            $email="";$phone="";

foreach($contenthtml->find('a') as $element) {
```

```php
            // check for word contact to be present to decide its a contact link
            if(stripos($element,"contact")!==false && stripos($element,"javascript")===false) {
                if(stripos($contenthtml,"<base href=")!==false) {
                    $baseURL=strbetween($contenthtml,"<base href=\"","\"");
                    $contactlink=$baseURL.$element->href;
                }
                else
                    $contactlink=url_to_abs($siteurl,$element->href);
                break;
            }
        }
    // extract mailto tags to get get emails in the main page
    foreach($contenthtml->find('a') as $element) {
        if(stripos($element,"mailto")!==false) {
            $newemail=pull_email($element->outertext);
            if($email!="" && strlen($newemail)>4 && stripos($email,$newemail)===false)
                $email.=", ".$newemail;
            elseif($email=="")
                $email=$newemail;
        }
    }

$newemail=pull_email($contenthtml->plaintext);
    if($email!="" && strlen($newemail)>4 && stripos($email,$newemail)===false)
        $email.=", ".$newemail;
    elseif($email=="") $email=$txtnewemail;
    $phone=pull_phone($contenthtml->plaintext);

$contenthtml->clear();
    unset($contenthtml);

if($contactlink!="")
        $contacthtml = file_get_html($contactlink);

if($contacthtml!="") {
        foreach($contacthtml->find('a') as $element) {
            if(stripos($element,"mailto")!==false) {
                $newemail=pull_email($element->outertext);
                if($email!="" && strlen($newemail)>4 && stripos($email,$newemail)===false)
                    $email.=", ".$newemail;
                elseif($email=="")
                    $email=$newemail;
            }
        }
        $newemail=pull_email($contacthtml->plaintext);
        if($email!="" && strlen($newemail)>4 && stripos($email,$newemail)===false)
            $email.=", ".$newemail;
        elseif($email=="") $email=$newemail;
```

```
                                 $phone=pull_phone($contacthtml->plaintext);

$contacthtml->clear();
              unset($contacthtml);
              }

$siteinfo['phone']=$phone;
         $siteinfo['email']=$email;
                    }
              elseif($contenthtml!="") {
         $contenthtml->clear();
         unset($contenthtml);
         } return $siteinfo;
         }
} function pull_email($string) {
// standard patterns to extract email addresses
    $pattern = '/[A-Za-z0-9_-]+@[A-Za-z0-9_-]+\.([A-Za-z0-9_-][A-Za-z0-
9_]+)/';
    preg_match($pattern, html_entity_decode($string), $match);
    return $match[0];
} function pull_phone($string) {
// standard patterns to extract phone numbers .. hit or miss but mostly
hits!
    $pattern = '/\b\d{3}\s*[-. ()]\s*\d{3}\s*[-. ()]\s*\d{4}\b/';
    preg_match($pattern, $string, $match);
    if($match[0]!=NULL) return numbers($match[0]);

$pattern = '/\b\d{3}\s*\s*\d{3}\s*\s*\d{4}\b/';
    preg_match($pattern, $string, $match);
    if($match[0]!=NULL) return numbers($match[0]);
} function tld($str) {
// extract top level domain name from the URL string
    preg_match("/^(http:\/\/)?([^\/]+)/i",$str, $matches);
    $host = $matches[2];
    preg_match("/[^\.\/]+\.[^\.\/]+$/", $host, $matches);
    return $matches[0];
}

?>

<script>

<?php
if($lat!="" || $lon!="" || $loc!="")
    echo "document.getElementById('menuoptions').style.display= 'inline';";
?> function init_select() {
    var idxval=document.request.elements['idx[]'];
    for (var i = 0; i < idxval.length; i++) {
        if (document.getElementById('idx['+i+']') != null) var
idx=document.getElementById('idx['+i+']').value;
        if(idx!="") selectthis(idx);
```

```
        }
}

$(document).ready(init_select);
</script>

<? include "footer.php"; ?>
```

Appendix C: img.php

```php
<?php

//define the type of data returned to be an image
header('Content-Type: image');

// fetch the image contents from the image URL passed through GET parameter
and return the contents to be displayed
if ($_GET["i"]!="") echo file_get_contents($_GET["i"]);
?>
```

Appendix D: headersearch.php

```
<!DOCTYPE html>
<!--[if IE 8 ]><html class="ie ie8" lang="en"> <![endif]-->
<!--[if (gte IE 9)|!(IE)]><!--><html lang="en"> <!--<![endif]-->
<head>

<link rel="search" type="application/opensearchdescription+xml"
title="yellCast" href="http://www.yellcast.com/yellcast.xml">

<!-- Basic Page Needs
================================================== -->
<meta charset="utf-8">
<title>yellCast</title>

<!-- Mobile Specific Metas
================================================== -->
<meta name="viewport" content="width=device-width, initial-scale=1,
maximum-scale=1">

<meta name="apple-mobile-web-app-capable" content="yes">
<meta name="mobile-web-app-capable" content="yes">
<meta name="apple-mobile-web-app-title" content="yellCast">

<link rel="shortcut icon" sizes="16x16" href="ath/imgs/yplane-16x16.png" />
<link rel="shortcut icon" sizes="200x200" href="ath/imgs/yplane-
200x200.png" />
<link rel="apple-touch-icon-precomposed" href="ath/imgs/yplane-200x200.png"
/>
<link rel="stylesheet" type="text/css"
href="ath/style/addtohomescreen.css">

<!-- CSS
================================================== -->
<link rel="stylesheet" href="css/style.css">
<link rel="stylesheet" href="css/colors/yellow.css" id="colors">

<!--[if lt IE 9]>
    <script
src="http://html5shim.googlecode.com/svn/trunk/html5.js"></script>
<![endif]-->

</head>

<!-- Java Script
================================================== -->
<script src="scripts/jquery.min.js"></script>
<script src="scripts/jquery.themepunch.plugins.min.js"></script>
<script src="scripts/jquery.themepunch.revolution.min.js"></script>
<script src="scripts/jquery.easing.min.js"></script>
<script src="scripts/jquery.tooltips.min.js"></script>
<script src="scripts/jquery.themepunch.showbizpro.min.js"></script>
<script src="scripts/jquery.magnific-popup.min.js"></script>
<script src="scripts/jquery.superfish.js"></script>
<script src="scripts/jquery.flexslider.js"></script>
<script src="scripts/jquery.contact.js"></script>
<script src="scripts/jquery.isotope.min.js"></script>
<script src="scripts/custom.js"></script>
```

```
<script src="scripts/post.js"></script>
<script>
$(function() {
    $.stayInWebApp();
});
(function($){$.extend({stayInWebApp:function(b){"standalone"in
window.navigator&&window.navigator.standalone&&(b||(b="a"),$("body").delega
te(b,"click",function(b){if($(this).attr("target")==void
0||$(this).attr("target")==""||$(this).attr("target")=="_self"){var
c=$(this).attr("href");if(c!='#' &&
!c.match(/^http(s?)/g))b.preventDefault(),self.location=c}})}})})(jQuery);
</script>
<script>
function checkenter(e) {
    var keynum;
    if(window.event)
    keynum = e.keyCode;
    else if(e.which)
    keynum = e.which;
    if(keynum=='13') dosubmit();
} function dosubmit() {
    document.search.submit();
} function ajaxget(str,phpfile,divid,p1){
    if(str.length>2){
    var url=
phpfile+'.php?str='+encodeURIComponent(str)+'&p1='+encodeURIComponent(p1);
    objXmlHTTP.open("GET",url);
    objXmlHTTP.onreadystatechange = function alertuser() {
                if (objXmlHTTP.readyState == 4 && (objXmlHTTP.status==200 ||
window.location.href.indexOf("http")==-1))
                        document.getElementById(divid).innerHTML =
objXmlHTTP.responseText;
                }
    objXmlHTTP.send("");
    }
} function fillinput(divid,string) {
    document.getElementById(divid).value = string;
    document.getElementById('catlocdiv').innerHTML ='';
} function filldone() {
    document.getElementById('catlocdiv').innerHTML ='';
}
</script>

<body>

<!-- Header
================================================== -->
<header id="header">

<!-- Container -->
<div class="container">
```

```
        <!-- Logo / Mobile Menu -->
        <div class="sixteen columns">

<div id="logo">
                <a href="index.php?cck=1"><img src="images/logo.png" alt="yellCast" /></a>
            </div>

<?php
    if($deviceType=="computer") {
    echo '
    <form name="search" id="search" action="aresults.php" mode="get">
        <div style="margin-top:9px;">
        <ul>
            <li>
                <div id="typesel" class="five columns" style="margin-bottom:7px;">
                <button class="text-btn" type="text" onclick="filldone();return false;">What</button>
                <input id="type" name="type" class="search" type="text" value="'.$_GET['type'].'" onkeypress="checkenter(event);" onclick="if(this.value == \''.$_GET['type'].'\') {this.value = \'\';}" onblur="if (this.value == \'\') {this.value = \''.$_GET['type'].'\';}" onkeyup="return ajaxget(this.value,\'getcat\',\'catlocdiv\',\'\');" />
                </div>
            </li>
            <li>
                <div id="locsel" style="width:260px;" class="five columns" style="margin-bottom:7px;">
                <button class="text-btn" onclick="filldone();return false;">Where</button>
                <input id="loc" name="loc" class="search" type="text" value="'.$_GET['loc'].'" onkeypress="checkenter(event);" onclick="if(this.value != \'\') {defloc=this.value; this.value = \'\';document.getElementById(\'lat\').value = \'\';document.getElementById(\'lon\').value = \'\';}" onblur="if(document.getElementById(\'loc\').value.length<2) document.getElementById(\'wcontact\').style.display=\'inline\';" onkeyup="if(document.getElementById(\'loc\').value.length>=2) document.getElementById(\'wcontact\').style.display=\'none\';return ajaxget(this.value,\'getloc\',\'catlocdiv\',\'\');" />
                </div>
            </li>
            <li>
                <div id="searchbut" class="two columns" style="margin-bottom:7px;">
                <button style="width:90px;float:left;" class="text-btn text-colorbtn text-btn-width" type="submit">Get it!</button>
                </div>
            </li>
        </ul>
        <div style="padding-top:7px"><div id="wcontact" style="';if($_GET['loc']!="") echo 'display:none;'; echo 'font-size:11px;"><input id="wcontact" name="wcontact" type="checkbox" style="position:relative;vertical-align:middle;bottom:2px;transform: scale(0.9);-webkit-transform: scale(0.9);"';if($_GET['wcontact']=="on") echo 'checked'; echo '/> With Contacts</div></div>
        <input id="lat" name="lat" type="hidden" />
        <input id="lon" name="lon" type="hidden" />
        </div>
    </form>
```

```
        <div id="catlocdiv" style="color:#a7a7a7;" class="twelve columns"
></div>
    ';
    }
?>
    </div>
</div>
<!-- Container / End -->

</header>
<!-- Header / End -->
```

Appendix E: mdata.php

```php
<?php
session_start();
include_once('constants.php');
include_once("../includes/functions/functions.php");
include_once("dbconn.php");

$_GET['sid']=str_replace("#","",$_GET['sid']);
$_GET['rt']=str_replace("#","",$_GET['rt']);
$_GET['up']=str_replace("#","",$_GET['up']);

if(!isset($_SESSION['ckid'])) $_SESSION['ckid']=uniqid();

if($_GET['sid']=="" && $_SESSION['sid']!="") $_GET['sid']=$_SESSION['sid'];
else $_SESSION['sid']=$_GET['sid'];
if($_GET['rt']=="" && $_SESSION['rt']!="") $_GET['rt']=$_SESSION['rt'];
else $_SESSION['rt']=$_GET['rt'];

$sid=$_GET['sid'];
$rt=$_GET['rt'];
$ckid=$_SESSION['ckid'];
if($sid=="" || $rt=="") $rt="t";

if($sid=="") {$tblname="checkboxsend";$id=$ckid;}
else {$tblname="sellerleads";$id=$sid;} if($rt=="t") {$media="media_t";$vmedia="media_r";}
if($rt=="r") {$media="media_r";$vmedia="media_t";} if($rt=="t" && $sid=="") {
        if(is_array($_POST['idx'])) {
        $i=0;
        foreach($_POST['idx'] as &$post) {
            if($post!='') {
                $selectedarray[$i]=array (    "name" => $_POST['sname'][$post],
                                "sellid" => $_POST['sellerid'][$post],
                                "phone" => $_POST['phone'][$post],
                                "cell" => $_POST['cell'][$post],
                                "email" => $_POST['email'][$post]
                                );
            $i++;
            }
        }
        $jsonselected=json_encode($selectedarray);
        }

$count = mysql_num_rows(mysql_query("SELECT * FROM checkboxsend WHERE id='". $ckid."'"));
        if($count==0) {
            $sql = "INSERT INTO checkboxsend (id,sendlist) VALUES ('". $ckid."','".mysql_escape($jsonselected)."')";
            $result = mysql_query($sql) or die("Q:".$sql."Fatal error: ".mysql_error());
        }
    } for($i=0;$i<count($_FILES['filesToUpload']['name']);$i++) {
    if($_FILES['filesToUpload']['error'][$i] > 0) {
```

```php
            $upmessage= "Error: " . $_FILES['filesToUpload']['error'][$i] .
"<br />";
            }
        else {
            $validExtensions = array('.jpg', '.jpeg', '.gif', '.png', '.JPG',
'.JPEG', '.GIF', '.PNG');
            $fileExtension = strrchr($_FILES['filesToUpload']['name'][$i],
".");
                if(in_array($fileExtension, $validExtensions)) {
                $rand=microtime()*1000000;
                $newName = $rand . '_' . $_FILES['filesToUpload']['name'][$i];
                $destination = 'uploads/' . $newName;
                if(move_uploaded_file($_FILES['filesToUpload']['tmp_name'][$i],
$destination)) {
                    $upmessage= 'File ' .$newName. ' succesfully uploaded<br>';
                    $uploaded="photos";
                    $sql = "SELECT * FROM ".$tblname." WHERE id='".$id."'";
                    $result = mysql_query($sql) or die("Q:".$sql."Fatal error:
".mysql_error());
                    $recordinfo=mysql_fetch_array($result);

if($recordinfo[$media]!="")
$mediaarr=json_decode($recordinfo[$media],true);
                    if(is_array($mediaarr['photo']))
array_unshift($mediaarr['photo'],$newName);
                    else $mediaarr['photo'][0]=$newName;

$mediastr=json_encode($mediaarr);
                    $sql = "UPDATE ".$tblname." SET ".$media."='".$mediastr."'
WHERE id='".$id."'";
                    $result = mysql_query($sql) or die("Q:".$sql."Fatal error:
".mysql_error());
                }
            }
        }
    } if(!$uploaded) {
    if($_FILES['photoToUpload']['error'][$i] > 0) {
            $upmessage= "Error: " . $_FILES['photoToUpload']['error'][$i] .
"<br />";
            }
        else {
            $validExtensions = array('.jpg', '.jpeg', '.gif', '.png', '.JPG',
'.JPEG', '.GIF', '.PNG');
            $fileExtension = strrchr($_FILES['photoToUpload']['name'][$i],
".");
                if(in_array($fileExtension, $validExtensions)) {
                $rand=microtime()*1000000;
                $newName = $rand . '_' . $_FILES['photoToUpload']['name'][$i];
                $destination = 'uploads/' . $newName;
                if(move_uploaded_file($_FILES['photoToUpload']['tmp_name'][$i],
$destination)) {
                    $upmessage= 'File ' .$newName. ' succesfully uploaded<br>';
                    $uploaded="photo";
                    $sql = "SELECT * FROM ".$tblname." WHERE id='".$id."'";
                    $result = mysql_query($sql) or die("Q:".$sql."Fatal error:
".mysql_error());
                    $recordinfo=mysql_fetch_array($result);
```

```php
            if($recordinfo[$media]!="")
$mediaarr=json_decode($recordinfo[$media],true);
            if(is_array($mediaarr['photo']))
array_unshift($mediaarr['photo'],$newName);
            else $mediaarr['photo'][0]=$newName;

$mediastr=json_encode($mediaarr);
            $sql = "UPDATE ".$tblname." SET ".$media."='".$mediastr."'
WHERE id='".$id."'";
            $result = mysql_query($sql) or die("Q:".$sql."Fatal error:
".mysql_error());
            }
        }
        }
    } if(!$uploaded) {
    if($_FILES['videoToUpload']['error'][$i] > 0) {
        $upmessage= "Error: " . $_FILES['videoToUpload']['error'][$i] .
"<br />";
        }
    else {
        $validExtensions = array('.mp4', '.MP4', '.avi', '.AVI', '.mov',
'.MOV', '.mpg', '.MPG', '.M4V', '.m4v', '.mpeg', '.MPEG');
        $fileExtension = strrchr($_FILES['videoToUpload']['name'][$i],
".");
            if(1 || in_array($fileExtension, $validExtensions)) {
            $rand=microtime()*1000000;
            $newName = $rand . '_' . $_FILES['videoToUpload']['name'][$i];
            $destination = 'uploads/' . $newName;
            if(move_uploaded_file($_FILES['videoToUpload']['tmp_name'][$i],
$destination)) {
                $upmessage= 'File ' .$newName. ' succesfully uploaded<br>';
                $uploaded="video";
                $sql = "SELECT * FROM ".$tblname." WHERE id='".$id."'";
                $result = mysql_query($sql) or die("Q:".$sql."Fatal error:
".mysql_error());
                $recordinfo=mysql_fetch_array($result);

if($recordinfo[$media]!="")
$mediaarr=json_decode($recordinfo[$media],true);
                if(is_array($mediaarr['video']))
array_unshift($mediaarr['video'],$newName);
                else $mediaarr['video'][0]=$newName;

$mediastr=json_encode($mediaarr);
                $sql = "UPDATE ".$tblname." SET ".$media."='".$mediastr."'
WHERE id='".$id."'";
                $result = mysql_query($sql) or die("Q:".$sql."Fatal error:
".mysql_error());
                    }
                }
            }
        }
    }

$entry="Form".$uploaded;
$trace=$entry;
include_once('analytics.php');
```

```php
        if($uploaded=='video')
{$uploaded="";$postupurl=curPageURL()."?up=v&sid=".$sid."&rt=".$rt;header("
Location: $postupurl"); exit;}
        if($uploaded=='photo')
{$uploaded="";$postupurl=curPageURL()."?up=p&sid=".$sid."&rt=".$rt;header("
Location: $postupurl"); exit;}
        if($uploaded=='photos')
{$uploaded="";$postupurl=curPageURL()."?up=f&sid=".$sid."&rt=".$rt;header("
Location: $postupurl"); exit;}

$headertype="lite";
include "header.php";
?>

<!-- Content Wrapper / Start -->
<div id="content-wrapper">

<!-- Titlebar
================================================== -->
<section id="titlebar"></section>

<!-- Container -->
<div class="container">

<div class="fifteen columns">

<!-- Results Message -->
        <div id="result">
            <?php
            if($rt=="t") {
                if($ckid=="" && $sid=="") echo '<div class=\'notification error closeable\'><p><span>'.$TSelectMessage.'</span></p><a class="close" href="#"></a></div>';
                else {
                    if($_GET['up']=="" && $rt=="") echo '<div class=\'notification notice closeable\'><p><span>'.$TInitialMessage.'</span></p><a class="close" href="#"></a></div>';
                    if($_GET['up']=="p") echo '<div class=\'notification success closeable\'><p><span>'.$TPhotoMessage.'</span></p><a class="close" href="#"></a></div>';
                    if($_GET['up']=="f") echo '<div class=\'notification success closeable\'><p><span>'.$TPhotosMessage.'</span></p><a class="close" href="#"></a></div>';
                    if($_GET['up']=="v") echo '<div class=\'notification success closeable\'><p><span>'.$TVideoMessage.'</span></p><a class="close" href="#"></a></div>';
                }
            } if($rt=="r") {
                if($_GET['up']=="p") echo '<div class=\'notification success closeable\'><p><span>'.$RPhotoMessage.'</span></p><a class="close" href="#"></a></div>';
                if($_GET['up']=="f") echo '<div class=\'notification success closeable\'><p><span>'.$RPhotosMessage.'</span></p><a class="close" href="#"></a></div>';
                if($_GET['up']=="v") echo '<div class=\'notification success closeable\'><p><span>'.$RVideoMessage.'</span></p><a class="close" href="#"></a></div>';
            }
```

```php
        ?>
    </div>

<div id="media">
        <?php
        if($sid!="") {
            $sql = "SELECT * FROM sellerleads WHERE id='".$sid."'";
            $result = mysql_query($sql) or die("Q:".$sql."Fatal error: ".mysql_error());
            $requestinfo=mysql_fetch_array($result);

if($requestinfo[$vmedia]!="") {
                $mediaarr=json_decode($requestinfo[$vmedia],true);
                if($mediaarr['video'][0]!="") {
                    echo ' <div>
                        <h3 class="headline">Video(s)</h3><span class="line" style="margin-bottom: 35px;"></span>
                        <div class="clearfix"></div>';
                            for($p=0;$p<(count($mediaarr['video']));$p++) { if(stripos($mediaarr['video'][$p],"http://")===FALSE && stripos($mediaarr['video'][$p],"https://")===FALSE) $mediaarr['video'][$p]="uploads/".$mediaarr['video'][$p];
                                echo '<video src="'.$mediaarr['video'][$p].'" controls></video><br />';
                                    } echo ' </div>
                        <div class="clearfix"></div>';
                    }
                if($mediaarr['photo'][0]!="") {
                    echo '<div style="margin-top:15px;">
                        <h3 class="headline">Photo(s)</h3><span class="line" style="margin-bottom: 35px;"></span>
                        <div class="clearfix"></div>';
                    echo '<div class="ten alt columns alpha">
                            <section class="flexslider post-img">
                                <div class="media">
                                    <ul class="slides mediaholder">';

for($p=0;$p<(count($mediaarr['photo']));$p++) { if(stripos($mediaarr['photo'][$p],"http://")===FALSE && stripos($mediaarr['photo'][$p],"https://")===FALSE) $mediaarr['photo'][$p]="uploads/".$mediaarr['photo'][$p];
                                echo '<li><img src="'.$mediaarr['photo'][$p].'" alt=""/></li>';
                                    }
                            echo '</ul>
                                </div>
                            </section>
                        </div>
                        </div>
                        <div class="clearfix"></div>';
                    }
                } if($rt=="t") {
                if($requestinfo['seller_name']!="") echo '<div class="notification
```

```
notice"><p><span>'.ucfirst($requestinfo['seller_name']).'</p></span></div>'
;
            if($requestinfo['seller_phone']!="") echo '<span><i
class="icon-phone"></i> Phone:
</span>'.formatPhone($requestinfo['seller_phone']);
            if($requestinfo['seller_cell']!="") echo '<br /><span><i
class="icon-mobile-phone"></i>  Mobile Phone:
</span>'.formatPhone($requestinfo['seller_cell']);
            if($requestinfo['seller_email']!="") echo '<br /><span><i
class="icon-envelope"></i> Email: </span><a href="mailto:
'.$requestinfo['seller_email'].'">'.$requestinfo['seller_email'].'</a>';
            echo "<br />";

if($requestinfo['rt_details']!="")
                echo '<h3 class="headline">Messages</h3><span class="line"
style="margin-bottom: 35px;"></span>
                <div class="clearfix"></div>';

if($requestinfo['rt_details']!="" || $mediaarr['photo'][0]!=""
|| $mediaarr['video'][0]!="") {
                $dtarr=explode(" ",$requestinfo['updatedtime']);
                echo '    <ul>
                        <li class="testimonial">';
                        if($requestinfo['rt_details']!="") echo '<div
id="msgsdiv" class="testimonials
red">'.nl2br($requestinfo['rt_details']).'</div>
                                    <div class="testimonials-
bg"></div><script>var objDiv = document.getElementById("msgsdiv");
                                    objDiv.scrollTop =
objDiv.scrollHeight;</script>';
                                echo '
                                <div><span><i class="icon-time"></i>
Last Sent: '.userdate($dtarr[0]).', '.usertime2($dtarr[1]).'</span>';
                        echo '</div>
                        </li>
                    </ul>
                <div class="clearfix"></div>';
                }
            } if($rt=="r") {
            //if($requestinfo['seller_name']!="") echo '<div
class="notification
notice"><p><span>'.ucfirst($requestinfo['seller_name']).'</p></span></div>'
;
            if($requestinfo['buyername']!="") echo '<div
class="notification
error"><p><span>'.ucfirst($requestinfo['buyername']).'</p></span></div>';

if ($requestinfo['rt_details']!="")
            echo '<h3 class="headline">Messages</h3><span class="line"
style="margin-bottom: 35px;"></span>
                <div class="clearfix"></div>';

if($requestinfo['rt_details']!="" || $mediaarr['photo'][0]!=""
|| $mediaarr['video'][0]!="") {
                $dtarr=explode(" ",$requestinfo['updatedtime']);
                echo '    <ul>
                        <li class="testimonial">';
```

```
                                    if($requestinfo['rt_details']!="") echo '<div
id="msgsdiv" class="testimonials
red">'.nl2br($requestinfo['rt_details']).'</div>
                                        <div class="testimonials-
bg"></div><script>var objDiv = document.getElementById("msgsdiv");
                                        objDiv.scrollTop =
objDiv.scrollHeight;</script>';
                                    echo '
                                        <div><span><i class="icon-time"></i>
Last Sent: '.userdate($dtarr[0]).', '.usertime2($dtarr[1]).'</span>';
                            echo '</div>
                            </li>
                        </ul>
                <div class="clearfix"></div>';
                }
            }
        }
        ?>
    </div>

<div id="infodiv">

<?php if($sid=="" && $rt=="t") echo '<div class="notification notice
closeable"><p><span>Note!  </span> '.$AnonNote.'</p><a
class="close" href="#"></a></div>';

$sendtext="Send a Message";

echo "
        <div  style=\"margin-top:15px;\">
        <h3 class=\"headline\">".$sendtext; echo "</h3><span class=\"line\"
style=\"margin-bottom: 35px;\"></span>
        </div><div class=\"clearfix\"></div>
        <li>
        <form name=\"videoupform\" id=\"videoupform\"
enctype=\"multipart/form-data\" method=\"post\" action=\"mdata.php\">
            <a href=\"#\" onclick=\"javascript: replaceText('<div
class=\'notification notice processing\'><p><span>Taking/Selecting
Video</span></p></div>','result');
document.getElementById('videoToUpload').click();\" class=\"text-btn text-
colorbtn upload-btns\" type=\"submit\"><i class=\"icon-facetime-
video\"></i> Video</a>
            <div style='height: 0px;width: 0px; overflow:hidden;'>
                <input type=\"file\" name=\"videoToUpload[]\"
id=\"videoToUpload\" accept=\"video/*\" capture=\"camcorder\"
style=\"visibility:hidden;\"
onchange=\"sub(videoupform,this.id,this,'Sending Video..');\" />
            </div>
        </form>
        </li>
        <li>
        <form name=\"photoupform\" id=\"photoupform\"
enctype=\"multipart/form-data\" method=\"post\" action=\"mdata.php\">
            <a href=\"#\" onclick=\"javascript: replaceText('<div
class=\'notification notice\'><p><span>Taking/Selecting
Photo</span></p></div>','result');
document.getElementById('photoToUpload').click();\" class=\"text-btn text-
```

```
colorbtn upload-btns\" type=\"submit\"><i class=\"icon-camera\"></i>
Photo</a>
        <div style='height: 0px;width: 0px; overflow:hidden;'>
            <input type=\"file\" name=\"photoToUpload[]\"
id=\"photoToUpload\" accept=\"image/*\" capture=\"camera\"
style=\"visibility:hidden;\"
onchange=\"sub(photoupform,this.id,this,'Sending Photo..');\" />
        </div>
    </form>
    </li>
    <li>
    <form name=\"filesupform\" id=\"filesupform\"
enctype=\"multipart/form-data\" method=\"post\" action=\"mdata.php\">
        <a href=\"#\" onclick=\"javascript: replaceText('<div
class=\'notification notice\'><p><span>Selecting
Photos</span></p></div>','result');
document.getElementById('filesToUpload').click();\" class=\"text-btn text-
colorbtn upload-btns\" type=\"submit\"><i class=\"icon-folder-open\"></i>
Photos</a>
        <div style='height: 0px;width: 0px; overflow:hidden;'>
            <input type=\"file\" name=\"filesToUpload[]\"
id=\"filesToUpload\" multiple=\"multiple\" accept=\"image/*\"
capture=\"camera\" style=\"visibility:hidden;\"
onchange=\"sub(filesupform,this.id,this,'Sending Photos..');\" />
        </div>
    </form>
    </li>
    <div class=\"clearfix\"></div>";
?>

<section id="contact">
<form name="infoform" id="infoform">
<input type="hidden" name="ckid" id="ckid" value="<?php echo
$ckid;?>" />
    <input type="hidden" name="sid" id="sid" value="<?php echo $sid;?>"
/>
    <input type="hidden" name="rt" id="rt" value="<?php echo $rt;?>" />

<fieldset>

<div>
                <label for="comments" accesskey="C">Details: </label>
                <textarea name="details" cols="40" rows="3" id="details"
spellcheck="true"></textarea>
            </div>

<?php    if($sid=="") {
            if($rt=="t") {
                if($requestinfo['buyername']=="")
                echo '
                <div>
                    <label for="name" accesskey="N">Your Name: </label>
                    <input name="name" type="text" id="name" />
                </div>';

if($requestinfo['buyeremail']=="")
                echo '
                <div>
                    <label for="email" accesskey="E">Your Email:
<span>*</span></label>
```

```
            <input name="email" type="email" id="email" />
        </div>';

if($requestinfo['buyerphone']=="")
    echo '
    <div>
        <label for="phone" accesskey="P">Contact Phone: </label>
        <input name="phone" type="tel" id="phone" />
    </div>';
        }
    } if($rt=="r") {
            if($requestinfo['seller_email']=="" ||
$requestinfo['seller_cell']=="") echo '<div class="notification notice
closeable"><p><span>Note!  </span> '.$SellerContactNote.'</p><a
class="close" href="#"></a></div>';

if($requestinfo['seller_email']=="")
        echo '
        <div>
            <label for="email" accesskey="E">Your Email:
<span>*</span></label>
            <input name="seller_email" type="email" id="seller_email"
/>
        </div>';

if($requestinfo['seller_cell']=="")
        echo '
        <div>
            <label for="phone" accesskey="P">Cell Phone: </label>
            <input name="seller_cell" type="tel" id="seller_cell" />
        </div>';
            }

?>

</fieldset>
        <a onclick="javascript: replaceText('<div class=\'notification
notice processing\'><span>Submitting information..</span></div>','result');
post('minfosav.php',infoform,'#');" class="text-btn text-colorbtn"
type="submit">Send Message</a>
            <div class="clearfix"></div>
        </form>
        </section>
        </div>

</div>

</div>

</div>

<script>
function sub(formobj,divid,obj,msg){
    formobj.submit();
    replaceText('<div class=\'notification notice
processing\'><span>'+msg+'</span></div>','result');
    event.preventDefault();
}
</script>
```

```
<?php mysql_close($db);
include "footer.php"; ?>
```

Appendix F: minfosav.php

```php
<?php
session_start();
include_once('constants.php');
include_once('../includes/constants.php');
include_once("../includes/functions/functions.php");
require '../includes/class.phpmailer-lite.php';
include_once("../includes/common.php");
include_once('dbconn.php');

require_once('cb.php');
\Codebird\Codebird::setConsumerKey('FfyIeVRYYXfxdZDoEdrsGg8ti','gr3eo2TUpnCu9IEzazNRiEtu8YbDhfQUi0n56z8bGph32WFAze');
$cb = \Codebird\Codebird::getInstance();
$cb->setToken('3016672644-ReSMRfq7myc4B3eiI3nOjT546qQFzpx6pHO3QbP','TGbvx8lH6OUmFAleQGHKyZGoSOzZzOyYAB90Mfk82b93P');

$aname = ucfirst($_POST['name']);
    $aemail = $_POST['email'];
    $aphone = numbers($_POST['phone']);
    $adetails = $_POST['details'];
    $aseller_email = $_POST['seller_email'];
    $aseller_cell = numbers($_POST['seller_cell']);

$sid = $_POST['sid'];
    $ckid = $_POST['ckid'];

$SendUrl=str_replace(basename(__FILE__, '.php'),"mdata",curPageURL());
    $DashUrl=str_replace(basename(__FILE__, '.php'),"rpage",curPageURL());

$entry="Filled";

$message="";

if($sid=="" && !isEmail($aemail))
        $message = '<div class="notification error">'.'Error! Please enter your valid email address.<br />Note: We do not send your email to anyone. It is only used to notify you when we get a response to your request.</div>';

if($message=="" && $sid!="" && $_POST['rt']=="r") {
        $sql = "SELECT * FROM sellerleads WHERE id='".$sid."'";
        $result = mysql_query($sql) or die("Q:".$sql."Fatal error: ".mysql_error());
        $requestinfo=mysql_fetch_array($result);

if($requestinfo['seller_email']=="" && !isEmail($aseller_email))
            $message = '<div class="notification error">'.'Error! Please enter your valid email address.<br />Note: We do not send your email to anyone. It is only used to notify you when we get a reply message.</div>';
        elseif($requestinfo['seller_email']=="") {
            $sql = "UPDATE sellerleads SET seller_email='".$aseller_email."' WHERE id='".$sid."'";
            $result = mysql_query($sql) or die("Q:".$sql."Fatal error: ".mysql_error());
        }
```

```
        if($requestinfo['seller_cell']=="" && $aseller_cell!="" &&
!isPhone($aseller_cell) && $message=="")
            $message = '<div class="notification error">'.'Error! Please enter
your valid cell phone number.<br />Note: It is only used to notify you when
we get a reply message.</div>';
        elseif($requestinfo['seller_cell']=="") {
            $sql = "UPDATE sellerleads SET seller_cell='".$aseller_cell."'
WHERE id='".$sid."'";
            $result = mysql_query($sql) or die("Q:".$sql."Fatal error:
".mysql_error());
        }
    } if($message=="" && $adetails=="")
        $message = '<div class="notification error">'.'Error! Please enter a
Message.</div>';

if($message!="") {
        $results =  array(
            array( divid      =>    "result",
                                    content     =>     $message)
                                    );
        echo json_encode($results);
    } if($message=="") {
        $entry="Sent";

$aphone=formatPhone(numbers($aphone));

if($sid=="") {
          if($ckid!="") {

$Buyer_Confirm_EMessage="Thank You ".$aname." !!\n\nYour Request
has been sent to the following Sellers/Service Providers:\n\n";

$sql = "SELECT * FROM checkboxsend WHERE id='".$ckid."'";
                $result = mysql_query($sql) or die("Q:".$sql."Fatal error:
".mysql_error());
            $recordinfo=mysql_fetch_array($result);

$bussines_list=json_decode($recordinfo['sendlist'],true);

if($adetails!="")
$Seller_Access_ERMessage="Details:\n\n".$adetails."\n\n";
            else $Seller_Access_ERMessage="";
            if($aname!="") $Seller_Access_ERMessage.="Buyer Name :
".$aname."\n";

if($adetails!="") $Seller_Access_VRMessage=$adetails.",";
            else $Seller_Access_VRMessage="";
            if($aname!="") $Seller_Access_VRMessage.="Buyer Name :
".$aname.",";

$i=0;

$rid=rand(111111111,999999999);

$sql = "SELECT count(*) FROM sellerleads WHERE rid=".$rid;
            $result = mysql_query($sql) or die("Q:".$sql."Fatal error:
".mysql_error());
```

```php
            $ridcnt=mysql_fetch_array($result);
            if($ridcnt>0) $rid=rand(111111111,999999999);

if(is_array($bussines_list)) {
            foreach($bussines_list as $buss) {

$sid=rand(111111111,999999999);

$sql = "SELECT count(*) FROM sellerleads WHERE id=".$sid;
               $result = mysql_query($sql) or die("Q:".$sql."Fatal error: ".mysql_error());
               $sidcnt=mysql_fetch_array($result);
               if($sidcnt>0) $sid=rand(111111111,999999999);

$sql = "INSERT INTO sellerleads (id,rid,seller_accountID,checkboxid,rt_details,media_t,status,seller_lead_count,buyername,buyeremail,buyerphone,seller_name,seller_phone,seller_email,seller_cell,createdtime) VALUES (".$sid.",".$rid.",".$buss['sellid'].",'".$ckid."','".mysql_escape($adetails)."','".$recordinfo['media_t']."','Lead - Free',1,'".$aname."','".$aemail."','".numbers($aphone)."','".mysql_escape($buss['name'])."','".numbers($buss['phone'])."','".$buss['email']."','".numbers($buss['cell'])."',NOW())";
               $result = mysql_query($sql) or die("Q:".$sql."Fatal error: ".mysql_error());

$buss['phone']=numbers($buss['phone']);
               $buss['cell']=numbers($buss['cell']);

if($buss['phone']!='') { sendphonemsg_free($full_domain_name,$Seller_Access_VRMessage,$buss['phone'],$aphone);
               } if($buss['email']!='') {
                  $Seller_Access_EMessage="Hello ".$buss['name'].",\n\nWe have someone interested in your product or service.\n\n";
                  $Seller_Access_EMessage.=$Seller_Access_ERMessage;
                  $Seller_Access_EMessage.="\nTo view this request, click on <a href=\"".$SendUrl."?sid=".$sid."&rt=r\">".$SendUrl."?sid=".$sid."&rt=r</a>";
                  sendmail($domain_name." - Request", $Seller_Access_EMessage, $buss['email']);
               }
               if($buss['cell']!='') {
                  $Seller_Access_CMessage="Request: ".$SendUrl."?sid=".$sid."&rt=r";
                  //sendsmsall($Seller_Access_CMessage, numbers($buss['cell']));
               }

$i++;
               $Buyer_Confirm_EMessage.=$i.". ".$buss['name']."\n\n";
            }
         }
      }

$Buyer_Confirm_EMessage.="They will get back to you shortly.\n\n";
```

```
        $Buyer_Confirm_EMessage.="<a
href='".$DashUrl."?rid=".$rid."'>Click on this link to view your Request &
the Responses</a>\n\n";
        $Buyer_Confirm_EMessage.="Or copy and paste this link into your
browser: ".$DashUrl."?rid=".$rid."\n\n";

if($aemail!='')
            sendmail($domain_name." - Request Sent Confirmation",
$Buyer_Confirm_EMessage, $aemail);

$message = '<div class="notification
success">'.nl2br($Buyer_Confirm_EMessage).'</div>';
        $_SESSION['ckid']="";
        $_SESSION['sid']="";
        $_SESSION['rid']="";
        }
    else {
        $sql = "SELECT * FROM sellerleads WHERE id='".$sid."'";
        $result = mysql_query($sql) or die("Q:".$sql."Fatal error:
".mysql_error());
        $recordinfo=mysql_fetch_array($result);

if($_POST['rt']=="t") {
            if($recordinfo['rt_details']!="")
$newdetail=mysql_escape($recordinfo['rt_details']."<br />".$adetails);
            else $newdetail=mysql_escape($adetails);

$sql = "UPDATE sellerleads SET rt_details='".$newdetail."'
WHERE id='".$sid."'";
        $result = mysql_query($sql) or die("Q:".$sql."Fatal error:
".mysql_error());

$Seller_Access_EMessage="Hello
".$recordinfo['seller_name'].",\n\nWe have a new message.\n\n";
        $Seller_Access_EMessage.="To view this message, click on <a
href=\"".$SendUrl."?sid=".$sid."&rt=r\">".$SendUrl."?sid=".$sid."&rt=r</a>"
;

$Seller_Access_CMessage="New Message:
".$SendUrl."?sid=".$sid."&rt=r";

if($recordinfo['seller_email']!='')
            sendmail($domain_name." - Message", $Seller_Access_EMessage,
$recordinfo['seller_email']);
        if($recordinfo['seller_cell']!='')
            sendsmsall($Seller_Access_CMessage,
numbers($recordinfo['seller_cell']));

$message = '<div class="notification
success">'.$TFinalMessageone.' '.$recordinfo['seller_name'].'</div>';
        }
        if($_POST['rt']=="r") {
            if($recordinfo['tweet_rpid']=="") {
            if($recordinfo['rt_details']!="")
$newdetail=mysql_escape($recordinfo['rt_details']."<br
/><span>".$adetails."</span>");
            else $newdetail=mysql_escape("<span>".$adetails."</span>");

$sql = "UPDATE sellerleads SET rt_details='".$newdetail."'
WHERE id='".$sid."'";
```

```
                $result = mysql_query($sql) or die("Q:".$sql."Fatal error:
".mysql_error());

$Seller_Access_EMessage="Hello
".$recordinfo['buyername'].",\n\nWe have a new message.\n\n";
                $Seller_Access_EMessage.="To view this message, click on <a
href=\"".$SendUrl."?sid=".$sid."&rt=t\">Click on this link to view the
Response</a>\n\n";
                $Seller_Access_EMessage.="Or copy and paste this link into your
browser: ".$SendUrl."?sid=".$sid."&rt=t\n\n";

$Seller_Access_CMessage="New Message:
".$SendUrl."?sid=".$sid."&rt=t";

if($recordinfo['buyerphone']!='')
                    sendsmsall($Seller_Access_CMessage,
numbers($recordinfo['buyerphone']));

if($recordinfo['buyeremail']!='')
                    sendmail($domain_name." - Message", $Seller_Access_EMessage,
$recordinfo['buyeremail']);

$message = '<div class="notification
success">'.$RFinalMessage.'</div>';
            }
             else {
                if($recordinfo['rt_details']!="")
$newdetail=mysql_escape($recordinfo['rt_details']."<br
/><span>".$adetails."</span>");
                else $newdetail=mysql_escape("<span>".$adetails."</span>");

$mediaarr=json_decode($recordinfo['media_r'],true);
                $media_ids = array();

if(is_array($mediaarr['video']))
                    foreach ($mediaarr['video'] as $file) {
                        $tweetreply = $cb->media_upload(array('media' =>
"uploads/".$file));
                        $media_ids[] = $tweetreply->media_id_string;
                    }
                if(is_array($mediaarr['photo']))
                    foreach ($mediaarr['photo'] as $file) {
                        $tweetreply = $cb->media_upload(array('media' =>
"uploads/".$file));
                        $media_ids[] = $tweetreply->media_id_string;
                    }
                $media_ids = implode(',', $media_ids);
                $tweetreply = $cb->statuses_update(array(
                'in_reply_to_status_id' => $recordinfo['tweet_rpid'],
                    'status' => '@'.$recordinfo['uname'].'
'.$recordinfo['seller_name'].': '.$adetails,
                    'media_ids' => $media_ids));

$tweetreply=json_decode(json_encode($tweetreply), true);

$sql = "UPDATE sellerleads SET rt_details='".$newdetail."',
tweet_id=".$tweetreply['id'].", media_r='' WHERE id='".$sid."'";
                $result = mysql_query($sql) or die("Q:".$sql."Fatal error:
".mysql_error());
```

```
            $message = '<div class="notification
success">'.$RFinalMessage.'</div>';
            }
          }
        }

$results = array(
        array( divid   =>    "result",
                    content    =>    $message
                    ),
        array( divid   =>    "media",
                    content    =>    ""
                    ),
        array( divid   =>    "infodiv",
                    content    =>    ""
                    )
                    );
    echo json_encode($results);
    }

$trace=$entry;
include_once('analytics.php');

mysql_close($db);

?>
```

Appendix G: constants.php

```php
<?php $BylineTerm="Get What you want, Where you want it";
$SearchTerm="Get What you want";
$LocationTerm="Where you want it";

$AnonNote="We DO NOT send your contact information to anyone, including the Businesses and Services that you selected.<br />We use your contact information only to notify you of the responses from our system by email or by a text message. If you provide your phone number, the Businesses and Services may be connected to you by a phone call through our system and they will not know your phone number.";
$SellerContactNote="We need your contact information to notify you of the request messages by email or by a text as well, if you prefer.";

$ReviewMinCount=10;

/***** YP API *****/
$YPKey="dplsq52wyn";
$YPMaxListings=20;    //Max: 50
$YPMaxPages=1;
/*****************/

/***** Yelp API *****/
$API_HOST = 'api.yelp.com';
$SEARCH_PATH = '/v2/search';
$BUSINESS_PATH = '/v2/business';
$CONSUMER_KEY = "QMxXhh2gLd-THcw2qfsDOg";
$CONSUMER_SECRET = "Y7wIjQPrTIgpUtqpYS7kAyj5iOk";
$TOKEN = "bJ4ySX13BeX6pJzoOHnCD3iO05yuJtNB";
$TOKEN_SECRET = "57B1z4pIeS2JLhXa3sQ54PZXWjc";
$YelpMaxResults=20;   //Max: 20
/*******************/

/***** Google API ******/
$GoogleApiKey="AIzaSyBRmtRXj7jJWCKCl-9N_NvnIB6gCfulIHk";
$GoogleMaxPages=1;
$GoogleRadius=30;
/*********************/

/***** CityGrid API ******/
$CityGridKey="10000008608";
$CityGridMaxPages=1;
$CityGridRadius=30;
/*********************/

/****** Web Search Engines ******/
$BingAcctKey = 'tu00LsIRoGgM12K+a2dAInM9ZJAIwey/oPAn0ViMTHE';
$YandexKey="03.292981578:0bf45b56b1025139eadf14199be8db03";
$YandexRCAKey="rca.1.1.20150603T013102Z.226ec4c9582dc5db.7ffd6fba5a8a9c9a754b381ca0962c966a953733";
/*********************/

$MaxPhotos=1;

$TSelectMessage="Select one or more sellers / service providers to send your request to.";
```

```
$TInitialMessage="Record and send a Video Request (nothing to
type!).  (Note: Submit your Contact information after you sent
the video to be contacted.)";
$TPhotoMessage="Photo Uploaded! Submit your Contact information and a
detailed message.";
$TPhotosMessage="Photo(s) Uploaded! Submit your Contact information and a
detailed message.";
$TVideoMessage="Video Uploaded! Do Submit your contact phone number below
to be contacted. You can also include a message.";
$TFinalMessage="Your Information has been sent! You will be contacted by
Sellers / Service Providers";
$TFinalMessageone="Your Information has been sent! You will be contacted by
";

$SellerMessage="Enter your Business phone number to view your Requests";
$RResponseMessage="Here are the details of the request. You may contact the
Buyer to follow up.";
$RPhotoMessage="Photo Uploaded! Submit additional Response message.";
$RPhotosMessage="Photo(s) Uploaded! Submit additional Response message.";
$RVideoMessage="Video Uploaded! you can also type your Response message
with some details.";
$RFinalMessage="Your Information has been sent!";
?>
```

What is claimed is:

1. A method for providing search results to a user, the method comprising:

providing a user interface configured to allow the user to transmit a query to a computer system, wherein the query comprises at least a search phrase;

receiving the query at the computer system retrieving, using the computer system, a plurality of search results from a database based at least on the search phrase, wherein the plurality of search results comprises a plurality of matches, at least some of which are provider-associated matches each associated with an associated provider from a plurality of providers, whereby a provider-associated match of the plurality of matches indicates a provider offering and an associated provider that provides the provider offering;

identifying a set of prior actions of associated providers associated with the provider-associated matches, wherein the set of prior actions includes a provider association associating the provider with a prior action of that provider;

computing engagement metrics for at least some of the providers based on the set of the prior actions, wherein a particular engagement metric for a particular provider of the plurality of providers represents how engaged the particular provider;

determining, at the computer system, a display order of the plurality of search results based on the engagement metrics, whereby search results associated with a first provider are more prominent in the display order than a second provider if the first provider has a higher engagement metric than the second provider;

providing, using the computer system, the plurality of search results to the user in the display order;

providing a second user interface configured to allow the user to contact two or more providers of the plurality of providers simultaneously, wherein the second user interface includes contact information extracted from URLs associated with a search result, wherein such extraction is based on following the URLs, wherein the URLs are associated with the plurality of providers, and wherein the plurality of providers is filtered based on geolocation of the user and the computer system;

receiving, at the computer system, a selection of the two or more providers of the plurality of providers and a query, the selection of the two or more providers chosen by the user from the provided plurality of search results; and transmitting, at the computer system, the query to the two or more providers, wherein the query is relayed through an intermediary system without revealing the identity of the user.

2. The method of claim 1, further comprising:

providing a third user interface to a provider, the third user interface configured to allow the provider to establish a new provider account and to allow the provider to modify a search result owned by the provider; and storing modifications made by the provider via the third user interface.

3. The method of claim 1, wherein each of the plurality of search results further includes contact data, the contact data including at least one of an email address and a phone number for a provider associated with a search result of the plurality of search results.

4. The method of claim 1, further comprising selecting an image for at least one search result of the plurality of search results, the image selected based on at least one of an image resolution, image dimensions, and image colors.

5. The method of claim 1, further comprising, prior to providing the plurality of search results, sorting the plurality of search results into an order, the order based at least in part on previous user experiences with at least one search result of the plurality of search results.

6. The method of claim 1, wherein the query is selected by the user based upon a selection in one or more drop-down boxes.

7. The method of claim 6, wherein at least one of the one or more drop-down boxes includes context-dependent options, the context-dependent options based at least in part on the query.

8. The method of claim 1, further comprising:

determining a contact number from a provider's URL of a particular provider;

contact the particular provider to validate the contact number; and provide the contact number to the user, after validating the contact number.

9. The method of claim 1, wherein the contact information extracted from URLs associated with a search result comprises seller contact information obtained by retrieving Internet content represented at the URLs, distinct from information separately provided by sellers to the computer system.

10. A method for providing search results to a user, the method comprising:

providing a user interface configured to allow the user to transmit a query to a computer system, wherein the query comprises at least a search phrase;

receiving the query at the computer system retrieving, using the computer system, a plurality of search results from a database based at least on the search phrase, wherein the plurality of search results comprises a plurality of matches, at least some of which are provider-associated matches each associated with an associated provider from a plurality of providers, whereby a provider-associated match of the plurality of matches indicates a provider offering and an associated provider that provides the provider offering;

identifying a set of prior actions of associated providers associated with the provider-associated matches, wherein the set of prior actions includes a provider association associating the provider with a prior action of that provider;

computing engagement metrics for at least some of the providers based on the set of the prior actions, wherein a particular engagement metric for a particular provider of the plurality of providers represents how engaged the particular provider;

determining, at the computer system, a display order of the plurality of search results based on the engagement metrics, whereby search results associated with a first provider are more prominent in the display order than a second provider if the first provider has a higher engagement metric than the second provider;

providing, using the computer system, the plurality of search results to the user in the display order;

providing a second user interface configured to allow the user to contact two or more providers of the plurality of providers simultaneously, wherein the second user interface includes contact information extracted from URLs associated with a search result, wherein such extraction is based on following the URLs, wherein the URLs are associated with the plurality of providers, and wherein the plurality of providers is filtered based on geolocation of the user and the computer system;

receiving, at the computer system, a selection of the two or more providers of the plurality of providers and a query, the selection of the two or more providers chosen by the user from the provided plurality of search results; and transmitting, at the computer system, the query to the two or more providers, wherein the query is relayed through an intermediary system without revealing the identity of the user.

11. The method of claim 10, further comprising:
providing a third user interface to a provider, the third user interface configured to allow the provider to establish a new provider account and to allow the provider to modify a search result owned by the provider; and
storing modifications made by the provider via the third user interface.

12. The method of claim 10, wherein each of the plurality of search results further includes contact data, the contact data including at least one of an email address and a phone number for a provider associated with a search result of the plurality of search results.

13. The method of claim 10, further comprising selecting an image for at least one search result of the plurality of search results, the image selected based on at least one of an image resolution, image dimensions, and image colors.

14. The method of claim 10, further comprising, prior to providing the plurality of search results, sorting the plurality of search results into an order, the order based at least in part on previous user experiences with at least one search result of the plurality of search results.

15. The method of claim 10, wherein the query is selected by the user based upon a selection in one or more drop-down boxes.

16. The method of claim 15, wherein at least one of the one or more drop-down boxes includes context-dependent options, the context-dependent options based at least in part on the query.

17. The method of claim 10, further comprising:
determining a contact number from a provider's URL of a particular provider;
contact the particular provider to validate the contact number; and
provide the contact number to the user, after validating the contact number.

18. The method of claim 10, wherein the contact information extracted from URLs associated with a search result comprises seller contact information obtained by retrieving Internet content represented at the URLs, distinct from information separately provided by sellers to the computer system.

* * * * *

UNITED STATES PATENT AND TRADEMARK OFFICE
CERTIFICATE OF CORRECTION

PATENT NO. : 11,797,554 B2
APPLICATION NO. : 15/233729
DATED : October 24, 2023
INVENTOR(S) : Ganesan Venkatakrishnan It is certified that error appears in the above-identified patent and that said Letters Patent is hereby corrected as shown below:

In the Claims

Column 132, Line 33, Claim 10, Change "receiving the query at the computer system" to "receiving the query at the computer system;"

Signed and Sealed this
Twenty-first Day of November, 2023

Katherine Kelly Vidal
*Director of the United States Patent and Trademark Office*